United States Patent
Kimura et al.

(10) Patent No.: US 7,376,820 B2
(45) Date of Patent: May 20, 2008

(54) INFORMATION PROCESSING UNIT, AND EXCEPTION PROCESSING METHOD FOR SPECIFIC APPLICATION-PURPOSE OPERATION INSTRUCTION

(75) Inventors: Michihide Kimura, Kawasaki (JP); Atsuhiro Suga, Kawasaki (JP); Hideo Miyake, Kawasaki (JP); Satoshi Imai, Kawasaki (JP); Yasuki Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 548 days.

(21) Appl. No.: 09/741,802

(22) Filed: Dec. 22, 2000

(65) Prior Publication Data
US 2001/0023479 A1   Sep. 20, 2001

(30) Foreign Application Priority Data

| Mar. 16, 2000 | (JP) | ............................ 2000-074847 |
| Mar. 30, 2000 | (JP) | ............................ 2000-094476 |
| Aug. 2, 2000 | (JP) | ............................ 2000-234490 |

(51) Int. Cl.
G06F 9/44 (2006.01)
G06F 9/54 (2006.01)

(52) U.S. Cl. ..................................... 712/244; 712/227

(58) Field of Classification Search ............... 717/129, 717/131, 124; 712/244, 227, 245, 219, 248; 714/33, 35, 39; 710/269, 266; 713/401
See application file for complete search history.

(56) References Cited

U.S. PATENT DOCUMENTS

| 4,847,748 | A | * | 7/1989 | Yamahata et al. ............ 712/212 |
| 5,021,985 | A | | 6/1991 | Hu et al. ..................... 708/495 |
| 5,070,473 | A | * | 12/1991 | Takano et al. ............... 710/260 |
| 5,197,138 | A | * | 3/1993 | Hobbs et al. ................ 712/222 |
| 5,742,780 | A | | 4/1998 | Caulk, Jr. .................... 712/206 |
| 5,742,782 | A | | 4/1998 | Ito et al. |

(Continued)

FOREIGN PATENT DOCUMENTS

EP   0 790 552 A3   8/1997

(Continued)

OTHER PUBLICATIONS

Bob Beims, "The MC68020 32 Bit6 MPU: Opening New Application Doors", 8080 Wescon Proceedings San Francisco, CA, Nov. 19-22, 1985.*
08305568, Japanese Patent Office Abstract, Matsushita Ind Co Ltd, Nov. 1996.*

(Continued)

*Primary Examiner*—Daniel Pan
(74) *Attorney, Agent, or Firm*—Staas & Halsey LLP

(57) ABSTRACT

In the control section, an operation instruction not prescribing a functional specification, and a unit for processing the specific application-purpose operation instruction is provided within the processor core. The structure of this unit can be changed based on a flexible pipeline structure, and is separately designed for each application field. A register that prescribes a latency from when an instruction of the above unit is issued till when a result can be utilized is also provided in the processor core so as to prevent contention of an output port. Another register that prescribes a latency relating to a constraint of an interval of issuing an instruction of the above unit is also provided in the processor core so as to prevent contention of a resource with the preceding instructions.

16 Claims, 29 Drawing Sheets

U.S. PATENT DOCUMENTS

| | | | | |
|---|---|---|---|---|
| 5,774,724 A * | 6/1998 | Heisch | ............ | 717/129 |
| 5,794,067 A | 8/1998 | Kadowaki | ............ | 712/35 |
| 5,961,630 A | 10/1999 | Zaidi et al. | ............ | 712/200 |
| 6,108,766 A | 8/2000 | Hahn et al. | | |
| 6,167,479 A * | 12/2000 | Hartnett et al. | ............ | 710/260 |
| 6,343,353 B1 * | 1/2002 | Kim | ............ | 711/167 |
| 6,553,513 B1 * | 4/2003 | Swoboda et al. | ............ | 714/28 |

FOREIGN PATENT DOCUMENTS

| | | |
|---|---|---|
| EP | 0970552 A2 * | 8/1997 |
| EP | 0790552 A3 * | 1/2003 |
| JP | 01-261741 | 10/1989 |
| JP | 2-1084 | 1/1990 |
| JP | 04-270414 | 9/1992 |
| JP | 7-281896 | 10/1995 |
| JP | 8-305568 | 11/1996 |
| JP | 09-288564 | 11/1997 |
| JP | 09-292992 | 11/1997 |
| KR | 1999-016055 | 3/1999 |

OTHER PUBLICATIONS

JP Application, 64-10405, English Abstract, One-Chip MicrocomputerApr.1989.*

Biems, Bob, "The MC68020 32-Bit MPU: Opening New Application Doors", *Wescon Technical Papers*, Western Periodicals Co., North Hollywod, vol. 29, No. 1/4, Nov. 19, 1985, pp. 1-17.

Notice of Rejection in Japanese Office Action issued May 24, 2005 by the Japanese Patent Office in Japanese Application No. 2000-094476 related to the present above-identified pending US patent application (2 pages), Partial English Translation of Office Action (2 pages).

Notice of Rejection Office Action dated Jul. 11, 2006 issued by the Japanese Patent Office for Japanese Patent Application No. 2000-234490 related to the present above-identified pending U.S. patnet application, including partial English language translation thereof (4 pages total).

Notice of Rejection Office Action dated Jul. 25, 2006 issued by the Japanese Patent Office for Japanese Patent Application No. 2000-074847 related to the present above-identified pending US patent application, including partial English language translation thereof (4 pages total).

Notice Requesting Submission of Opinion issued by the Korean Intellectual Property Office on Oct. 13, 2006 in Korean Patent Application No. 10-2001-0003129 that corresponds to the present pending U.S. patent application (four pages) (English language translation thereof 4 pages).

Notice of Rejection issued by the Japanese Patent Office on Mar. 20, 2007 in Japanese Application No. 2000-074847, that corresponds to the present pending US patent application (3 pages) (2 pages of English translation).

* cited by examiner

FIG.25

INFORMATION PROCESSING UNIT, AND EXCEPTION PROCESSING METHOD FOR SPECIFIC APPLICATION-PURPOSE OPERATION INSTRUCTION

FIELD OF THE INVENTION

The present invention relates to an information processing apparatus loaded with a specific application-purpose operation instruction, and an exception processing method to be employed when an operation exception (exceptional operation) has occurred during the execution of a specific application-purpose operation instruction in an information processing apparatus loaded with the specific application-purpose operation instruction. The specific application-purpose operation instruction in this case refers to an instruction that has an operational function specialized for a specific application purpose.

BACKGROUND OF THE INVENTION

Many times some special processing that is specialized for a specific application are utilized. An information processing apparatus loaded with a specific application-purpose operation instruction is used to efficiently carry out such a processing. However, the specific application-purpose operation instruction is different for each application field. Therefore, the special processing designed for a specific application cannot be applied for a general purpose. Therefore, in many cases, such a specific application-purpose operation instruction becomes useless in a different application field.

When the application of such a specific application-purpose operation instruction to various application fields is taken into consideration, it is considered one way to develop a processor that is equipped with all the specific application-purpose operation instructions covering various application fields. However, the development of such a processor brings about an increase in the number of instructions and an increase in the complexity of the structure of the processor. Further, this brings about various demerits such as an increase in the circuit scale, an increase in power consumption, and an increase in the cost of a chip.

In order to overcome the above problems, according to a conventional practice, an additional processing unit such as a coprocessor having an own instruction control structure is connected to the outside of a processor that executes normal operation instructions. Based on this structure, a specific application-purpose operation instruction is added. According to this arrangement, it is not necessary to redesign the processor itself.

The block diagram in FIG. 1 shows the structure of a conventional processor core. Conventionally, the processor core is constructed of a memory section 1011, an instruction fetch control section 1012, an instruction buffer section 1013, an instruction decoding section 1014, an instruction issue control section 1015, a score board section 1016, an instruction execution control section 1017, a load/store unit 1018, an executing section 1019, a branch unit 1020, and a general-purpose register section 1021.

FIG. 2 and FIG. 3 are diagrams for explaining a structure and an operation of the conventional instruction execution control section 1017. In FIG. 2 and FIG. 3, when there are a plurality of instructions that maybe issued simultaneously, portions that are specialized for the operation of one of those instructions are shown. FIG. 2 and FIG. 3 show characteristic portions relating to a control for writing a result of an instruction group having two pipeline stages that belongs to an instruction category A1 and a result of an instruction group B2 corresponding having four pipeline stages, and a clear control of the score board.

First, FIG. 2 will be explained. The instruction execution control section 1017 receives an operation code (including a valid flag of the operation code) and a destination register number from the instruction decoding section 1014. The instruction execution control section 1017 receives a release flag of an instruction from the instruction issue control section 1015.

A decoder 1022 receives an operation code and its valid flag, makes a decision about to which instruction group the operation code belongs, and outputs the valid flag. AND circuits 1023 and 1024 calculate AND logic of the valid flag and a resource flag output from the decoder 1022, and write a result into valid flags (valid A1/B1) 1025 and 1026 of the respective pipeline registers.

A destination register number is stored into a first pipeline stage 1027 of the pipeline register. The information is passed to the next pipeline register for each one stage per one cycle, that is, to valid flags 1028 and 1029 of valid A2/B2 respectively and a second pipeline stage 1030, to a valid flag 1031 of valid B3 and a third pipeline stage 1032, and to a valid flag 1033 of valid B4 and a fourth pipeline stage 1034.

At a final stage of the pipeline register, OR circuit 1035 calculates OR logic of the valid flag of each instruction group, outputs a score board clear request signal to the score board section 1016, and outputs a write request signal to the register section 1021. At the same time, the value of a destination register of the pipeline register corresponding to the final stage of the valid flag is selected by a valid flag 1028 of valid A2 or valid flag 1033 of valid B4.

An AND circuit 1036 outputs AND logic of the valid flag 1028 of valid A2 and the value of the second pipeline stage 1030. AND circuit 1037 outputs AND logic of the valid flag 1033 of valid B4 and the value of the fourth pipeline stage 1034. OR circuit 1038 calculates OR logic of the outputs of the AND circuit 1036 and 1037, and outputs a result as a destination register number to the score board section 1016 and the register section 1021.

When an output port of the pipeline register is shared, the instructions cannot be written at the same time. In such a case, in this case, information (suppress A) regarding the timing of using the output port is posted to the instruction issue control section 1015. Thus, the instruction issue control section 1015 carries out a control to avoid a contention of the output stage, thereby to prevent a contention of the write port. As the information (suppress A) of the timing of using the output port, the valid flag 1029 of valid B2 is used. In other words, when the instruction group B is at the second pipeline stage, a control signal (suppress A) which restricts the issuing of the instruction group A is issued.

FIG. 3 shows an example of a structure of a control circuit for normal instructions of a type that occupies the resource for a constant period. The control circuit shown in FIG. 3 includes all the components shown in FIG. 2, and in addition includes an adder 1041, two selectors 1042 and 1043, a counter 1044, three comparators 1045, 1046 and 1047, a valid flag 1048 of valid n, n-th stage 1049 of the pipeline register, six AND circuits 1050, 1051, 1052, 1053, 1054 and 1055, and three OR circuits 1056, 1057 and 1058.

The AND circuit 1050 outputs AND logic of the output of the decoder 1022 and the release flag. The counter 1044 holds the value of the output value of the counter 1044 incremented by one by the adder 1041. The output value of the counter 1044 is compared with "n", "n-2" and "n-4" by the first comparator 1045, the second comparator 1046 and the third comparator 1047 respectively. Result of the comparison by the first comparator 1045 is input into a low active input terminal of the AND circuit 1051.

An output of the AND circuit 1051 is input into the OR circuit 1056 and the OR circuit 1057. The OR circuit 1056 outputs OR logic of the output of the AND circuit 1050 and the output of the AND circuit 1051, to the first selector 1042. The first selector 1042 resets the counter 1044 according to this input value. The OR circuit 1057 calculates OR logic of the output of the AND circuit 1050 and the output of the AND circuit 1051, and writes a result of this OR logic into the valid flag 1048 of valid n. The output of the valid flag 1048 of valid n is input into the AND circuits 1052, 1053 and 1054, and also to the other input terminal of the AND circuit 1051.

Result of the comparison by the first comparator 1045, the second comparator 1046 and the third comparator 1047 respectively is input into the other input terminal of the AND circuit 1052, the AND circuit 1053 and the AND circuit 1054 respectively. The output of the AND circuit 1052 is input into the OR circuit 1035. The OR circuit 1035 calculates OR logic of the valid flag of each instruction group and the output of the AND circuit 1052, outputs a score board clear request to the score board section 1016, and outputs a write request signal to the register section 1021.

The OR circuit 1058 calculates OR logic of the valid flag 1029 of valid B2 and the output of the AND circuit 1053, and issues a control signal (suppress A) which restricts the issuing of the instruction group A. The output of the AND circuit 1054 becomes a control signal (suppress B) which restricts the issuing of the instruction group B.

The second selector 1043 selects any one of a destination register number stored in the n-th stage 1049 of the pipeline register and a destination register number received from the instruction decoding section 1014. This selection is carried out according to the output of the AND circuit 1050. The selected number is stored into the n-th stage 1049 of the pipeline register.

The AND circuit 1055 calculates AND logic of the destination register number stored in the n-th stage 1049 of the pipeline register and the output of the AND circuit 1052. The OR circuit 1038 calculates OR logic of the outputs of the AND circuits 1055, 1036 and 1037, and outputs as a destination register number to the score board section 1016 and the register section 1021.

Based on the above structure, the counter 1044 holds the valid flag of the instruction and the destination register up to a cycle number at which a result of the instruction is output. When the counter 1044 has reached a prescribed cycle number, the destination register number and the register use flag clear signal are output to the score board section 1016. Further, the destination register number and the write request are output to the register section 1021.

Further, at a prescribed cycle number at which the succeeding instruction group occupying the same operating unit can use the operating unit, an operating unit use-flag clear signal is output. The instruction issue restriction signal (suppress A and suppress B) to the instruction issue control section 1015 is output based on a difference between the output port use timing and the execution cycle number of the succeeding instruction group.

In the information processing apparatus loaded with a specific application-purpose operation instruction, some times exceptional operation, such as overflow or underflow attributable to a bug that is a defect of a program, occurs when the specific application-purpose operation instruction is executed. In order to avoid such a bug, debugging is carried out at the program development stage.

The debugging is implemented using a debug supporting system. In general, the debug supporting system is provided with a breakpoint function or a single step function for interrupting a program under execution. The operator, who performs the debug, can halt the execution of a program to be debugged by using these functions, and check and change values of registers and memories in the halted state. The operator can then restart the execution of the program from a point of time when the program was halted.

As methods for realizing the breakpoint function, there are an instruction break method and a software break method. According to the instruction break method, before starting the execution of a program, an address of an instruction for halting the execution of the program is held in a breakpoint register that is provided in the hardware. An interruption is generated when the instruction assigned by the breakpoint register has been detected during the execution of the program. Then, the control is delivered to the debug supporting program via an interruption processing program. This state is posted to the debug operator. When the debug operator has instructed to restart the execution of the program, the control is returned to the origin from the debug supporting program.

FIG. 4 is a flowchart of an interruption processing program according to the instruction break method. When the interruption processing program is started after interrupting the execution of a program, the context is saved (step S1701) and the instruction break processing is carried out (step S1702). Then, the context is restored (step S1703), and the processing is recovered from the interruption (step S1704).

According to the software break method, before starting the execution of a program, an instruction for executing the program is substituted by an instruction for generating an interruption. Interruption is generated when the instruction for generating the interruption has been detected during the execution of the program. Then, the control is delivered to the debug supporting program via the interruption processing program. This state is posted to the debug operator. At the time of restarting the execution of the program, the execution of the original instruction that has been substituted is simulated, and then the control is delivered to the beginning. There is also a case that an exclusive instruction called a breakpoint instruction is prepared as the instruction for generating an interruption.

FIG. 5 is a flowchart of an interruption processing program according to the software break method. When the interruption processing program is started after interrupting the execution of a program, the context is saved (step S1801) and the software break processing is carried out (step S1802). Then, the context is restored (step S1803), and the processing is recovered from the interruption by an interruption return instruction (step S1804).

According to the single step function, when the debug operator has instructed to execute the single step function in a state that a program to be debugged is halted, the execution of the program is halted after an instruction to be executed next has been executed. As a method of realizing the single step function, there is a step break method. According to the step break method, a single step mode register is provided in the hardware so as to hold the result of the decision as to whether an interruption is to be generated or not after an instruction has been executed. In a single step mode, an interruption is generated after an instruction in focus has been executed. When an interruption has been generated, the control is delivered to the debug supporting program via the interruption processing program. This state is posted to the debug operator. When a restarting of the execution of the program has been instructed, the control is returned to the origin.

FIG. 6 is a flowchart of an interruption processing program based on the step break method. When the interruption processing program has been started after interrupting the execution of a program, the context is saved (step S1901) and the step break processing is carried out (step S1902). Then, the context is restored (step S1903), and the processing is recovered from the interruption by an interruption return instruction (step S1904).

In the information processing apparatus loaded with a specific application-purpose operation instruction, when an operation exception such as an overflow has occurred after the execution of the specific application-purpose operation instruction, it is necessary to detect a position on the program where this operation exception has occurred.

Conventionally, in order to detect an operation exception by guaranteeing a program sequence, a decision is made as to whether a control dependency due to an exception occurs or not in a certain operation instruction. When the operation instruction has a control dependency due to an exception, the execution of an instruction that follows this instruction is started after completing the execution of the operation instruction having the control dependency. On the other hand, when the instruction does not have a control dependency due to an exception, the execution of an instruction that follows this instruction is immediately started.

The block diagram in FIG. 7 shows the structure of the conventional information processing apparatus loaded with a specific application-purpose operation instruction. This information processing apparatus is equipped with a memory 101 having memories inside and outside of a chip, a bus and a cache circuit. This unit also has an instruction reading section 102 comprising an instruction read control section 121, a program counter 122 and an instruction word register 123. The unit also has a register control section 103 comprising a return instruction address register 131, an interruption pre-generation operation register 132, an operation register 133 and a general-purpose register 134. The unit also has an interruption control section 104 comprising a normal interruption control section 141. The unit also has an instruction executing section 105.

The instruction executing section 105 is equipped with an instruction decoding section 151, a load/store instruction executing section 152, an operation instruction executing section 153, a plurality of specific application-purpose operation instruction executing sections 154, a branch/interruption return instruction control section 156, a score board 157, a load/store instruction issue control section 158, an operation instruction issue control section 159, a branch/interruption return instruction issue control section 160, and a specific application-purpose operation instruction issue control section 162.

In this information processing apparatus, an interruption of a specific application-purpose operation instruction due to an operation exception is carried out as follows. Before starting the execution of the specific application-purpose operation instruction, the specific application-purpose operation instruction issue control section 162 makes a decision about the presence or absence of a control dependency based on the information of the flag of the score board 157 and the specific application-purpose operation instruction supplied from the instruction decoding section 151. Based on this decision, the specific application-purpose operation instruction issue control section 162 posts to the specific application-purpose operation instruction executing section 154 about whether it is possible to execute the specific application-purpose operation instruction or not.

When it is possible to execute the specific application-purpose operation instruction, the specific application-purpose operation instruction executing section 154 executes this instruction immediately. When it is not possible to execute the specific application-purpose operation instruction, the specific application-purpose operation instruction executing sections 154 wait until the specific application-purpose operation instruction executing section 154 receives a notice from the specific application-purpose operation instruction issue control section 162 that it is possible to execute the specific application-purpose operation instruction. When an operation exception has been detected during the execution of the specific application-purpose operation instruction, each of the instruction executing sections 152, 153 and 154 posts the occurrence of an instruction to the interruption control section 104, and makes it generate an interruption.

The block diagram in FIG. 8 shows another example structure of a conventional information processing apparatus loaded with a specific application-purpose operation instruction. This information processing apparatus has a structure such that a condition code register 171 is additionally provided to the information processing apparatus shown in FIG. 7. The condition code register 171 holds a condition code that is posted from the operation instruction executing section 153 or the specific application-purpose operation instruction executing sections 154 after the execution of the respective operation instructions. This information processing apparatus is provided with a trap instruction for determining as to whether an exception is generated or not based on a value held in the condition code register 171 and a value in the instruction field.

After completing the execution of the instruction, each of the operation instruction executing section 153 and the specific application-purpose operation instruction executing sections 154 sets to the condition code register 171 a value that corresponds to the result of executing the instruction. When a trap instruction has been supplied from the instruction decoding section 151, the branch/interruption return instruction control section 156 makes a decision about whether an interruption is generated or not, based on a value held in the condition code register 171 and the value in the instruction field. When generating an interruption, the branch/interruption return instruction control section 156 requests the interruption control section 104 so as to generate an interruption.

In the information processing apparatus having the structure as shown in FIG. 8, an interruption of a specific application-purpose operation instruction due to an operation exception is carried out as follows. Before starting the execution of the specific application-purpose operation instruction, the specific application-purpose operation instruction issue control section 162 makes a decision about the presence or absence of a control dependency based on the information of the flag of the score board 157 and the specific application-purpose operation instruction supplied from the instruction decoding section 151. Based on this decision, the specific application-purpose operation instruction issue control section 162 posts to the specific application-purpose operation instruction executing section 154 about whether it is possible to execute the specific application-purpose operation instruction or not.

When it is possible to execute the specific application-purpose operation instruction, the specific application-purpose operation instruction executing sections 154 execute this instruction immediately. When it is not possible to execute the specific application-purpose operation instruction, the specific application-purpose operation instruction executing sections 154 wait until the specific application-purpose operation instruction executing sections 154 receive a notice from the specific application-purpose operation instruction issue control section 162 that it is possible to execute the specific application-purpose operation instruction. When the specific application-purpose operation instruction executing sections 154 have completed the execution of the instruction, the specific application-purpose operation instruction executing sections 154 set a value corresponding to a result of the execution of the instruction, to the condition code register 171.

The branch/interruption return instruction control section 156 makes a decision as to whether an interruption is to be generated or not based on the value of the condition code register 171 and the value of the instruction field. When executing an interruption, the branch/interruption return instruction control section 156 posts the occurrence of an instruction to the interruption control section 104, and makes it generate an interruption.

However, providing an additional information processing apparatus such as a coprocessor to a processor core having the conventional structure as shown in FIG. 1 has the following problems. A combined use of a specific application-purpose operation instruction having a few stages of an operation pipeline with normal instructions brings about a reduction in the performance, as there exists input/output overhead due to the external I/O units of the processor. Therefore, there has been a drawback in that, such combined use of instructions requires substantially the same amount of cost as that of the combination of normal instructions.

Further, as the pipeline structures of specific application-purpose operation instructions are different between application fields, it is necessary to review the instruction issue control circuit when the pipeline is built into the processor. This makes it necessary to redesign the processor control section. As a result, there has been a problem in that the cost of developing the processor increases and the development period also increases when the processor is to be used as an IP (Intellectual Property) of an ASIC (Application Specific Integrated Circuit).

Further, in the conventional interruption processing shown in FIG. 4 to FIG. 6, there are following problems. When an overflow or an underflow has occurred, operation result is clipped based on an upper limit value or a lower limit value in the saturation operation instruction as one of specific application-purpose operation instructions effective for clipping data (summarizing within a certain range of values, such as for example, within a range from 0 to 255, or within a range from −32,768 and 32,767) that frequently occur in the multimedia processing, for example. Therefore, there has been a problem in that, it is not possible to carry out an operation exceptional processing. As a result, the debug operator must each time confirm the presence or absence of occurrence of overflow or an underflow. Thus, a large amount of labor and a long time are necessary for debugging.

Further, in the conventional interruption processing shown in FIG. 7 or FIG. 8, there are following problems. As it is necessary to check a specific application-purpose operation instruction whether a control dependency due to an exception occurs or not, a specific application-purpose operation instruction issue control circuit is necessary for each specific application-purpose operation instruction executing section. As a result, there has been a problem in that the circuit scale increases as the number of specific application-purpose operation instructions increases.

SUMMARY OF THE INVENTION

It an object of the present invention to provide an information processing apparatus capable of easily changing an operating unit for a specific application purpose, without changing the basic design of the control unit of a processor core.

It is a second object of the present invention to provide an information processing apparatus capable of carrying out an exceptional processing of an operation exception that occurs during the execution of a specific application-purpose operation instruction, and an exception processing method for the specific application-purpose operation instruction.

It is a third object of the present invention to provide an information processing apparatus capable of restricting an increase in the circuit scale to a minimum even if there are a large number of specific application-purpose operation instructions, or an information processing apparatus capable of increasing the number of specific application-purpose operation instructions while restricting an increase in the circuit scale.

According to the information processing apparatus of one aspect of the present invention, an operation instruction not prescribing a functional specification is provided as a specific application-purpose operation instruction in a processor core control unit, and an operating unit for a specific application purpose (a specific application-purpose instruction operating unit) for processing a specific application-purpose operation instruction is provided within this processor core. This specific application-purpose instruction operating unit has a structure capable of corresponding to a flexible pipeline structure, and is separately designed for each application field. Regarding the specific application-purpose operation instruction, data from a general-purpose register is supplied to the specific application-purpose instruction operating unit in the same system as that for normal instructions. Further, a result of this processing is written into a register in the same system as that of the operating unit for normal instructions.

Further, a register (an instruction result latency register) for prescribing a latency (hereinafter to be referred to as an instruction result latency) from when an instruction of a specific application-purpose instruction operating unit is issued till when a result can be utilized is provided within the processor core. Further, within the processor core, a register (an instruction issue latency register) is provided for prescribing a latency (hereinafter to be referred to as an instruction issue latency) relating to a restriction of an interval of issuing an instruction of the specific application-purpose instruction operating unit.

According to the above invention, operation instruction not prescribing a functional specification is provided as a specific application-purpose operation instruction in the processor core control unit, and a specific application-purpose instruction operating unit is provided within this processor core. This specific application-purpose instruction operating unit is separately designed for each application field. Therefore, as the specific application-purpose instruction operating unit is designed to satisfy each application field, it becomes possible to easily design the information processing apparatus for a specific application purpose at low cost, without changing the basic design of the control unit of the processor core.

Further, it is possible to prevent the issue of instructions at the timing when the contention of an output port occurs, by utilizing the output of the register for prescribing the instruction result latency. Therefore, it is possible to avoid the occurrence of a contention of the output port between instructions of different latencies with the succeeding instructions. Further, it is possible to prescribe the number of cycles from when a specific application-purpose operation instruction is issued till when it becomes possible to issue the same instruction, by utilizing a register that prescribes the instruction issue latency. Therefore, it is possible to prevent a contention of a resource with the preceding instructions.

A series of these controls can be carried out to make it easily possible to simultaneously issue a plurality of instructions by providing a similar circuit for each of functional units of instructions that can be issued simultaneously. Depending on the application field, an information processing apparatus may be dispatched without installing the operating unit. In this case, it is possible to easily avoid the problem by generating an exception as an uninstalled instruction by installing a flag register for showing whether the instruction can be issued or not.

According to the information processing apparatus and the exception processing method of another aspect of this invention, when an interruption processing program has been started after interrupting the execution of a program, a context is saved, and thereafter it is confirmed whether the operation mode has been set to a state that an operation exception that occurs during the execution of a specific application-purpose operation instruction is detected or not. When it has been set to a state that an operation exception is detected, it is further confirmed whether an operation exception during the execution of a specific application-purpose operation instruction has been detected or not. When an operation exception has already been detected, a specific application-purpose operation exception processing is carried out, and then a step break processing, a software break processing or an instruction break processing is carried out.

Then, the context is restored, and the processing is recovered from the interruption, and the break processing finishes. In the case of the step break, when it has been set to a state that an operation exception that occurs during the execution of a specific application-purpose operation instruction is detected, it may be confirmed whether an operation exception during the execution of a specific application-purpose operation instruction has been detected or not, only when the break of the processing is the specific application-purpose operation instruction.

According to the above invention, in the information processing apparatus having a specific application-purpose operation instruction, when a step break, a software break or an instruction break has occurred, it is possible to detect the occurrence of an operation exception such as an overflow due to the specific application-purpose operation instruction, and carry out an exceptional processing.

According to the information processing apparatus of still another aspect of this invention, it comprises an operation exception detection flag and a flag control unit. When an operation exception has been detected during the execution of a specific application-purpose operation instruction, a specific application-purpose operation instruction executing unit can set the operation exception detection flag to a valid state. When the operation exception detection flag has been set to a valid state during the execution of a trap instruction for generating an interruption, the flag control unit posts to the interruption control unit that an interruption due to the operation exception of the specific application-purpose operation instruction has occurred.

According to the above invention, the operation exception detection flag is set to a valid state when the specific application-purpose operation instruction executing unit has detected an operation exception during the execution of the specific application-purpose operation instruction. When it is necessary to confirm whether there is an operation exception of the specific application-purpose operation instruction or not, a trap instruction is issued. In this case, when the operation exception detection flag has been set to a valid state, the flag control unit posts to the interruption control unit that an interruption is generated. Thus, an interruption is generated.

In the above invention, the information processing apparatus may have a structure having an operation exception detection flag, a condition code register, and a flag control unit. In this structure, the flag control unit sets the condition code register based on a value held by the operation exception detection flag. A branch/interruption return instruction control unit makes a decision as to whether or not an interruption is generated during the execution of a trap instruction for generating an interruption, based on a value held in the condition code register and a value shown by an instruction field.

According to the above invention, the operation exception detection flag is set to a valid state when the specific application-purpose operation instruction executing unit has detected an operation exception during the execution of the specific application-purpose operation instruction. The condition code register is set by the flag control unit based on the value of the operation exception detection flag. When it is necessary to confirm whether there is an operation exception of the specific application-purpose operation instruction or not, a trap instruction is issued. In this case, the branch/interruption return instruction control unit makes a decision as to whether or not an interruption is generated, based on value of the instruction field and the value of the condition code register. When an interruption is to be generated, the branch/interruption return instruction control unit posts to the interruption control unit that an interruption is generated. Thus, an interruption is generated.

Other objects and features of this invention will become apparent from the following description with reference to the accompanying drawings.

BRIEF DESCRIPTION OF THE DRAWINGS

FIG. 25 is a block diagram showing a structure of an information processing apparatus to which an exception processing method of a specific application-purpose operation instruction relating to a fifth embodiment of the invention has been applied.

DESCRIPTION OF THE PREFERRED EMBODIMENTS

Preferred embodiments of the present invention will be explained in detail below with reference to FIG. 9 to FIG. 30.

Figure 9:
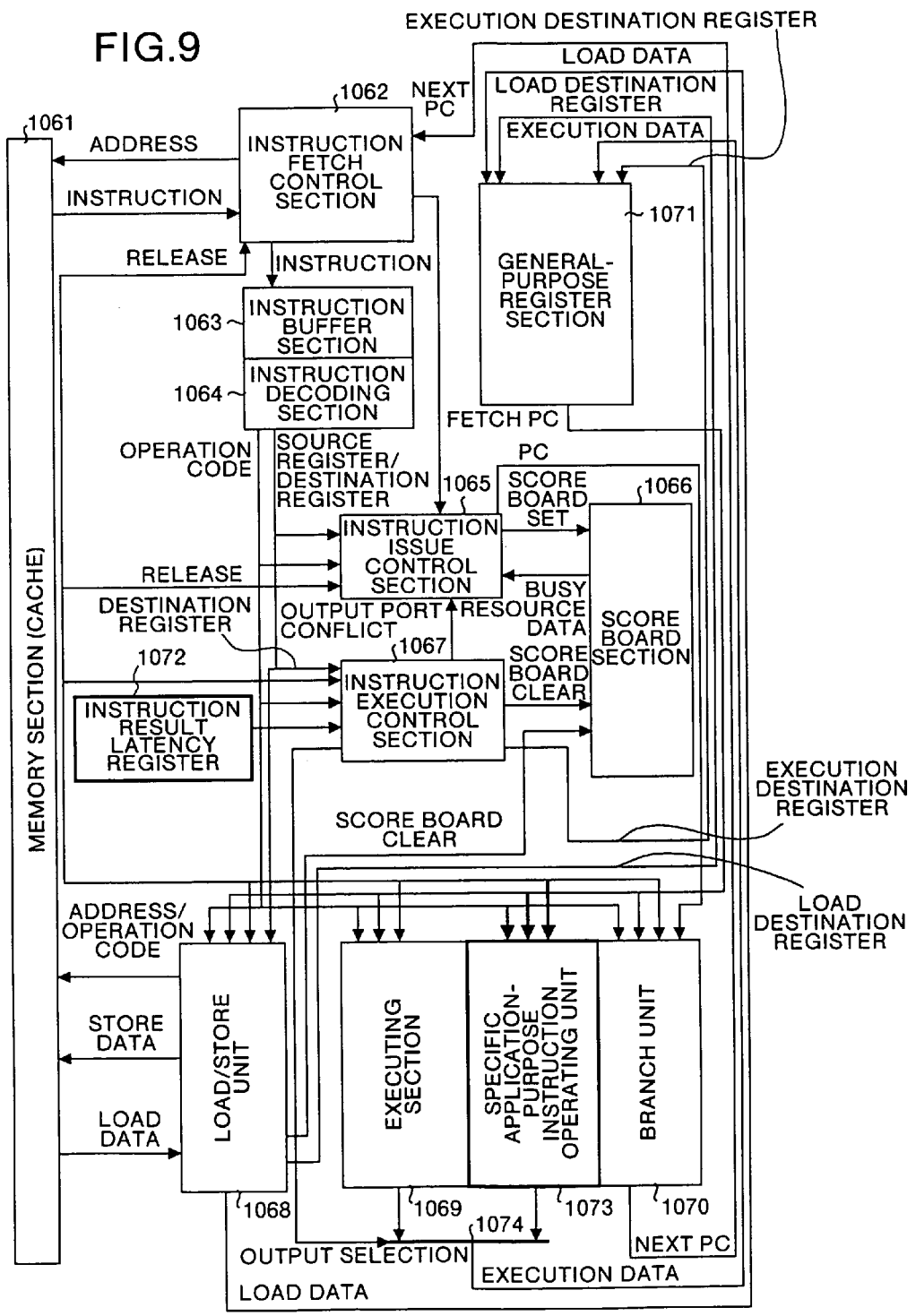
FIG. 9 is a block diagram showing one example of a structure of a processor core relating to a first embodiment of the present invention.

FIG. 9 is a block diagram showing one example of a structure of a processor core relating to a first embodiment of the present invention. This processor core comprises a memory section 1061, an instruction fetch control section 1062, an instruction buffer section 1063, an instruction decoding section 1064, an instruction issue control section 1065, a score board section 1066, an instruction execution control section 1067, a load/store unit 1068, an executing section 1069, a branch unit 1070, a general-purpose register section 1071, an instruction result latency register 1072, a specific application-purpose instruction operating unit 1073, and an operating unit output selector 1074.

The memory section 1061 includes an external memory and a memory circuit existing inside the chip. The memory section 1061 also includes a bus for a memory access and its control circuit, and a cache circuit.

The instruction fetch control section 1062 determines an address to be fetched next based on a branch address from the branch unit 1070 or an address of a fetch PC that is held inside the instruction fetch control section. The instruction fetch control section 1062 supplies the address of the instruction to be fetched next, to the memory section 1061, receives an instruction from the memory, and supplies an instruction to be executed next, to the instruction buffer section 1063.

The instruction buffer section 1063 is a pipeline register that operates in synchronism with an instruction fetch control, and temporarily holds an instruction before the issue of an instruction. The instruction decoding section 1064 is a circuit that decodes an instruction held in the instruction buffer section 1063, and posts information necessary for the operating unit and the operating unit control section. This information includes an operation code, a source register number, a destination register number, and information that shows whether these pieces of information are valid or not. An operation code of a specific application-purpose operation instruction is defined in the instruction decoding section 1064. The operation code of the specific application-purpose operation instruction is posted to each block through the same route as that for normal instructions.

The instruction issue control section 1065 receives an operation code, a source register number, a destination register number, and valid flags of these pieces of information, from the instruction decoding section 1064. The instruction issue control section 1065 also receives a register number that is currently being used and resource information from the score board section 1066. The instruction issue control section 1065 also receives output port contention control information from the instruction execution control section 1067, and makes a decision as to whether an instruction stored in the instruction buffer section 1063 can be issued or not.

When it is possible to issue the instruction, the instruction issue control section 1065 supplies a source register number for reading a source register to the register section 1071, and assigns the setting of a to be used flag of the destination register of the issued instruction or a to be used operating unit resource to the score board section 1066. At the same time, the instruction issue control section 1065 posts to the functional units 1068, 1069, 1073 and 1070 and the instruction execution control section 1067 that the instruction of the instruction decoding section 1064 can be released. Further, the instruction issue control section 1065 receives a PC value of the instruction stored in the instruction buffer section 1063 from the instruction fetch control section 1062, and supplies this PC value to the branch unit 1070.

The score board section 1066 holds a flag that shows whether each register number of the general-purpose register section 1071 is being used or not, and a flag that shows whether a resource that is necessary to occupy one or more cycle is being used or not. The score board section 1066 has a circuit that carries out the setting or clearing of a flag in response to a request for setting a flag from the instruction issue control section 1065 or a request for clearing a flag from the instruction execution control section 1067. A result of the flag is posted to the instruction issue control section 1065, and this is used as instruction issue control information.

The score board section 1066 is provided with a specific application-purpose instruction operating unit using flag for avoiding the succeeding specific application-purpose operation instructions from a resource contention when there are two or more instruction issue latencies. Then, in a similar manner to that of the instruction for occupying an operating unit of normal instructions, the score board section 1066 receives a request for setting a flag from the instruction issue control section 1065, and also receives a request for clearing a flag from the instruction execution control section 1067.

The instruction execution control section 1067 receives an operation code and a destination register number from the instruction decoding section 1064. Further, the instruction execution control section 1067 receives an instruction issue flag from the instruction issue control section 1065, and holds a valid flag of the instruction and a destination register number in synchronism with the execution of the instruction by the executing section 1069. The instruction execution control section 1067 has a counter for counting till the output becomes possible for an instruction occupying a resource, and holds a valid flag of a separate instruction and a destination register number.

Based on these valid flags of the instructions, the instruction execution control section 1067 generates a contention control signal for controlling the contention of an output port by the issue of the succeeding instructions, and posts it to the instruction issue control section 1065. The instruction execution control section 1067 outputs a destination register number and a request for clearing the register using flag to the score board section 1066, at the timing when the executing section 1069 outputs a result. The instruction issue control section 1067 further outputs a destination register number and a write request signal to the register section 1071. The instruction issue control section 1067 outputs a clear request signal for clearing the resource using flag, at the timing when the succeeding instructions that occupy the same operating unit can use the operating unit.

The load/store unit 1068 receives an operation code, a destination register number, and their valid flags from the instruction decoding section 1064. The load/store unit 1068 receives store data and source data from the general-purpose register section 1071. The load/store unit 1068 also receives instruction release information from the instruction issue control section 1065.

The load/store unit 1068 supplies an address and an operation code to the memory section 1061, and at the same time, supplies store data to the memory section 1061. The load/store unit 1068 also receives load data from the memory section 1061. When the loading has been successful, the load/store unit 1068 outputs a request for clearing the flag of using the destination register number to the score board section 1066. The load data is posted to the general-purpose register section 1071 together with the load destination register number and the write request signal, and they are written into the general-purpose register section 1071.

The executing section 1069 receives an operation code from the instruction decoding section 1064. Further, the executing section 1069 receives source data from the general-purpose register section 1071. The executing section 1069 also receives instruction release information from the instruction issue control section 1065. The executing section 1069 uses the operating unit according to the operation code. A result of the operation is output after a fixed number of cycles. A result of the operation is written into the register section 1071 in synchronism with the destination register number output from the instruction execution control section 1067.

The branch unit 1070 receives an operation code from the instruction decoding section 1064. Further, the branch unit 1070 receives source data from the general-purpose register section 1071. The branch unit 1070 also receives release information of the PC and the instruction from the instruction issue control section 1065. The branch unit 1070 processes a branch instruction, and posts a branch valid flag and a PC next to the branching to the instruction fetch control section 1062.

The general-purpose register section 1071 receives a source register number from the instruction issue control section 1065, and transmits the source data to the functional units 1068, 1069, 1073, and 1070 respectively. The general-purpose register section 1071 further receives a destination register number at the time of the loading and the load data, and writes them into the register. The general-purpose register section 1071 also receives a destination register number from the instruction issue control section 1067, and writes a result of the output of the executing section 1069.

The instruction result latency register 1072 is a rewritable specific application-purpose register that prescribes a number of cycles from when a specific application-purpose operation instruction is executed till when a result is obtained. An output of the instruction result latency register 1072 is received by the instruction issue control section 1067. The output of the instruction result latency register 1072 is used for the write control of writing a timing of completing the execution of a specific application-purpose operation instruction and result of this execution into the register, and for the issue control of issuing register-dependent succeeding instructions by the score board section 1066 and the instruction issue control section 1065.

The specific application-purpose instruction operating unit 1073 is an operating unit for a specific application purpose, and the specification of this operating unit is different for each application field. Further, the pipeline structure of the specific application-purpose instruction operating unit 1073 is different for each operating unit. However, as necessary conditions, there are constraints that a pipeline cycle of producing an output is fixed for each kind of operating unit and that a result output cycle is matched with output delay characteristics of other operating units.

The operating unit output selector 1074 is a selector that changes over between the output of the executing section 1069 as the operating unit for carrying out a normal operation and the output of the specific application-purpose instruction operating unit 1073. This changeover is carried out based on the output of the instruction execution control section 1067.

Figure 10:
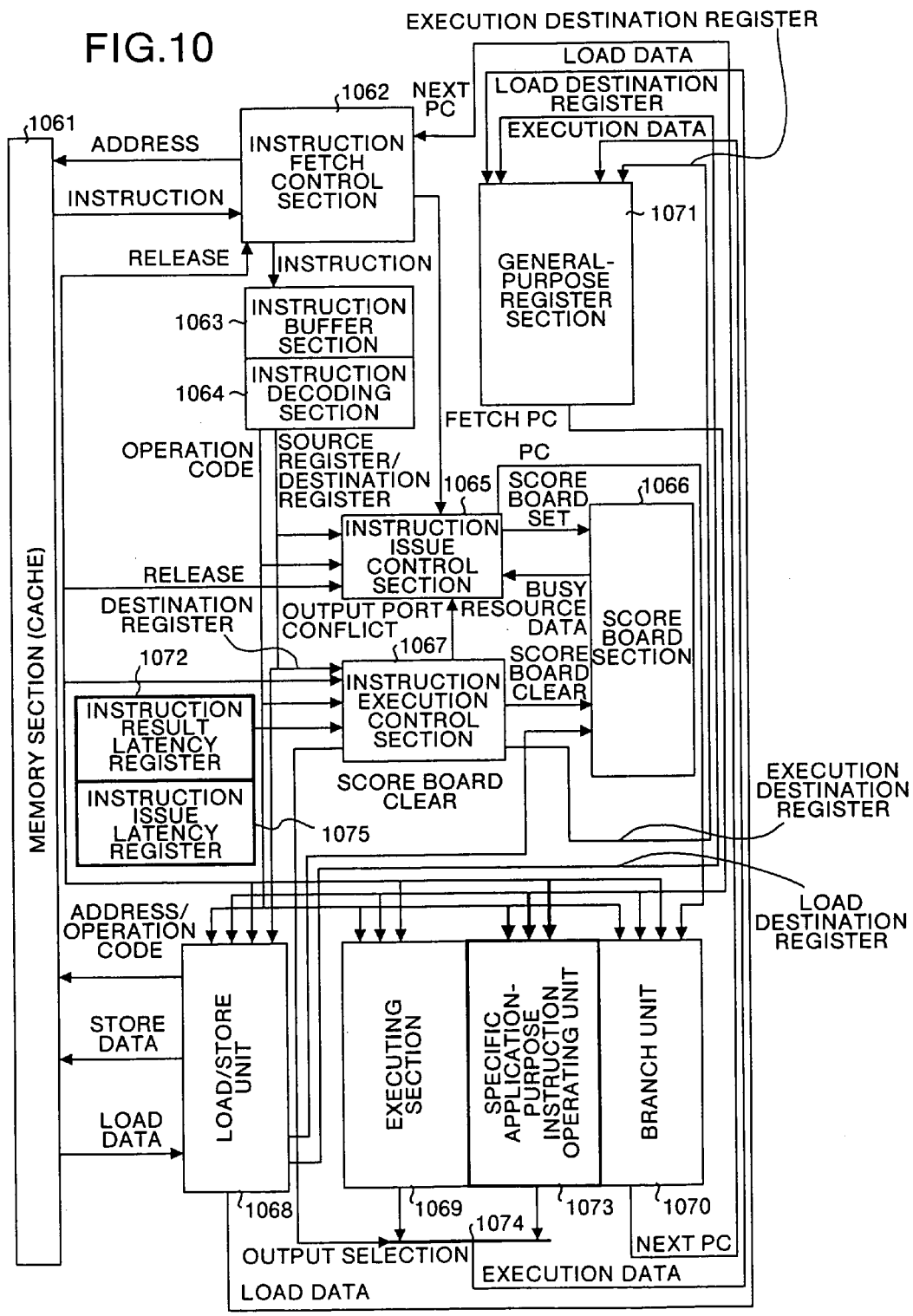
FIG. 10 is a block diagram showing another example of a structure of a processor core relating to the first embodiment.

FIG. 10 is a block diagram showing another example of the structure of the processor core relating to the present invention. The processor core shown in FIG. 10 is provided with an instruction issue latency register 1075 in addition to the structure of FIG. 9.

The instruction issue latency register 1075 is a register that describes a number of cycles till when it becomes possible to issue the same succeeding specific application-purpose operation instructions for the specific application-purpose operation instructions of the type that occupy the operating unit resource. The instruction issue latency register 1075 has a rewritable structure.

In place of the instruction issue latency register 1075, there may be provided a flag for changing over between the case where there is one instruction issue latency, that is, the specific application-purpose operation instruction can be issued each cycle, and the case where the instruction issue latency is the same as the value of the instruction result latency in order to occupy the resource until when a result is obtained.

Based on the above structure, it becomes possible to realize a changeover control for changing over between the case where the number of cycles is one until when the same succeeding instructions can be issued and the case where the instruction issue latency is the same as the value of the instruction result latency until when a result can be utilized. When the instruction issue latency register 1075 and the flag in place of the instruction issue latency register 1075 are not used, it can be regarded that one of these control methods has been selected.

Figure 11:
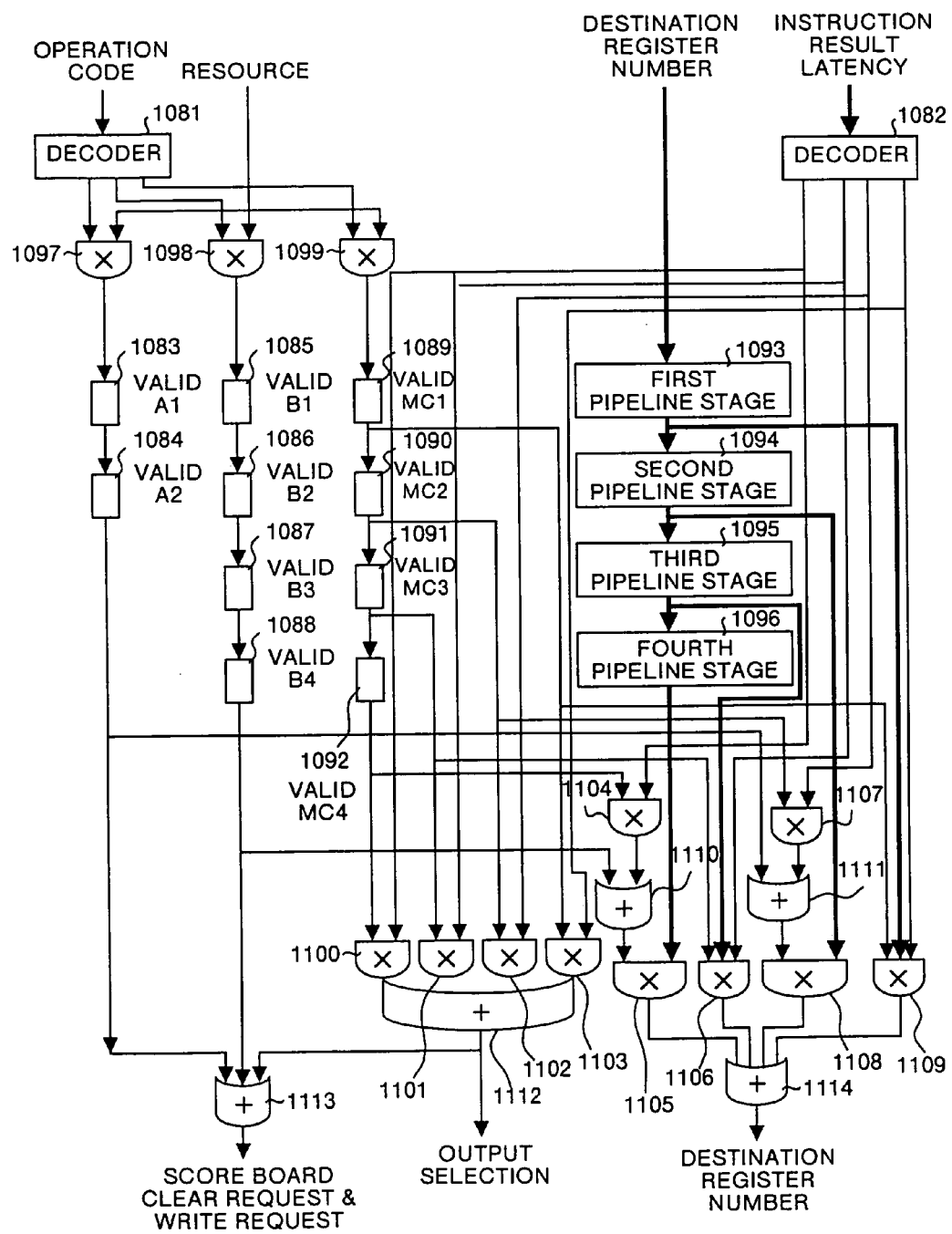
FIG. 11 is a diagram for explaining a structure and an operation of an instruction execution control section relating to the first embodiment.

FIG. 11 is a diagram for explaining a structure and an operation of the instruction execution control section 1067 of the case where a specific application-purpose operation instruction can be issued in each cycle in synchronism with the pipeline. FIG. 11 shows an extraction of portions specialized for the operation of one instruction among a plurality of instructions that can be issued simultaneously (this is also the same for FIG. 12). FIG. 11 shows characteristic portions relating to a control for writing a result of a normal operation instruction group A having two pipeline stages, a normal operation instruction group B having four pipeline stages, and a specific application-purpose operation instruction group MC having four pipeline stages, and a clear control of the score board. The present invention is not limited to the above-described number of pipeline stages.

The instruction execution control section 1067 is equipped with two decoders 1081 and 1082, valid flags (valid A1 and A2) 1083 and 1084 of a pipeline register relating to the instruction group A, valid flags (valid B1 to B4) 1085, 1086, 1087 and 1088 of a pipeline register relating to the instruction group B, valid flags (valid MC1 to MC4) 1089, 1090, 1091 and 1092 of a pipeline register relating to the instruction group MC, first to fourth pipeline stages 1093, 1094, 1095 and 1096, thirteen AND circuits 1097 to 1109, and five OR circuits 1110 to 1114.

The instruction execution control section 1067 receives an operation code, its valid flag, and a destination register number from an instruction decoding section 1064. Further, the instruction execution control section 1067 receives an instruction result latency from an instruction result latency register 1072.

The first decoder 1081 receives an operation code and its valid flag. The AND circuits 1097, 1098 and 1099 calculate AND logic of the valid flag and a release flag output from the first decoder 1081 respectively. The valid flags 1083, 1085 and 1089 of valid A1, B1 and MC1 store the values output from the AND circuits 1097, 1098 and 1099 respectively. Further, the first pipeline stage 1093 stores a destination register number. These pieces of information are proceeded to the next pipeline register for each one stage per one cycle.

The second decoder 1082 receives an instruction result latency. The AND circuit 1100 calculates AND logic of an output value of the second decoder 1082 and the valid flag 1092 of valid MC4. The AND circuit 1101 calculates AND logic of the output of the second decoder 1082 and the valid flag 1091 of valid MC3. The AND circuit 1102 calculates AND logic of the output of the second decoder 1082 and the valid flag 1090 of valid MC2. The AND circuit 1103 calculates AND logic of the output of the second decoder 1082 and the valid flag 1089 of valid MC1.

The OR circuit 1112 calculates OR logic of outputs of the AND circuits 1100, 1101, 1102 and 1103, and outputs a control signal (an output selection signal) to the operating unit output selector 1074. The OR circuit 1113 calculates OR logic of the valid flag 1084 of valid A2, the valid flag 1088 of valid B4 and an output selection signal of the valid flag 1088. The OR circuit 1113 outputs a score board clear request signal to the score board 1066, and outputs a write request signal to the register section 1071.

The AND circuit 1104 calculates AND logic of an output value of the second decoder 1082 and the valid flag 1092 of valid MC4. The OR circuit 1110 calculates OR logic of an output of the AND circuit 1104 and the valid flag 1088 of valid B4. The AND circuit 1105 calculates AND logic of an output of the OR circuit 1110 and the fourth pipeline stage 1096. The AND circuit 1106 calculates AND logic of the output value of the second decoder 1082, the valid flag 1091 of valid MC3, and the third pipeline stage 1095.

The AND circuit 1107 calculates AND logic of the output of the second decoder 1082 and the valid flag 1090 of valid MC2. The OR circuit 1111 calculates OR logic of the output of the AND circuit 1107 and the valid flag 1084 of valid A2. The AND circuit 1108 calculates AND logic of the output of the OR circuit 1111 and the second pipeline stage 1094. The AND circuit 1109 calculates AND logic of the output of the second decoder 1082, the valid flag 1089 of valid MC1, and the first pipeline stage 1093. The OR circuit 1114 calculates OR logic of the outputs of the AND circuits 1105, 1106, 1108 and 1109, and outputs a destination register number to the score board section 1066 and the register portion 1071.

Based on the above-described structure, it is possible to select a destination register number in the pipeline register and a valid flag of the instruction from the instruction result latency register 1072. Then, in a similar manner to that of the conventional practice, a timing of simultaneously using the output port is selected from valid flags from the instruction result latency register 1072, and a control signal for restricting the issue of each instruction group is posted to the instruction issue control section 1065. Thus, it becomes possible to restrict the contention of the output port with the specific application-purpose operation instruction.

Figure 12:
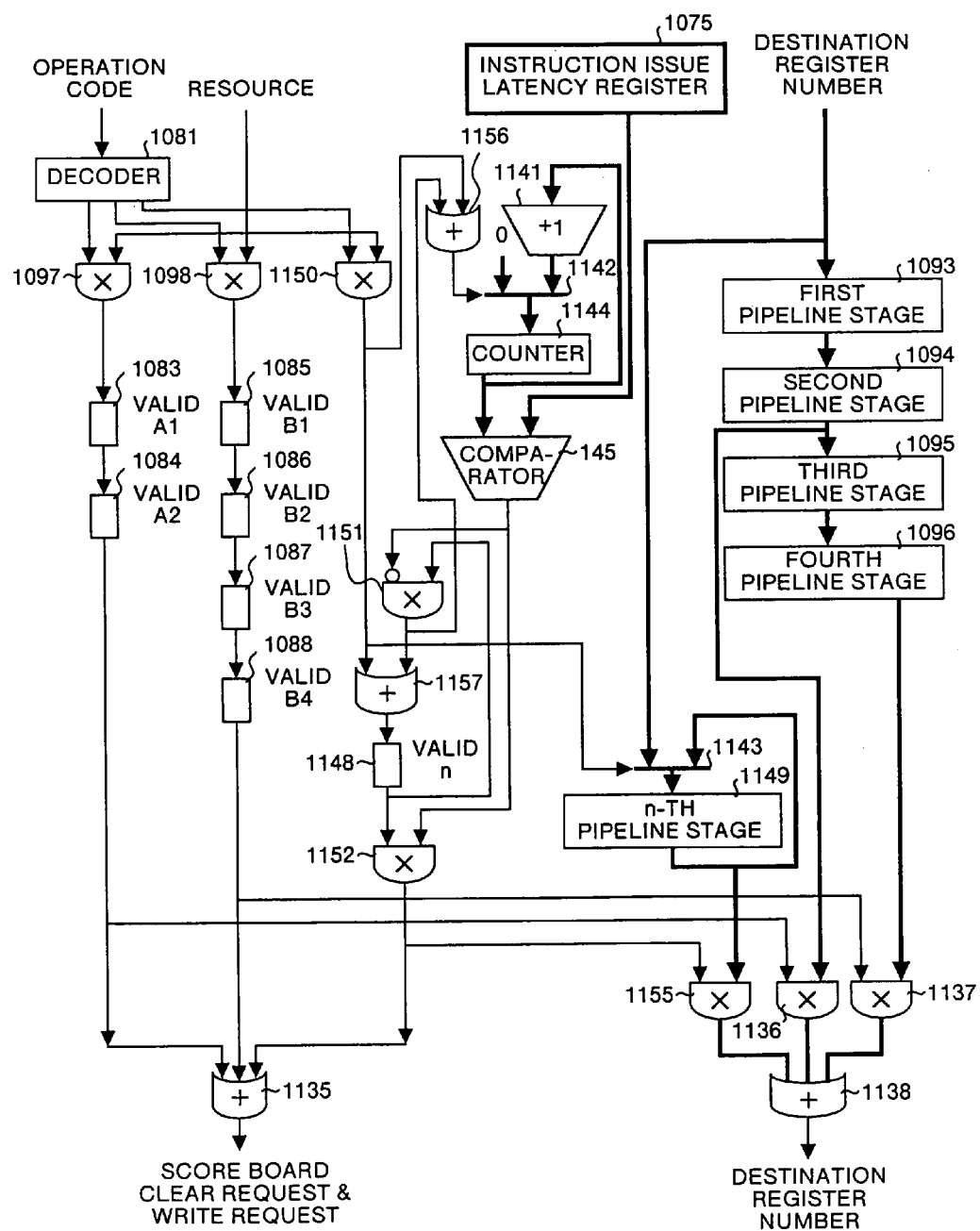
FIG. 12 is a diagram for explaining a structure and operation of the instruction execution control section relating to the first embodiment.

FIG. 12 is a diagram for explaining a structure and an operation of the instruction execution control section 1067 that occupies the resource. FIG. 12 shows characteristic portions relating to a control for writing a result of an instruction group A having two pipeline stages and an instruction group B having four pipeline stages, and a clear control of the score board. The present invention is not limited to the above-described number of pipeline stages.

This instruction execution control section 1067 is equipped with the decoder 1081, valid flags 1083 and 1084 of valid A1 and A2, valid flags 1085, 1086, 1087 and 1088 of valid B1 to B4 respectively, first to fourth pipeline stages 1093, 1094, 1095 and 1096, an adder 1141, two selectors 1142 and 1143, a counter 1144, a comparator 1145, a valid flag 1148 of valid n, an n-th stage 1149 of the pipeline register, eight AND circuits 1097, 1098, 1136, 1137, 1150, 1151, 1152 and 1155, and four OR circuits 1135, 1138, 1156 and 1157.

The decoder 1081 receives an operation code and its valid flag. The AND circuits 1097, 1098 and 1150 calculate AND logic of a valid flag output from the decoder 1081 and a release flag respectively. The valid flags 1083 and 1085 of valid A1 and B1 store output values of the AND circuits 1097 and 1098 respectively. Further, the first pipeline stage 1093 stores a destination register number. These pieces of information are proceeded to the next pipeline register for each one stage per one cycle.

The counter 1144 stores the value of the output from the counter 1144 incremented by one by the adder 141. The comparator 1145 compares the output of the counter 1144 with a value stored in the instruction issue latency register 1075. A result of the comparison by the comparator 1145 is input into a low active input terminal of the AND circuit 1151.

An output of the AND circuit 1151 is input into the OR circuits 1156 and the OR circuit 1157. The OR circuit 1156 calculates OR logic of the output of the AND circuits 1150 and 1151, and outputs the result to the first selector 1142. The first selector 1142 resets the counter 1144 according to the received value. The OR circuit 1157 calculates OR logic of the output of the AND circuits 1150 and 1151, and writes a result into the valid flag 1148 of valid n. Output of the valid flag 1148 of valid n is input into the AND circuit 1152 and is also input into the other input terminal of the AND circuit 1151.

Result of the comparison by the comparator 1145 is input into the other input terminal of the AND circuit 1152. Output of the AND circuit 1152 is input into the OR circuit 1135. The OR circuit 1135 calculates OR logic of a valid flag of each instruction group and an output of the AND circuit 1152. The OR circuit 1135 outputs a score board clear request signal to a score board section 1066 and outputs a write request signal to a register section 1071.

The second selector 1143 selects either a destination register number stored in the n-th stage 1149 of the pipeline register or a destination register number received from the instruction decoding section 1064. This selection is carried out according to the output of the AND circuit 1150, and the selected number is stored into the n-th stage 1149 of the pipeline register. The AND circuit 1155 calculates AND logic of a destination register number stored in the n-th stage 1149 of the pipeline register and an output of the AND circuit 1152.

The AND circuit 1136 calculates AND logic of a destination register number stored in the second pipeline stage 1094 and the valid flag 1084 of valid A2. The AND circuit 1137 calculates AND logic of a destination register number stored in the fourth pipeline stage 1096 and the valid flag 1088 of valid B4. The OR circuit 1138 calculates OR logic of outputs of the AND circuits 1155, 1136 and 1137, and outputs a destination register number to the score board section 1066 and the register section 1071 respectively.

Based on the above-described structure, the counter 1144 holds the valid flag of the instruction and the destination register until when the number of cycles become the one stored in the instruction issue latency register 1075. When the value of the counter 1144 reaches the number of cycles stored in the instruction issue latency register 1075, a control similar to that of a normal instruction is carried out.

The instruction execution control section 1067 has a structure of outputting instruction issue restriction signals (suppress A and suppress B) to the instruction issue control section 1065. However, in FIG. 12, circuits for outputting the instruction issue restriction signals (suppress A and suppress B) are omitted.

According to the above-described first embodiment, an operation instruction not prescribing a functional specification is provided as a specific application-purpose operation instruction in a processor core control section, and the specific application-purpose instruction operating unit 1073 for processing a specific application-purpose operation instruction is provided within this processor core. This specific application-purpose instruction operating unit 1073 is separately designed for each application field. Therefore, based on the designing of the specific application-purpose instruction operating unit 1073 suitable for each application field, it becomes possible to design the information processing apparatus for a specific application purpose easily and at low cost, without changing the basic design of the control section of the processor core.

Further, according to the first embodiment, it is possible to prevent the issuing of instructions at the timing when the contention of an output port occurs, by utilizing the instruction result latency register 1072. As a result, it is possible to avoid the occurrence of a contention of an output port between instructions of different latencies with the succeeding instructions. Further, it is possible to prescribe the number of cycles from when a specific application-purpose operation instruction is issued till when it becomes possible to issue the same instruction, by utilizing the instruction issue latency register 1075. As a result, it is possible to prevent a contention of a resource with the preceding instructions.

In the above first embodiment, the number of stages of the pipeline is not limited to two or four.

Figure 13:
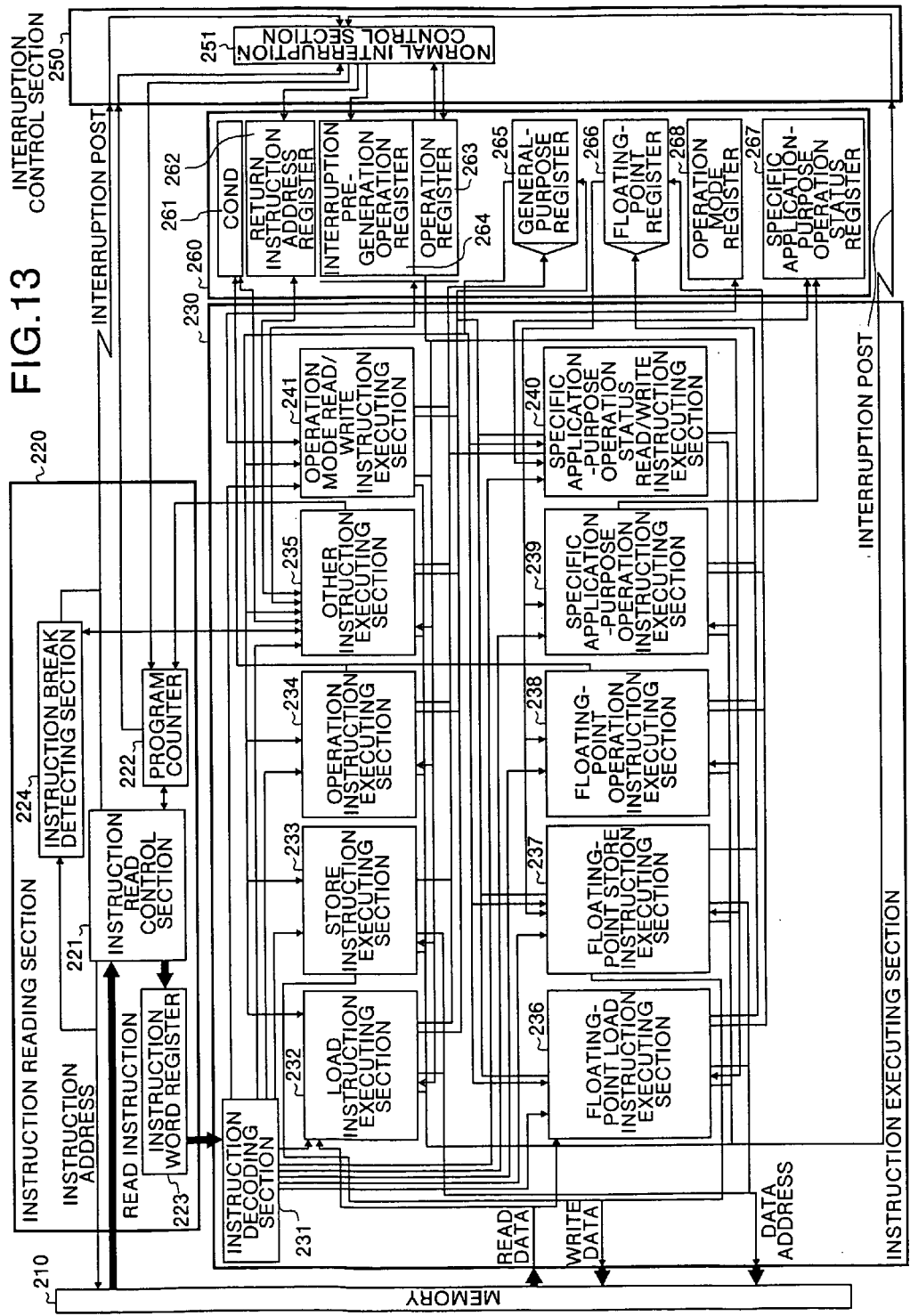
FIG. 13 is a block diagram showing a structure of an information processing apparatus to which an exception processing method of a specific application-purpose operation instruction r elating to a second embodiment of the invention has been applied.

The block diagram in FIG. 13 shows a structure of the information processing apparatus to which an exception processing method of a specific application-purpose operation instruction relating to a second embodiment of the invention has been applied. This information processing apparatus is equipped with a memory 210, an instruction reading section 220 that reads an instruction word from the memory 210, an instruction executing section 230 that executes an instruction supplied from the instruction reading section 220, and an interruption control section 250. The information processing apparatus is further equipped with a register control section 260 that controls a writing from the instruction reading section 220, the instruction executing section 230, and the interruption control section 250.

The memory 210 includes an external memory, a memory circuit existing inside the chip, a bus for a memory access and its control circuit, and a cache circuit. The instruction reading section 220 is equipped with an instruction read control section 221, a program counter 222, an instruction word register 223, and an instruction break detecting section 224.

The instruction executing section 230 is equipped with an instruction decoding section 231, a load instruction executing section 232, a store instruction executing section 233, an operation instruction executing section 234, an other instruction executing section 235, a floating-point load instruction executing section 236, a floating-point store instruction executing section 237, a floating-point operation instruction executing section 238, a specific application-purpose operation instruction executing section 239, a specific application-purpose operation status read/write instruction executing section 240, and an operation mode read/write instruction executing section 241.

The interruption control section 250 includes a normal interruption control section 251. The register control section 260 is equipped with a COND 261, a register 262 which holds an instruction address for returning from an interruption (hereinafter to be referred to as "a return instruction address register"), a register 263 which holds an operation state of a processor (hereinafter to be referred to as "an operation register"), a register 264 which holds an operation state of the processor before generating an interruption (hereinafter to be referred to as "an interruption pre-generation operation register"), a general-purpose register 265, a floating-point register 266, a specific application-purpose operation status register 267, and an operation mode register 268.

The instruction reading section 220 will be explained in detail next. The program counter 222 is the address of an instruction word to be read out. The instruction read control section 221 reads an instruction word corresponding to the value of the program counter 222 from the memory 210, and writes this instruction word into the instruction word register 223. When a branch destination address has been supplied from the instruction executing section 230, or when a branch destination address corresponding to a generated interruption or an exception has been supplied from the interruption control section 250, the instruction read control section 221 writes the value of the branch destination address into the program counter 222. In other cases, the read control section 221 increments the program counter 222 in order to show the next instruction word.

When the instruction read control section 221 has detected an interruption when reading an instruction word, the instruction read control section 221 posts to the interruption control section 250 that an interruption is detected. The instruction word register 223 holds the instruction word that has been read by the instruction read control section 221, and supplies this instruction word to the instruction executing section 230.

Figure 14:
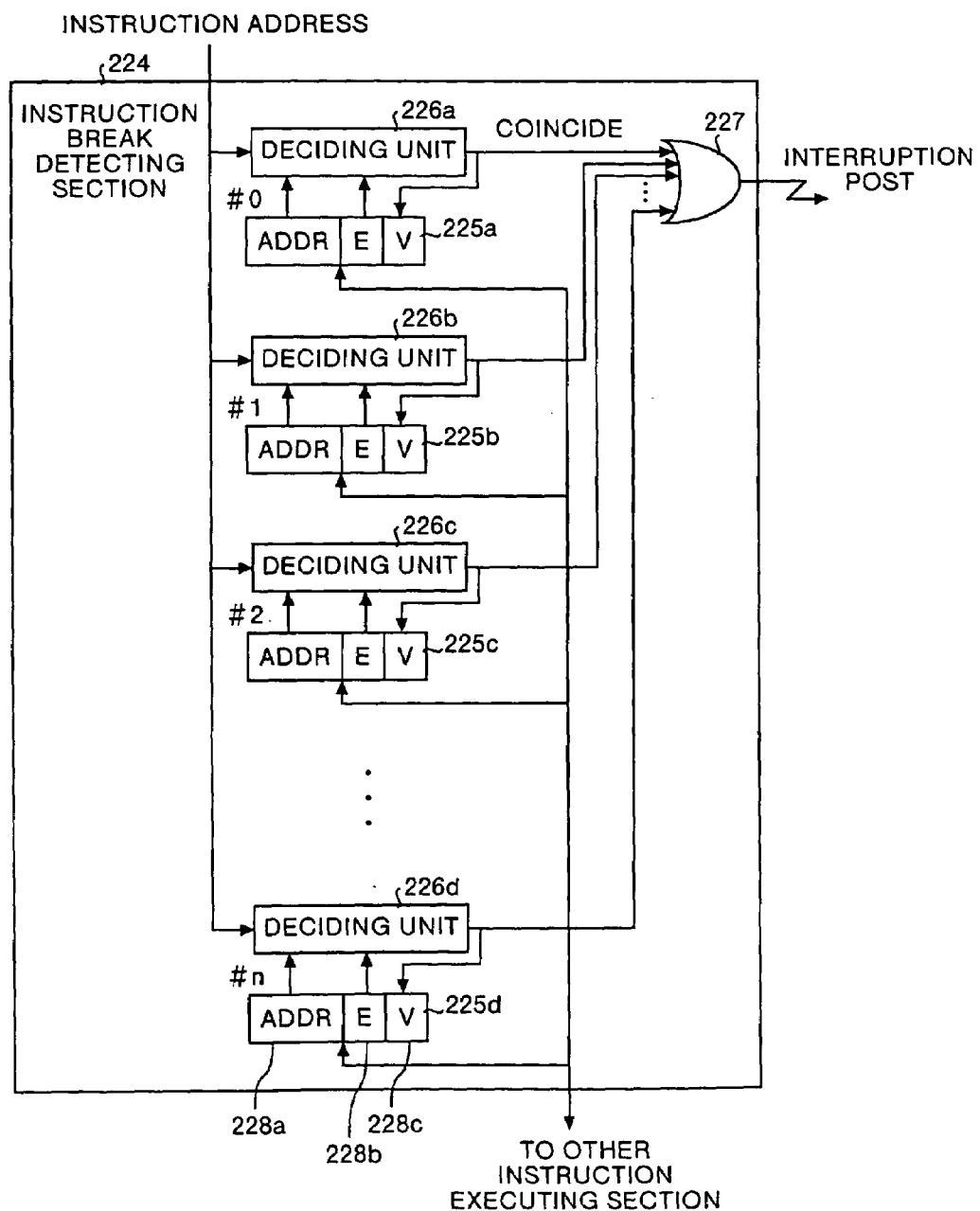
FIG. 14 is a block diagram showing one example of an instruction break detecting section relating to the second embodiment.

The instruction break detecting section 224 detects whether the address for reading an instruction word is established as an instruction break or not. When the instruction break has been detected, the instruction break detecting section 224 posts to the interruption control section 250 that the instruction break has been detected. FIG. 14 is a block diagram showing one example of the instruction break detecting section 224. The instruction break detecting section 224 includes a plurality of sets of instruction breakpoint registers 225a to 225d, deciding units 226a to 226d, and OR circuit 227.

Each of the instruction breakpoint registers 225a to 225d is provided with an ADDR field 228a, an E field 228b and a V field 228c respectively. The ADDR field 228a holds the address of the breakpoint. The E field 228b holds a value that shows whether an instruction break operation is valid or not. For example, the E field 228b holds "0 (zero)" when the instruction break operation is not valid, and holds "1" when the instruction break operation is valid. The V field 228c holds a value that shows whether an instruction break has been detected or not. For example, the V field 228c holds "0 (zero)" when the instruction break has not been detected, and holds "1" when the instruction break has been detected.

The deciding units 226a to 226d decide whether an instruction break condition has been established or not. When the instruction address of an instruction to be read coincides with the value of the ADDR field 228a of each of the instruction breakpoint registers 225a to 225d, the corresponding one of the deciding units 226a to 226d sets the value of the corresponding V field 228c to 11111 and outputs "1" to the OR circuit 227 as a coincidence signal. Then, the OR circuit 227 issues an interruption post to the interruption control section 250 to post that the instruction break has been established.

The instruction executing section 230 will be explained in detail next. The instruction decoding section 231 analyzes an instruction supplied from the instruction reading section 220, and supplies the instruction to the corresponding instruction executing section. In other words, the instruction decoding section 231 supplies a load instruction to the load instruction executing section 232, supplies a store instruction to the store instruction executing section 233, and supplies an operation instruction and a comparison instruction to the operation executing section 234.

The instruction decoding section 231 supplies to the other instruction executing section 235, a branch instruction, a conditional branch instruction, an interruption return instruction, a breakpoint instruction, a read or write instruction for reading or writing the operation register 263, a read or write instruction for reading or writing the interruption pre-generation operation register 264, and a read or write instruction for reading or writing the instruction breakpoint registers 225a to 225d of the instruction break detecting section 224.

The instruction decoding section 231 supplies a floating-point load instruction to the floating-point load instruction executing section 236, supplies a floating-point store instruction to the floating-point store instruction executing section 237, supplies a floating-point operation instruction and a floating-point comparison instruction to the floating-point operation instruction executing section 238, and supplies a specific application-purpose operation instruction to the specific application-purpose operation instruction executing section 239, respectively. Further, the instruction decoding section 231 supplies to the specific application-purpose operation status read/write executing section 240, a read or write instruction for reading or writing the specific application-purpose operation status register 267, and supplies to the operation mode read/write instruction executing section 241, a read or write instruction for reading or writing the operation mode register 268, respectively.

When the specific application-purpose operation status read/write executing section 240 has received a read instruction for reading the specific application-purpose operation status register 267 from the instruction decoding section 231, it reads the specific application-purpose operation status register 267, and writes a result of the reading into the general-purpose register 265. When the specific application-purpose operation status read/write executing section 240 has received a write instruction for writing to the specific application-purpose operation status register 267 from the instruction decoding section 231, it reads the general-purpose register 265, and writes a result of the reading into the specific application-purpose operation status register 267.

Further, when the specific application-purpose operation status read/write executing section 240 has detected an interruption during the execution of an instruction, it posts to the interruption control section 250 that the interruption has been detected. When the mode is a single step mode after the execution of the instruction, the specific application-purpose operation status read/write executing section 240 posts to the interruption control section 250 that a step break has been detected.

When the operation mode read/write instruction executing section 241 has received a read instruction for reading the operation mode register 268 from the instruction decoding section 231, it reads the operation mode register 268, and writes a result of the reading into the general-purpose register 265. When the operation mode read/write instruction executing section 241 has received a write instruction for writing to the operation mode register 268 from the instruction decoding section 231, reads the general-purpose register 265, and writes a result of the reading into the operation mode register 268.

Further, when the operation mode read/write instruction executing section 241 has detected an interruption during the execution of an instruction, it posts to the interruption control section 250 that the interruption has been detected. When the mode is a single step mode after the execution of the instruction, the operation mode read/write instruction executing section 241 posts to the interruption control section 250 that a step break has been detected.

When the load instruction executing section 232 has received a load instruction from the instruction decoding section 231, it obtains a effective address based on the value read from the general-purpose register 265. The load instruction executing section 232 then reads an area corresponding to this effective address from the memory 210, and writes a result of the reading into the general-purpose register 265. Further, when the load instruction executing section 232 has detected an interruption during the execution of an instruction, it posts to the interruption control section 250 that the interruption has been detected. When the mode is a single step mode after the execution of the instruction, the load instruction executing section 232 posts to the interruption control section 250 that a step break has been detected.

When the store instruction executing section 233 has received a store instruction from the instruction decoding section 231, it obtains a effective address based on the value read from the general-purpose register 265. The store instruction executing section 233 then reads the general-purpose register 265, and writes a result of the reading into the area corresponding to the effective address of the memory 210. Further, when the store instruction executing section 233 has detected an interruption during the execution of an instruction, it posts to the interruption control section 250 that the interruption has been detected. When the mode is a single step mode after the execution of the instruction, the store instruction executing section 233 posts to the interruption control section 250 that a step break has been detected.

When the operation instruction executing section 234 has received an operation instruction from the instruction decoding section 231, it carries out an operation based on the value read from the general-purpose register 265. The operation instruction executing section 234 writes a result of the reading into the general-purpose register 265. Further, when the operation instruction executing section 234 has received a comparison instruction from the instruction decoding section 231, it carries out a comparison based on the value read from the general-purpose register 265. The operation instruction executing section 234 writes a value showing a truth or false as a result of the comparison, into the COND 261. Further, when the operation instruction executing section 234 has detected an interruption during the execution of an instruction, it posts to the interruption control section 250 that the interruption has been detected. When the mode is a single step mode after the execution of the instruction, the operation instruction executing section 234 posts to the interruption control section 250 that a step break has been detected.

When the other instruction executing section 235 has received a branch instruction from the instruction decoding section 231, it supplies a branch destination address to the instruction reading section 220. Further, when the other instruction executing section 235 has received a conditional branch instruction from the instruction decoding section 231, it supplies a branch destination address to the instruction reading section 220 when the value of the COND 261 is a value showing the truth.

Further, when the other instruction executing section 235 has received an interruption return instruction from the instruction decoding section 231, it writes the value of the interruption pre-generation operation register 264 into the operation register 263. Similarly, the other instruction executing section 235 reads the return instruction address register 262, and writes a result of the reading into the instruction reading section 220 as a branch destination address. Further, when the other instruction executing section 235 has received a breakpoint instruction from the instruction decoding section 231, it posts to the interruption control section 250 that a software break has been established.

Further, when the other instruction executing section 235 has received an instruction for reading from the instruction decoding section 231, the operation register 263, the interruption pre-generation operation register 264, or the instruction breakpoint registers 225a to 225d, it reads the operation register 263, the interruption pre-generation operation register 264, or the instruction breakpoint registers 225a to 225d of the instruction break detecting section 224. The other instruction executing section 235 writes the result of the reading into the general-purpose register 265.

Further, when the other instruction executing section 235 has received an instruction for writing from the instruction decoding section 231, the operation register 263, the interruption pre-generation operation register 264, or the instruction breakpoint registers 225a to 225d, it reads the general-purpose register 265. Then, the other instruction executing section 235 writes the result of the writing into the operation register 263, the interruption pre-generation operation register 264, or the instruction breakpoint registers 225a to 225d of the instruction break detecting section 224.

Further, when the other instruction executing section 235 has detected an interruption during the execution of an instruction, it posts to the interruption control section 250 that the interruption has been detected. When the mode is a single step mode after the execution of the instruction, the other instruction executing section 235 posts to the interruption control section 250 that a step break has been detected.

When the floating-point load instruction executing section 236 has received a floating-point load instruction from the instruction decoding section 231, it obtains a effective address based on the value read from the general-purpose register 265. The floating-point load instruction executing section 236 then reads the area corresponding to the effective address of the memory 210, and writes a result of the reading into the floating-point register 266. Further, when the floating-point load instruction executing section 236 has detected an interruption during the execution of an instruction, the floating-point load instruction executing section 236 posts to the interruption control section 250 that the interruption has been detected. When the mode is a single step mode after the execution of the instruction, the floating-point load instruction executing section 236 posts to the interruption control section 250 that a step break has been detected.

When the floating-point store instruction executing section 237 has received a floating-point store instruction from the instruction decoding section 231, it obtains a effective address based on the value read from the general-purpose register 265. The floating-point store instruction executing section 237 then reads the floating-point register 266, and writes a result of the reading into the area corresponding to the effective address of the memory 210. Further, when the floating-point store instruction executing section 237 has detected an interruption during the execution of an instruction, it posts to the interruption control section 250 that the interruption has been detected. When the mode is a single step mode after the execution of the instruction, the floating-point store instruction executing section 237 posts to the interruption control section 250 that a step break has been detected.

When the floating-point operation instruction executing section 238 has received a floating-point operation instruction from the instruction decoding section 231, it carries out an operation based on the value read from the floating-point register 266. The floating-point operation instruction executing section 238 then writes a result of the reading into the floating-point register 266. Further, when the floating-point operation instruction executing section 238 has received a floating-point comparison instruction from the instruction decoding section 231, it carries out a comparison based on the value read from the floating-point register 266. The floating-point operation instruction executing section 238 writes a value showing a truth or false as a result of the comparison, into the COND 261. Further, when the floating-point operation instruction executing section 238 has detected an interruption during the execution of an instruction, it posts to the interruption control section 250 that the interruption has been detected. When the mode is a single step mode after the execution of the instruction, the floating-point operation instruction executing section 238 posts to the interruption control section 250 that a step break has been detected.

When the specific application-purpose operation instruction executing section 239 has received a specific application-purpose operation instruction from the instruction decoding section 231, it carries out an operation based on the value read from the floating-point register 266. The specific application-purpose operation instruction executing section 239 writes the result of the reading into the floating-point register 266. Further, when an operation exception such as an overflow has occurred during the operation, the specific application-purpose operation instruction executing section 236 writes a value showing the occurrence of the operation exception, into the specific application-purpose operation status register 267. When the mode is a single step mode after the execution of the instruction, the specific application-purpose operation instruction executing section 239 posts to the interruption control section 250 that a step break has been detected.

The register control section 260 will be explained in detail below. The specific application-purpose operation status register 267 holds a value that indicates whether an operation exception such as an overflow has been detected or not during the execution of a specific application-purpose operation instruction. The operation mode register 268 holds a value that indicates whether an operation exception that occurs during the execution of a specific application-purpose operation instruction is to be detected or not. For example, the value of the register 268 is set to "0 (zero)" when an operation exception that occurs during the execution of a specific application-purpose operation instruction is not to be detected. On the other hand, the value of the register 268 is set to "1" when an operation exception that occurs during the execution of a specific application-purpose operation instruction is to be detected. The return instruction address register 262 and the interruption pre-generation operation register 264 are set when an interruption has been generated.

Figure 15:
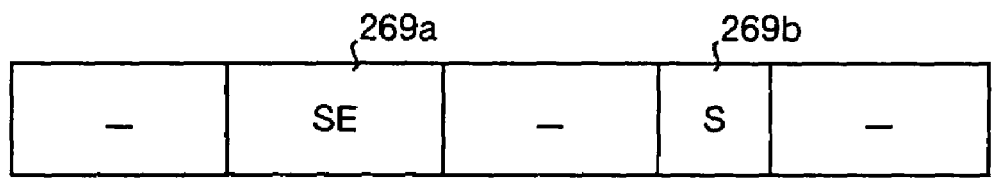
FIG. 15 is a configuration diagram showing one example of an operation register relating to the second embodiment.

FIG. 15 shows an example of the configuration of the operation register 263. The operation register 263 is provided with a SE field 269*a* and a S field 269*b*. The SE field 269*a* holds a value that indicates whether the mode is a single step mode or not. For example, the SE field 269*a* holds "0 (zero)" when the mode is not a single step mode, and holds "1" when the mode is a single step mode. Therefore, when the value of the SE field 269*a* is "1", a step break interruption is generated after the execution of an instruction. The S field 269*b* holds a value that indicates whether the state is a supervisor state or not. For example, the S field 269*b* holds "0 (zero)" when the state is a user state, and holds "1" when the state is a supervisor state.

Figure 16:
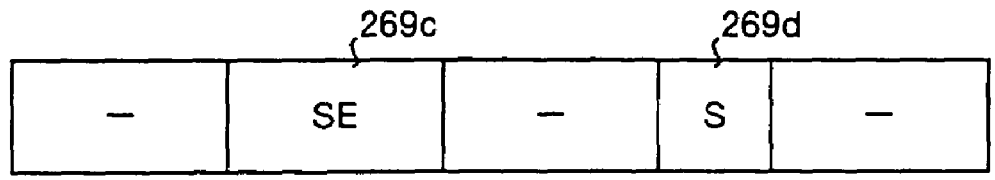
FIG. 16 is a configuration diagram showing one example of an interruption pre-generation operation register relating to the second embodiment.

FIG. 16 shows an example of the configuration of the interruption pre-generation operation register 264. The interruption pre-generation operation register 264 is provided with a SE field 269*c* and a S field 269*d*. The SE field 269*c* holds a value that indicates whether the state before the generation of an interruption has been a single step mode or not. For example, the SE field 269*c* holds "0 (zero)" when the state before the generation of an interruption has not been a single step mode, and holds "1" when the state before the generation of an interruption has been a single step mode. The S field 269*d* holds a value that indicates whether the state before the generation of an interruption has been a supervisor state or not. For example, the S field 269*d* holds "0 (zero)" when the state before the generation of an interruption has been a user state, and holds "1" when the state before the generation of an interruption has been a supervisor state.

The normal interruption control section 251 of the interruption control section 250 will be explained in detail below. When the normal interruption control section 251 has received an interruption post from the instruction reading section 220 or the instruction issuing section 230, it writes an instruction address for returning from the interruption into the return instruction address register 262, writes a state of the processor before the generation of the interruption into the interruption pre-generation operation register 264, and writes a state of the processor corresponding to the generated interruption into the operation register 263. The normal interruption control section 251 supplies a branch destination address corresponding to the generated interruption, to the instruction reading section 220.

Figure 17:
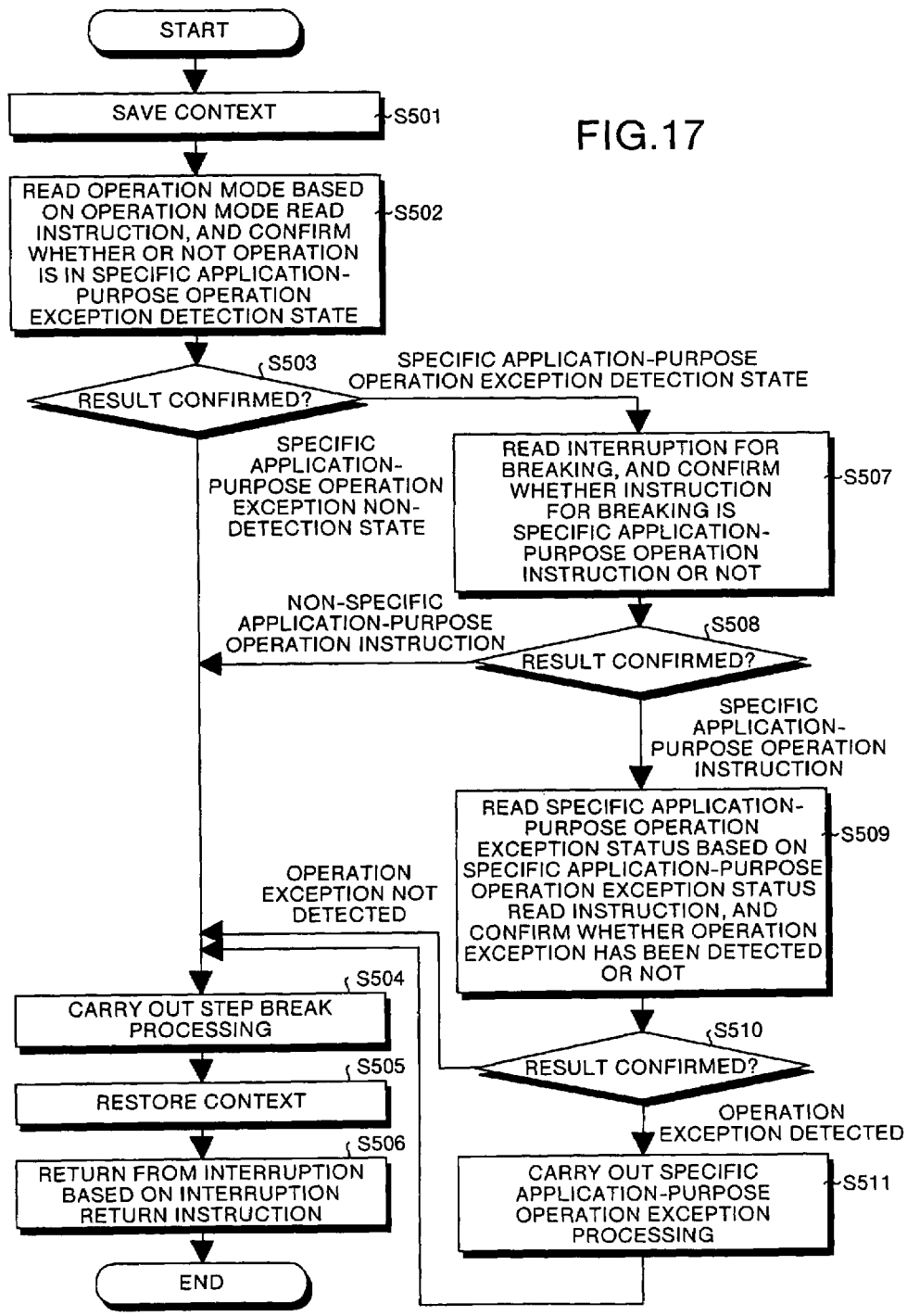
FIG. 17 is a flowchart of an interruption processing program according to a step break method among exception processing methods of a specific application-purpose operation instruction relating to the second embodiment.

The exception processing method of a specific application-purpose operation instruction relating to the second embodiment of the present invention will be explained next. FIG. 17 is a flowchart of an interruption processing program according to a step break method among exception processing methods of a specific application-purpose operation instruction relating to the second embodiment. Referring to the flowchart shown in FIG. 17, when the execution of a program is interrupted and the interruption processing program is started, the context is saved first (step S501) Then, the value of the operation mode register 268 is read based on the instruction for reading the operation mode register 268, and it is confirmed whether the operation mode has been set to a state that an operation exception that is generated during the execution of a specific application-purpose operation instruction is detected or not (step S502).

When the operation mode register 268 confirms that the operation mode has been set to a state that an operation exception that is generated during the execution of a specific application-purpose operation instruction is not detected (step S503: specific application-purpose operation exception non-detection state), a step break processing is carried out (step S504). Then, the context is restored (step S505), the processing is recovered from the interruption based on the interruption return instruction (step S506), and the interruption processing is finished. Therefore, when the operation mode has not been set to the state that an operation exception is detected, it is possible to promptly carry out a break processing and return to the original state.

On the other hand, when the operation mode register 268 confirms that the operation mode has been set to a state that an operation exception that is generated during the execution of a specific application-purpose operation instruction is detected (step S503: specific application-purpose operation exception detection state), an instruction for breaking is read from the memory 210. The code of this instruction is analyzed, and it is confirmed whether this instruction is a specific application-purpose operation instruction or not (step S507). When it is confirmed that the instruction for breaking is not a specific application-purpose operation instruction (step S508: non-specific application-purpose operation instruction), the process shifts to step S504. Then the processing at steps S504 to S506 is carried out, and the interruption processing is finished. Therefore, when the instruction is not a specific application-purpose operation instruction, it is possible to promptly carry out a break processing and return to the original state.

On the other hand, when it is confirmed that the instruction for breaking is a specific application-purpose operation instruction as a result of the confirmation (step S508: specific application-purpose operation instruction), the value of the specific application-purpose operation status register 267 is read based on the instruction for reading the specific application-purpose operation status register 267. Then, it is confirmed whether an operation exception during the execution of the specific application-purpose operation instruction has been detected or not (step S509). When it is confirmed that an operation exception is not detected during the execution of the specific application-purpose operation instruction (step S510: operation exception not detected), the process shifts to step S504. Then the processing at steps S504 to S506 is carried out, and the interruption processing is finished. On the other hand, when an operation exception is detected during the execution of the specific application-purpose operation instruction (step S510: operation exception detected), a specific application-purpose operation exception processing is carried out (step S511), and the process shifts to step S504. Then the processing at steps S504 to S506 is carried out, and the interruption processing is finished.

Figure 18:
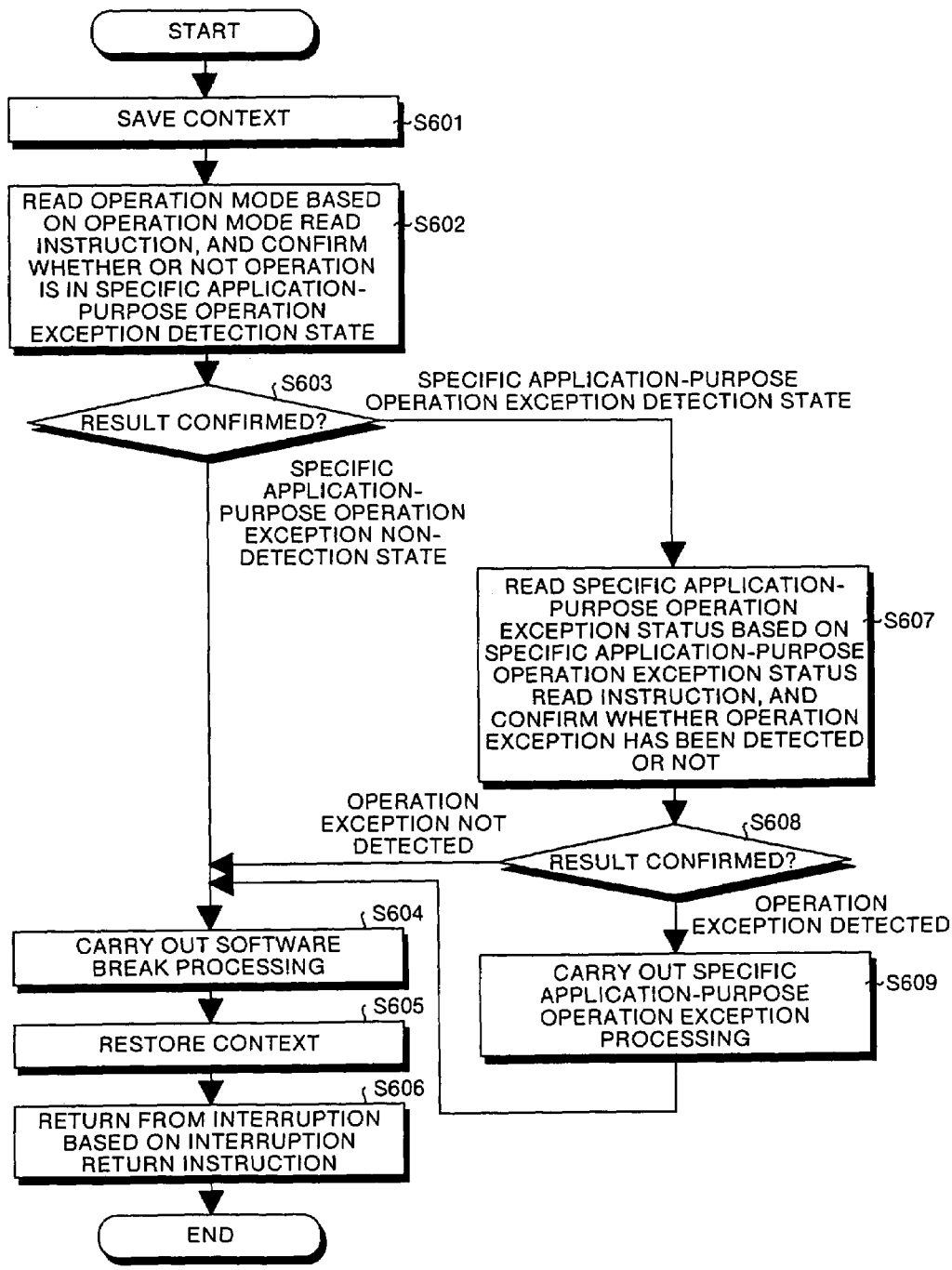
FIG. 18 is a flowchart of an interruption processing program according to a software break method among exception processing methods of a specific application-purpose operation instruction relating to the second embodiment.

FIG. 18 is a flowchart of an interruption processing program according to a software break method among exception processing methods of a specific application-purpose operation instruction relating to the second embodiment of the present invention. Referring to the flowchart shown in FIG. 18, when the execution of a program has been interrupted and an interruption processing program has been started, the context is saved first (step S601). Then, the value of the operation mode register 268 is read based on the instruction for reading the operation mode register 268, and it is confirmed whether the operation mode has been set to a state that an operation exception that is generated during the execution of a specific application-purpose operation instruction is detected or not (step S602).

When the operation mode register 268 confirms that the operation mode has been set to a state that an operation exception that is generated during the execution of a specific application-purpose operation instruction is not detected (step S603: specific application-purpose operation exception non-detection state), a software break processing is carried out (step S604). Then, the context is restored (step S605), the processing is recovered from the interruption based on the interruption return instruction (step S606), and the interruption processing is finished.

On the other hand, when the operation mode register 268 confirms that the operation mode has been set to a state that an operation exception that is generated during the execution of a specific application-purpose operation instruction is detected (step S603: specific application-purpose operation exception detection state), the value of the specific application-purpose operation status register 267 is read based on the instruction for reading the specific application-purpose operation status register 267. Then, it is confirmed whether an operation exception is detected during the execution of the specific application-purpose operation instruction (step S607). When an operation exception is not detected (step S608: operation exception not detected), the process shifts to step S604. Then the processing at steps S604 to S606 is carried out, and the interruption processing is finished. On the other hand, when an operation exception is detected (step S608: operation exception detected), a specific application-purpose operation exception processing is carried out (step S609), and the process shifts to step S604. Then the processing at steps S604 to S606 is carried out, and the interruption processing is finished.

Figure 19:
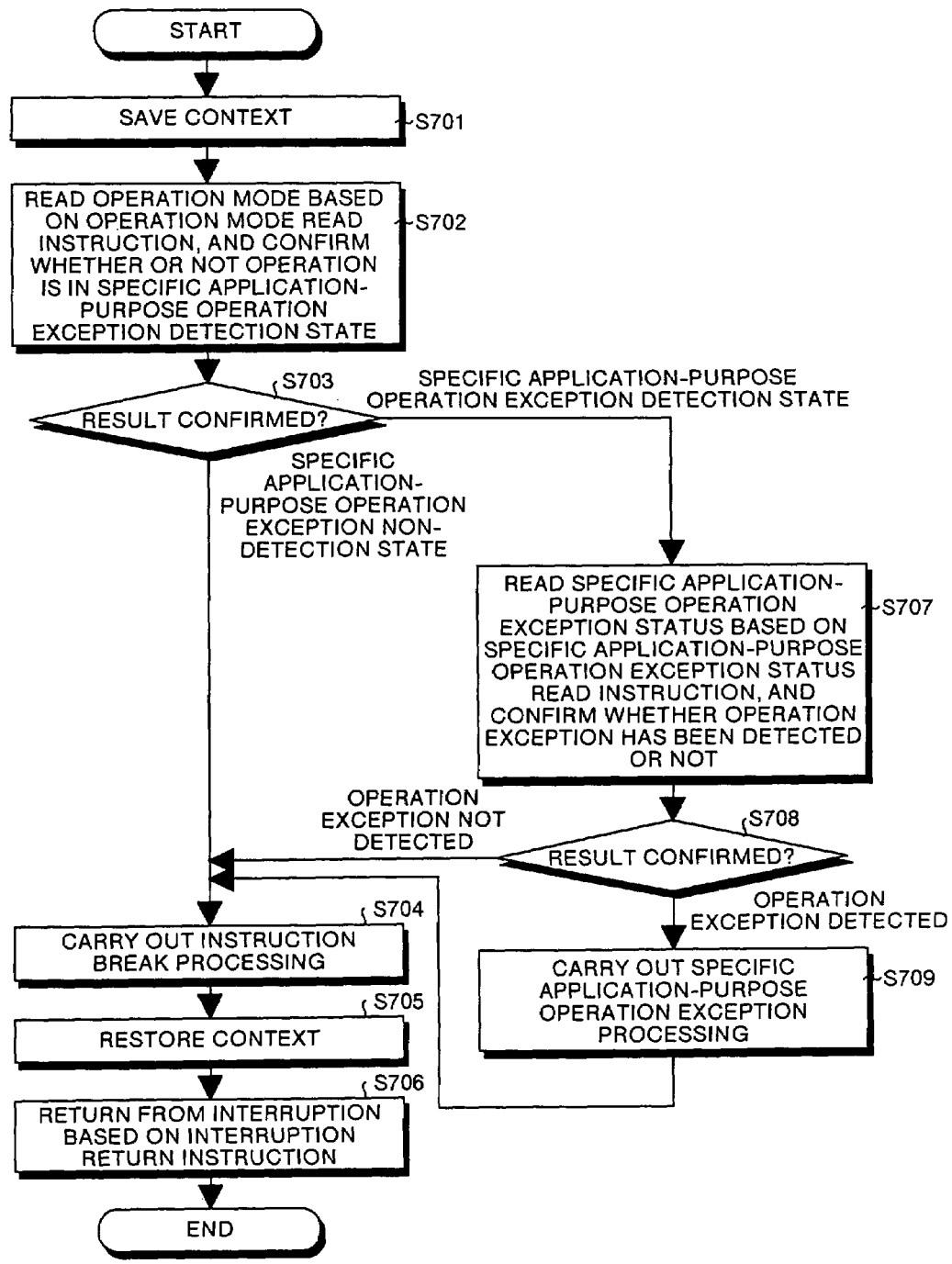
FIG. 19 is a flowchart of an interruption processing program according to an instruction break method among exception processing methods of a specific application-purpose operation instruction relating to the second embodiment.

FIG. 19 is a flowchart of an interruption processing program according to an instruction break method among exception processing methods of a specific application-purpose operation instruction relating to the second embodiment of the present invention. Referring to the flowchart shown in FIG. 19, when the execution of a program has been interrupted and an interruption processing program has been started, the context is saved first (step S701). Then, the value of the operation mode register 268 is read based on the instruction for reading the operation mode register 268, and it is confirmed whether the operation mode has been set to a state that an operation exception that is generated during the execution of a specific application-purpose operation instruction is detected or not (step S702).

When the operation mode register 268 confirms that the operation mode has been set to a state that an operation exception that is generated during the execution of a specific application-purpose operation instruction is not detected (step S703: specific application-purpose operation exception non-detection state), an instruction break processing is carried out (step S704). Then, the context is restored (step S705), the processing is recovered from the interruption based on the interruption return instruction (step S706), and the interruption processing is finished.

On the other hand, when the operation mode register 268 confirms that the operation mode has been set to a state that an operation exception that is generated during the execution of a specific application-purpose operation instruction is detected (step S703: specific application-purpose operation exception detection state), the value of the specific application-purpose operation status register 267 is read based on the instruction for reading the specific application-purpose operation status register 267. Then, it is confirmed whether an operation exception during the execution of the specific application-purpose operation instruction has been detected or not (step S707). When an operation exception is not detected (step S708: operation exception not detected), the process shifts to step S704. Then the processing at steps S704 to S706 is carried out, and the interruption processing is finished. On the other hand, when an operation exception is detected (step S708: operation exception detected), a specific application-purpose operation exception processing is carried out (step S709), and the process shifts to step S704. Then the processing at steps S704 to S706 is carried out, and the interruption processing is finished.

According to the above-described second embodiment, when any one of a step break, a software break and an instruction break has occurred in an information processing apparatus having a specific application-purpose operation instruction, it is possible to detect the occurrence of an operation exception such as an overflow due to the specific application-purpose operation instruction and carry out an exceptional processing. Therefore, it is possible to reduce the labor and time required for the debugging. As a result there is an effect that it is possible to reduce the time required to develop a program.

It is mentioned above that, the operation mode register 268 is provided and it holds the information about whether an operation exception that occurs during the execution of the specific application-purpose operation instruction is detected or not. However, the structure is not limited to this, and it is also possible to provide a flag in the memory 210 and this memory holds similar information.

Figure 20:
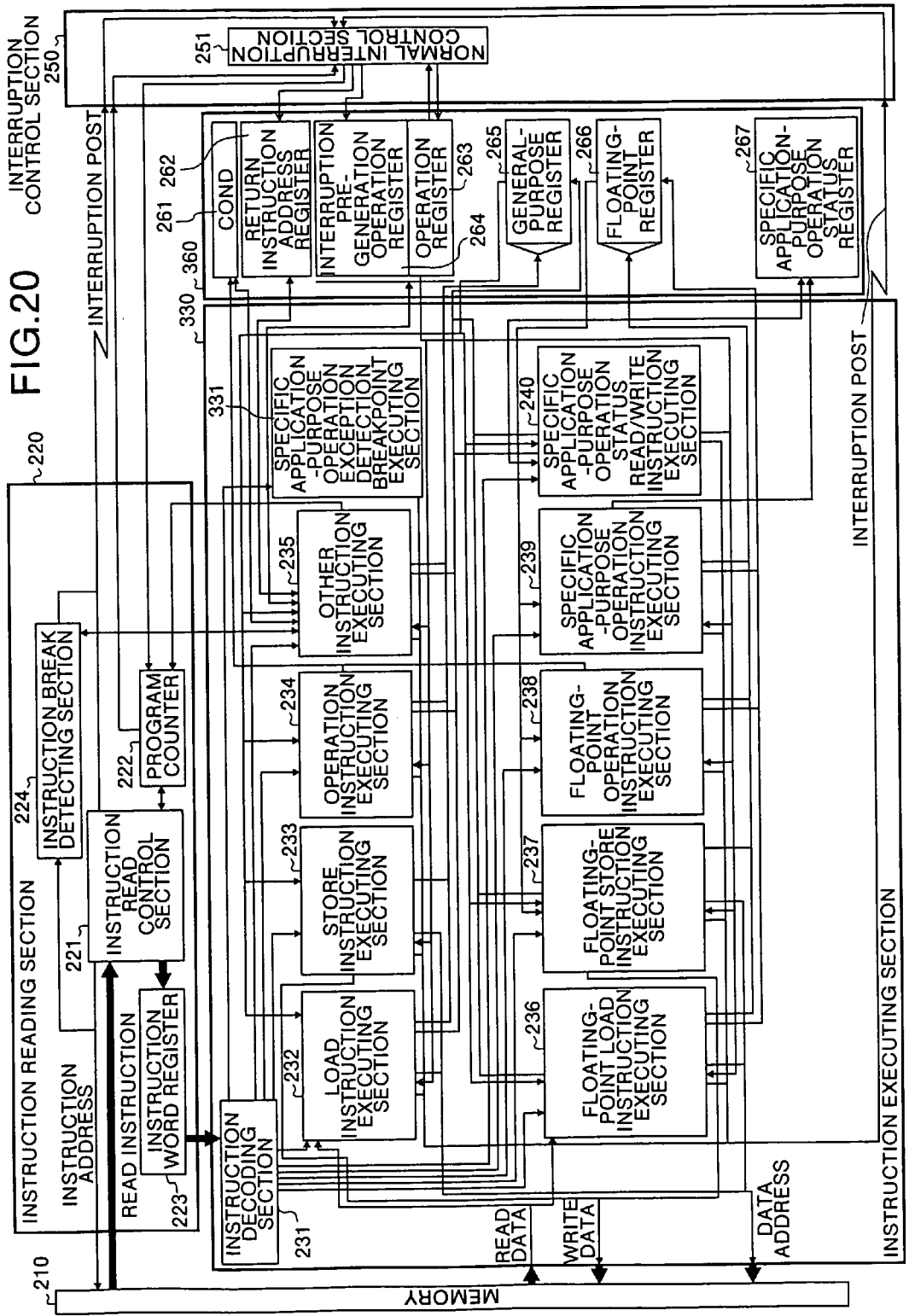
FIG. 20 is a block diagram showing a structure of an information processing apparatus to which an exception processing method of a specific application-purpose operation instruction relating to a third embodiment of the invention has been applied.

FIG. 20 is a block diagram showing a structure of an information processing apparatus to which an exception processing method of a specific application-purpose operation instruction relating to a third embodiment of the invention has been applied. This information processing apparatus is different from the information processing apparatus of the second embodiment in the following four points. First, there is provided a specific application-purpose operation exception detection breakpoint instruction as an instruction for setting the operation to a state that an operation exception that occurs during the execution of a specific application-purpose operation instruction is detected. Second, an instruction executing section 330 is provided in place of the instruction executing section 230 of the second embodiment. This an instruction executing section 330 has an executing section 331 for executing the specific application-purpose operation exception detection breakpoint instruction. Third, this instruction executing section 330 is not provided with the operation mode read/write instruction executing section 241. Fourth, a register control section 360 is provided in place of the register control section 260 of the second embodiment, however, it does not have the operation mode register 268.

Other structure is similar to that of the second embodiment. Sections similar to those of the second embodiment are provided with identical legends, and their explanation is omitted. In the third embodiment, the explanation relating to the operation mode read/write instruction executing section 241 and the operation mode register 268 explained in the second embodiment will not be applied.

The instruction executing section 330 is equipped with the instruction decoding section 231, the load instruction executing section 232, the store instruction executing section 233, an operation instruction executing section 234, the other instruction executing section 235, the floating-point load instruction executing section 236, the floating-point store instruction executing section 237, the floating-point operation instruction executing section 238, the specific application-purpose operation instruction executing section 239, the specific application-purpose operation status read/write instruction executing section 240, and the specific application-purpose operation exception detection breakpoint instruction executing section 331.

The instruction decoding section 231 performs all the functions of the instruction decoding section 231 explained in the second embodiment. In addition, when as a result of analyzing an instruction supplied from the instruction reading section 220 it is confirmed that this instruction is a specific application-purpose operation exception detection breakpoint instruction, the instruction decoding section 231 supplies this instruction to the specific application-purpose operation exception detection breakpoint instruction executing section 331.

When the specific application-purpose operation exception detection breakpoint instruction executing section 331 has received a specific application-purpose operation exception detection breakpoint instruction from the instruction decoding section 231, it posts to the interruption control section 250 that a software break has been established. Further, when the specific application-purpose operation exception detection breakpoint instruction executing section 331 has detected an interruption during the execution of the instruction, it posts to the interruption control section 250 that the interruption has been detected. When the mode is a single step mode after the execution of the instruction, the specific application-purpose operation exception detection breakpoint instruction executing section 331 posts to the interruption control section 250 that a step break has been detected.

The register control section 360 is equipped with the COND 261, the return instruction address register 262, the operation register 263, the interruption pre-generation operation register 264, the general-purpose register 265, the floating-point register 266, and the specific application-purpose operation status register 267.

Figure 21:
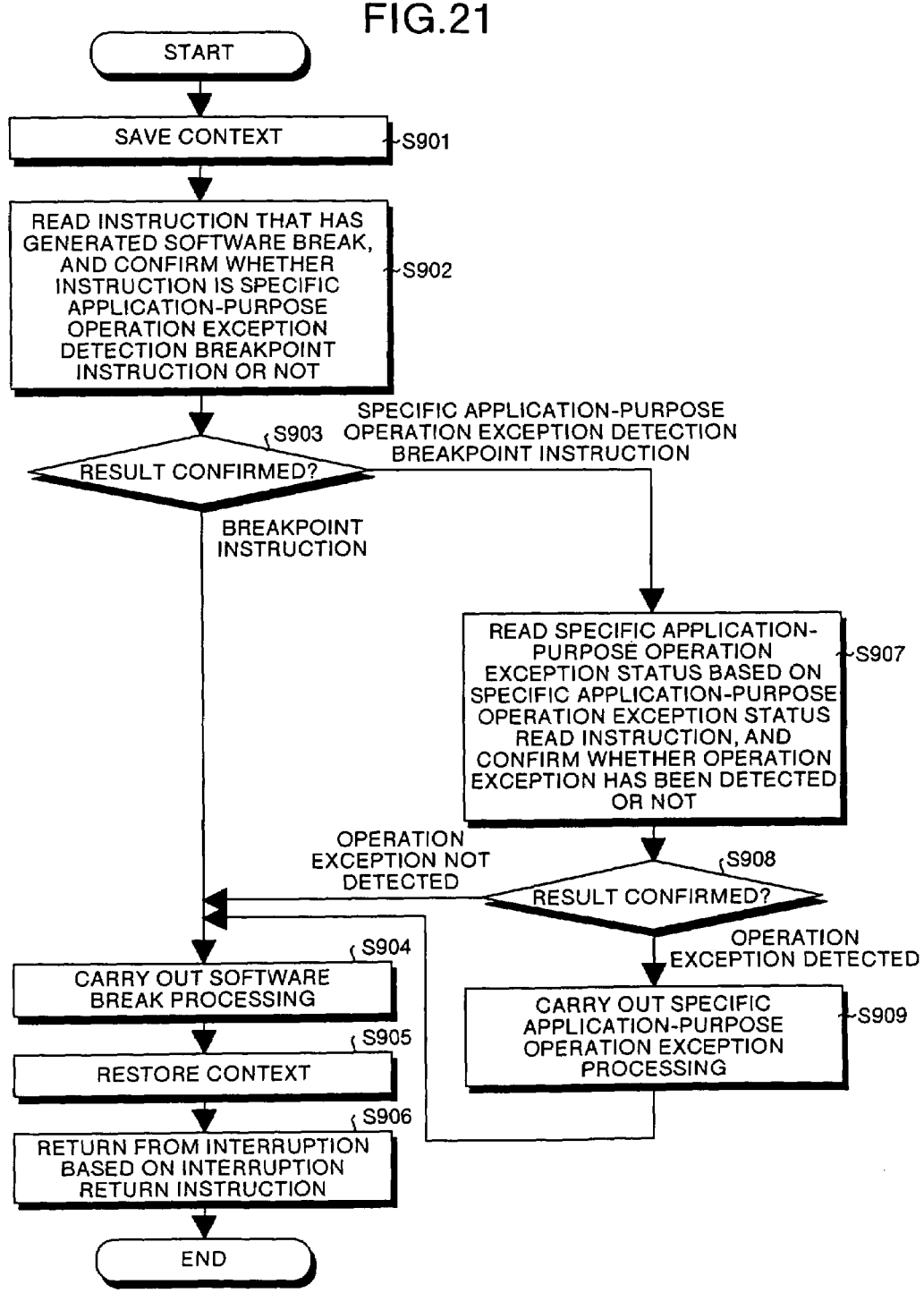
FIG. 21 is a flowchart of an interruption processing program according to a software break method among exception processing methods of a specific application-purpose operation instruction relating to the third embodiment.

The exception processing method of a specific application-purpose operation instruction relating to the third embodiment of the present invention will be explained next. FIG. 21 is a flowchart of an interruption processing program according to a software break method among exception processing methods of a specific application-purpose operation instruction relating to the third embodiment of the present invention. Referring to the flowchart shown in FIG. 21, when the execution of a program has been interrupted and an interruption processing program has been started, the context is saved first (step S901). Then, an instruction that has generated a software break is read from the memory 210, and the code of this instruction is analyzed. Then, it is confirmed whether this instruction is a specific application-purpose operation exception detection breakpoint instruction or not (step S902).

However, when this instruction is not a specific application-purpose operation exception detection breakpoint instruction, that is, the instruction is a simple breakpoint instruction (step S903: breakpoint instruction), a software break processing is carried out (step S904) Then, the context is restored (step S905), the processing is recovered from the interruption based on the interruption return instruction (step S906), and the interruption processing is finished.

On the other hand, when it is confirmed that this instruction is a specific application-purpose operation exception detection breakpoint instruction (step S903: specific application-purpose operation exception detection breakpoint instruction), the value of the specific application-purpose operation status register 267 is read based on the instruction for reading the specific application-purpose operation status register 267. Then, it is confirmed whether an operation exception is detected during the execution of the specific application-purpose operation instruction or not (step S907) When an operation exception is not detected (step S908: operation exception not detected), the process shifts to step S904. Then the processing at steps S904 to S906 is carried out, and the interruption processing is finished. On the other hand, when an operation exception is detected (step S908: operation exception detected), a specific application-purpose operation exception processing is carried out (step S909), and the process shifts to step S904. Then the processing at steps S904 to S906 is carried out, and the interruption processing is finished.

Figure 1:
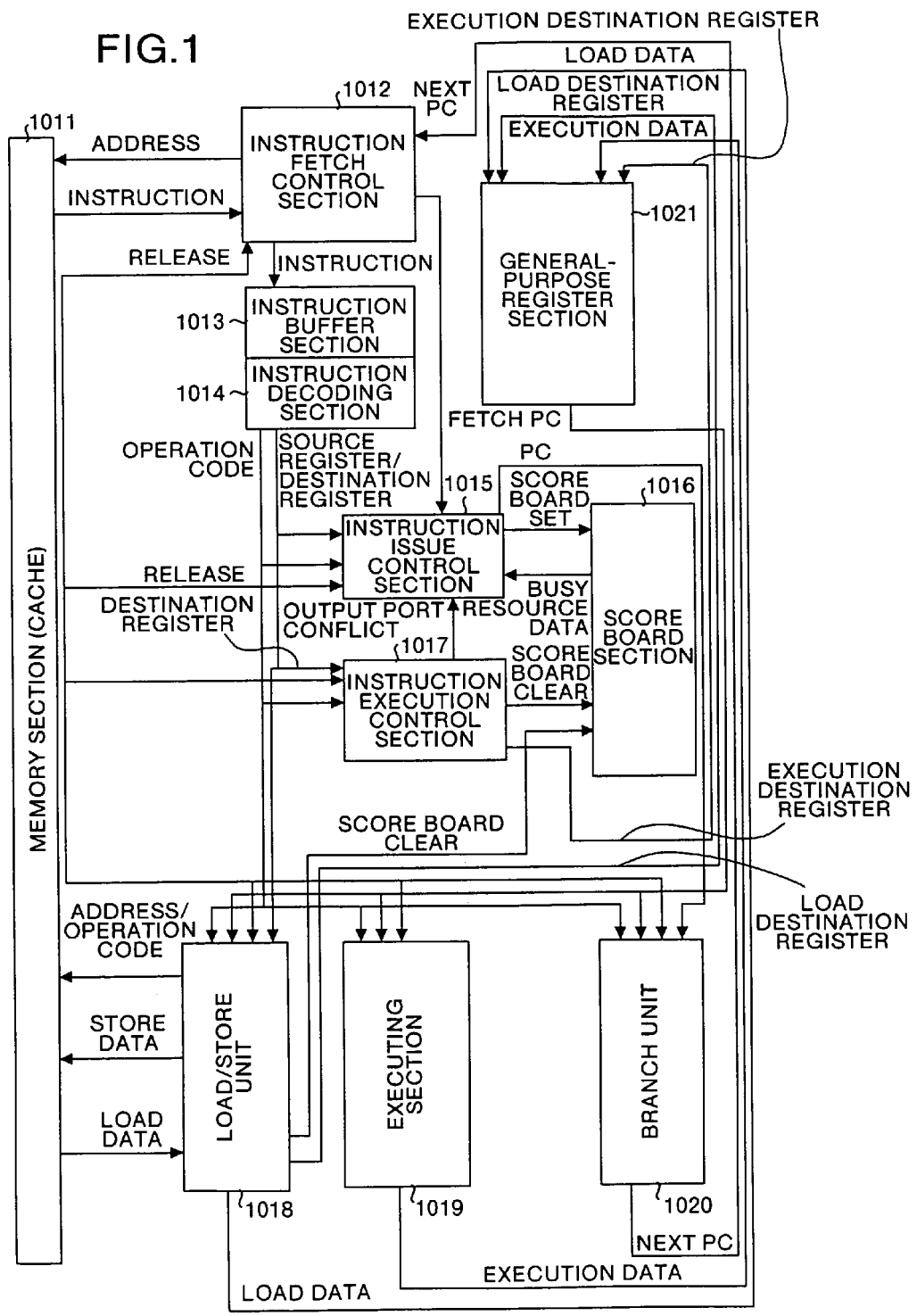
FIG. 1 is a block diagram showing a structure of the conventional processor core.
Figure 2:
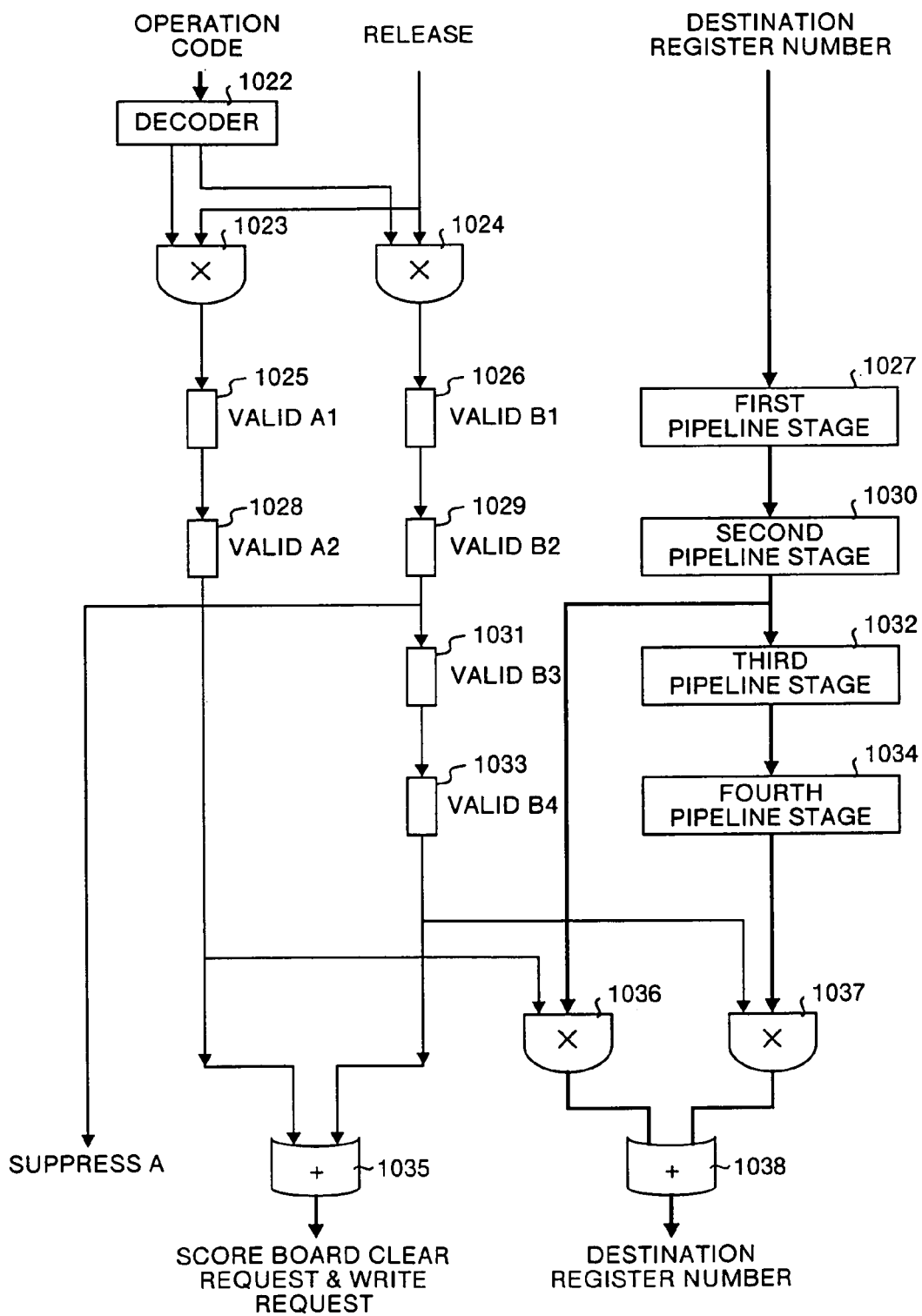
FIG. 2 is a diagram for explaining a structure and the operation of the conventional instruction execution control section.
Figure 3:
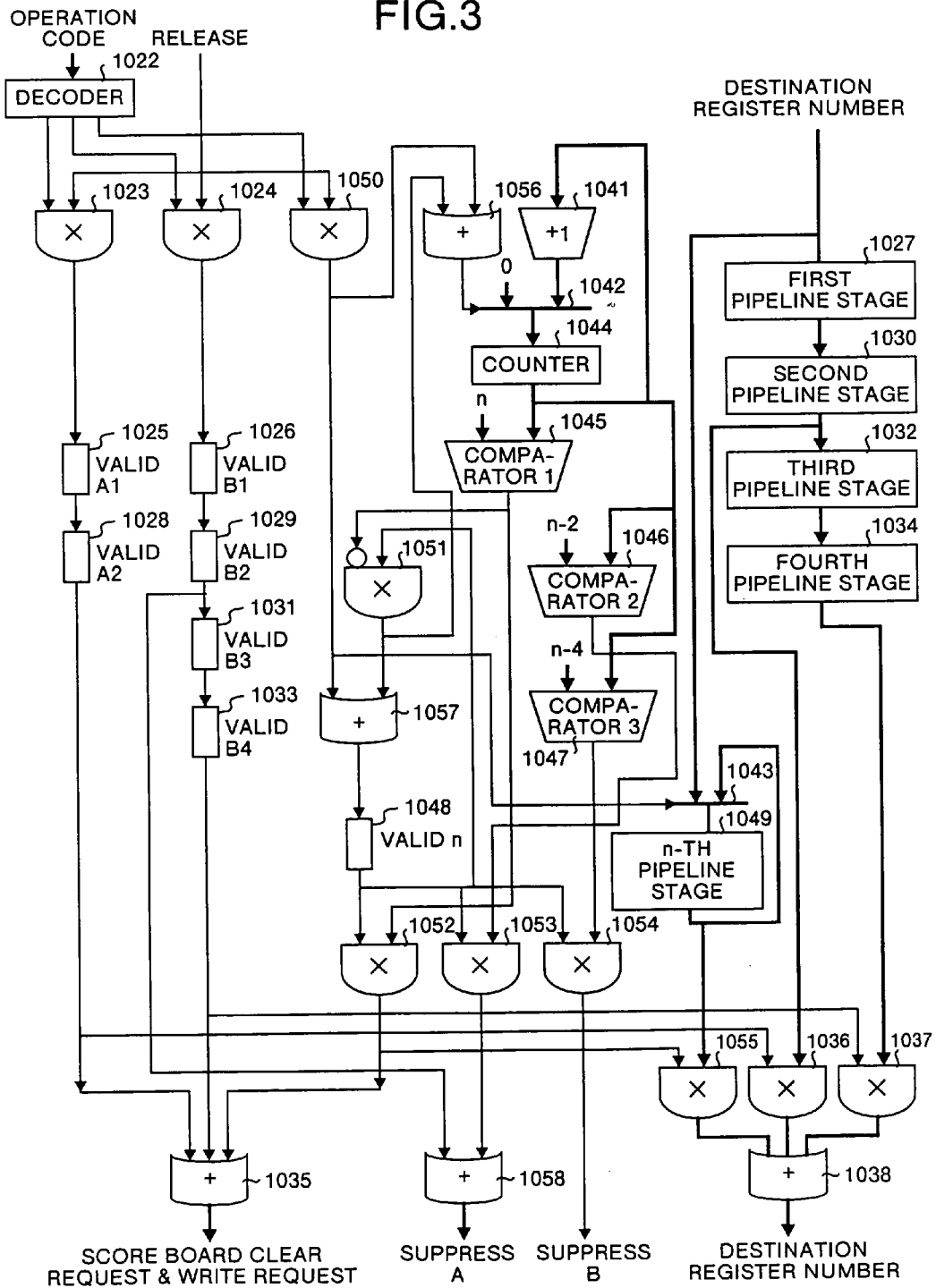
FIG. 3 is a diagram for explaining a structure and operation of the conventional instruction execution control section.
Figure 4:
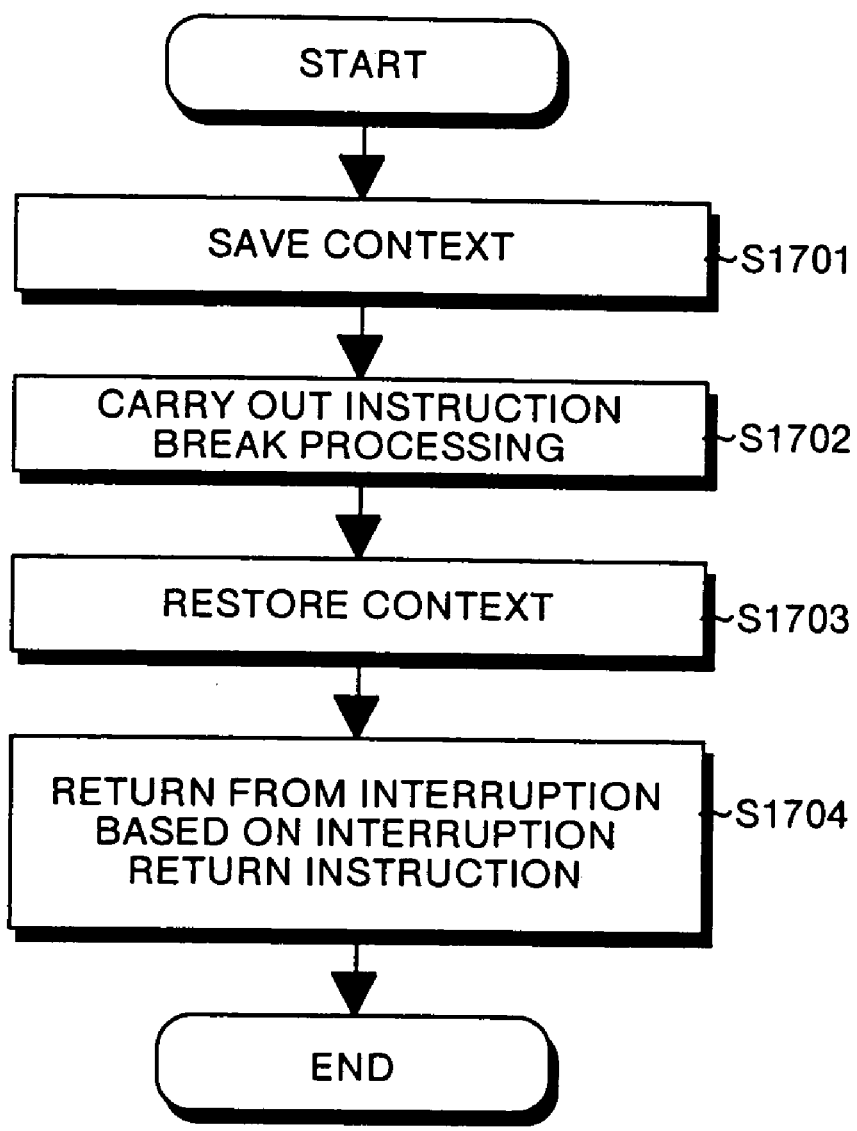
FIG. 4 is a flowchart of an interruption processing program according to the conventional instruction break method.
Figure 6:
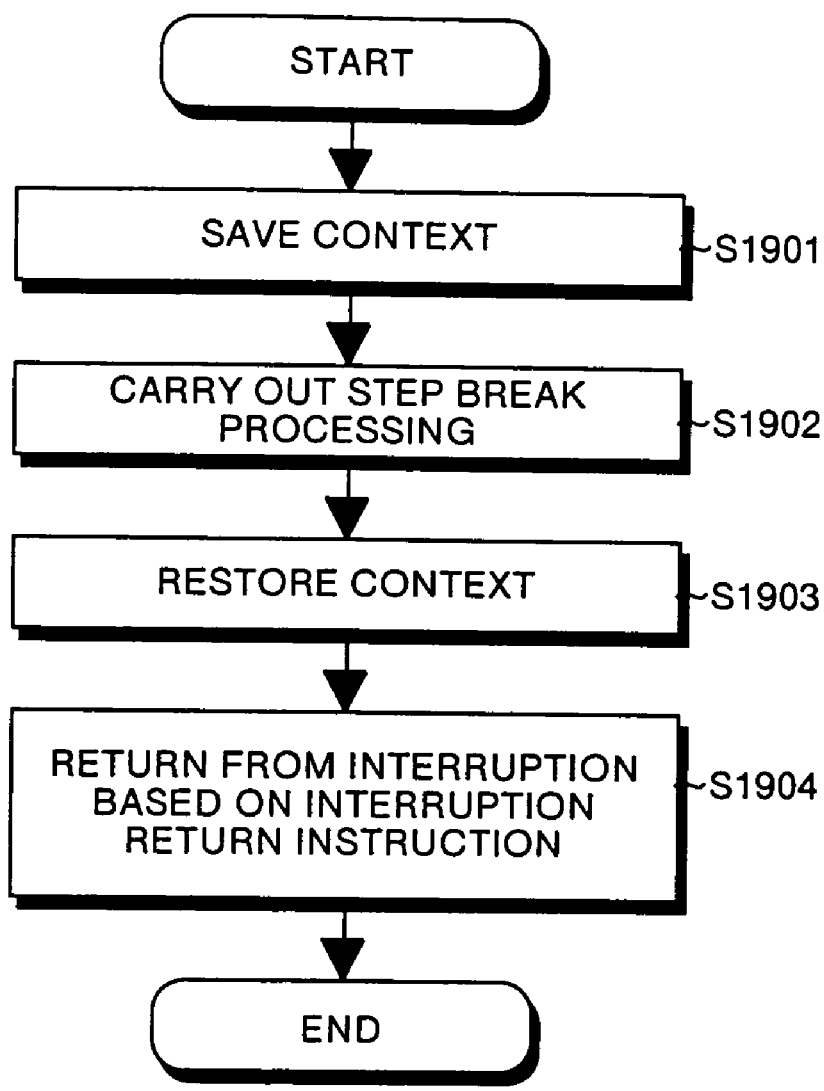
FIG. 6 is a flowchart of an interruption processing program according to the conventional step break method.
Figure 7:
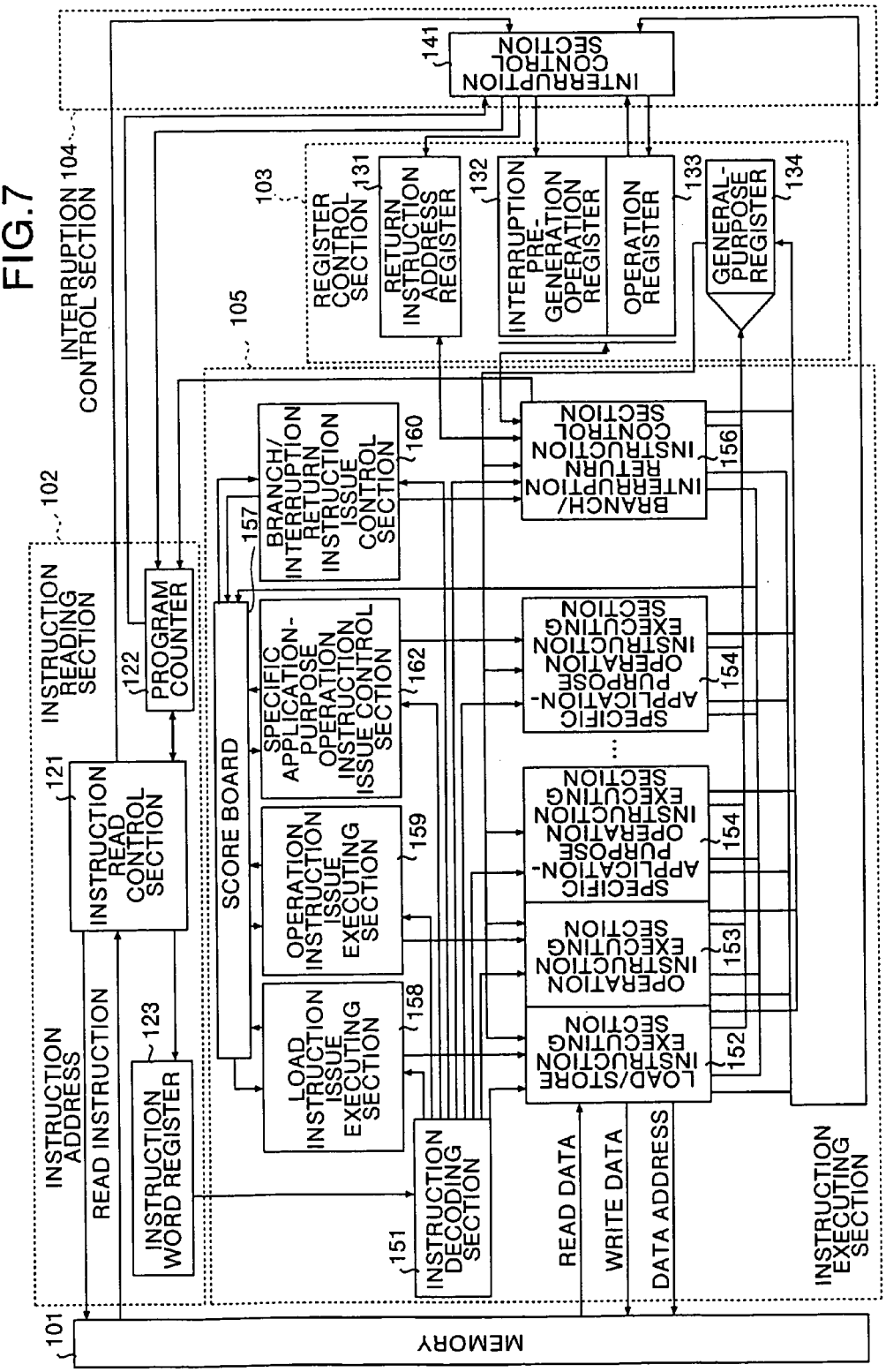
FIG. 7 is a block diagram showing a structure of the conventional information processing apparatus.
Figure 8:
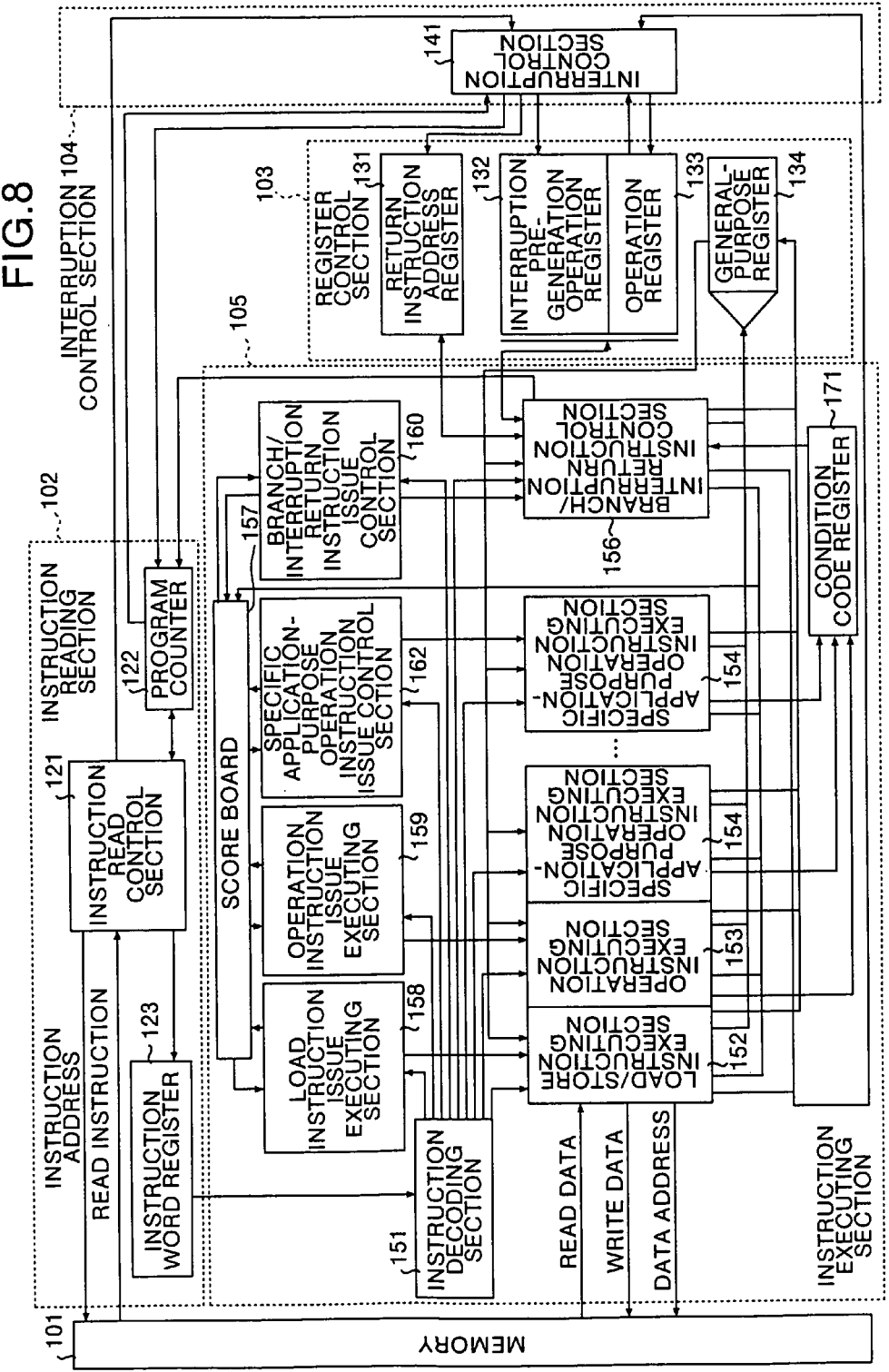
FIG. 8 is a block diagram showing another structure of a conventional information processing apparatus.

The interruption processing programs according to the step break method and the instruction break method in the third embodiment are similar to those shown in the flowcharts of the conventional methods shown in FIG. 6 and FIG. 4 respectively. Therefore, their drawings and explanation will be omitted.

According to the above-described third embodiment, when a software break has occurred in an information processing apparatus having a specific application-purpose operation instruction, it is possible to detect the occurrence of an operation exception such as an overflow due to the specific application-purpose operation instruction and carry out an exceptional processing. Therefore, it is possible to reduce the labor and time required for the debugging. As a result there is an effect that it is possible to reduce the time required to develop a program.

Further, according to the third embodiment, there is provided a specific application-purpose operation exception detection breakpoint instruction. Then, it is decided whether an operation exception that occurs during the execution of a specific application-purpose operation instruction is carried out or not depending on whether an instruction that has generated a software break is the specific application-purpose operation exception detection breakpoint instruction or a simple breakpoint instruction. However, the structure is not limited to the above. For example, it is also possible to decide whether an operation exception that occurs during the execution of a specific application-purpose operation instruction is carried out or not based on the value of the field that is included in the instruction word of the breakpoint instruction.

Figure 22:
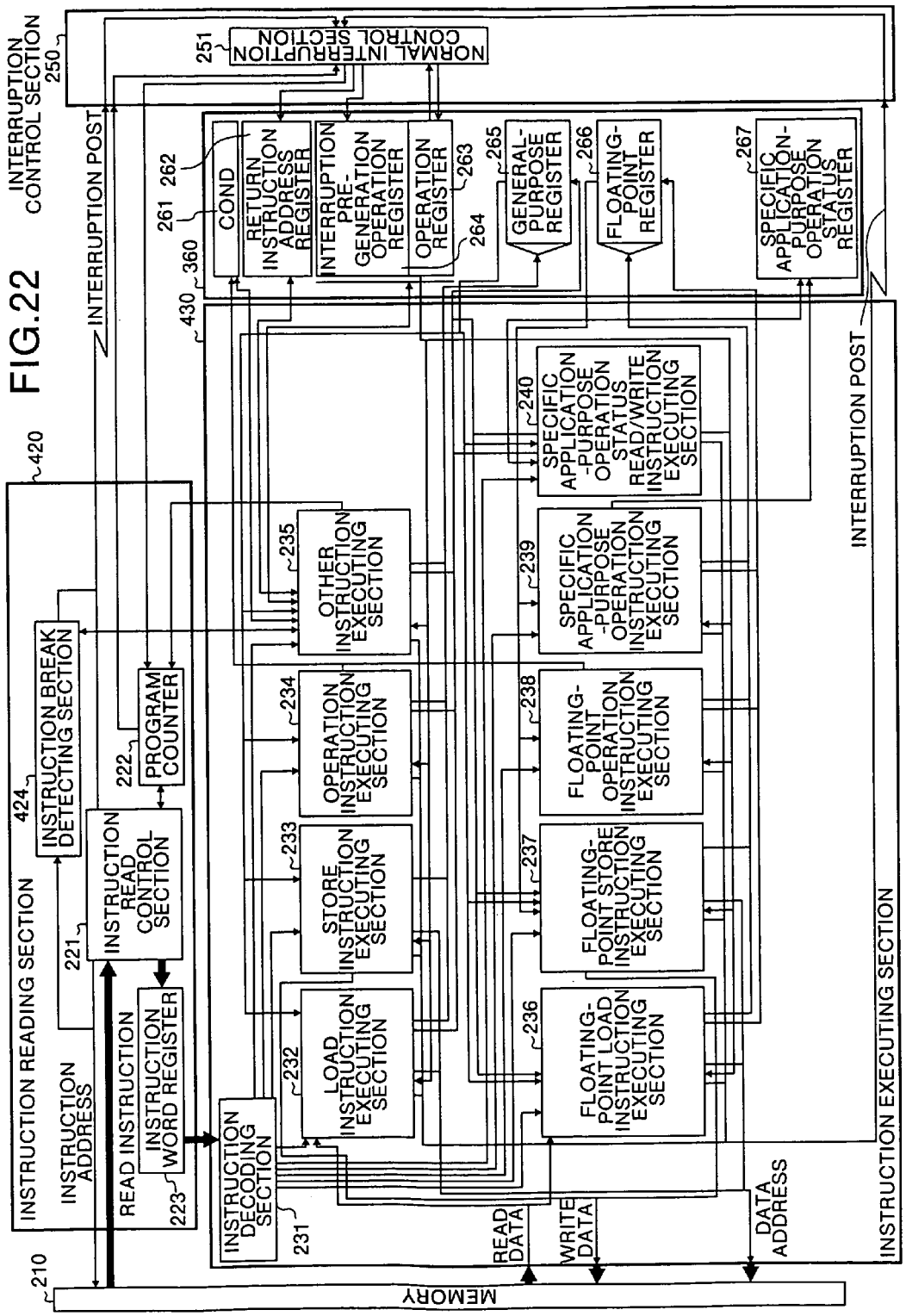
FIG. 22 is a block diagram showing a structure of an information processing apparatus to which an exception processing method of a specific application-purpose operation instruction relating to a fourth embodiment of the invention has been applied.

FIG. 22 is a block diagram showing a structure of an information processing apparatus to which an exception processing method of a specific application-purpose operation instruction relating to a fourth embodiment of the present invention has been applied. This information processing apparatus is different from that of the second embodiment in the following three points. First, an instruction reading section 420 is provided in place of the instruction reading section 220 of the second embodiment has an instruction break detecting section 424. This instruction reading section 420 has a different structure of an instruction breakpoint register from that of the second embodiment. Second, an instruction executing section 430 is provided in place of the instruction executing section 230 of the second embodiment. This instruction executing section 430 is not provided with the operation mode read/write instruction executing section 241. Third, the register control section 360 having the same structure as that of the third embodiment is provided in place of the register control section 260 of the second embodiment.

Other structure is similar to that of the second embodiment. Sections similar to those of the second embodiment are attached with identical legends, and their explanation is omitted. The register control section 360 is also the same as that of the third embodiment, and therefore, its explanation will be omitted. In this fourth embodiment, the explanation relating to the operation mode read/write instruction executing section 241 and the operation mode register 268 explained in the second embodiment will not be applied.

Figure 23:
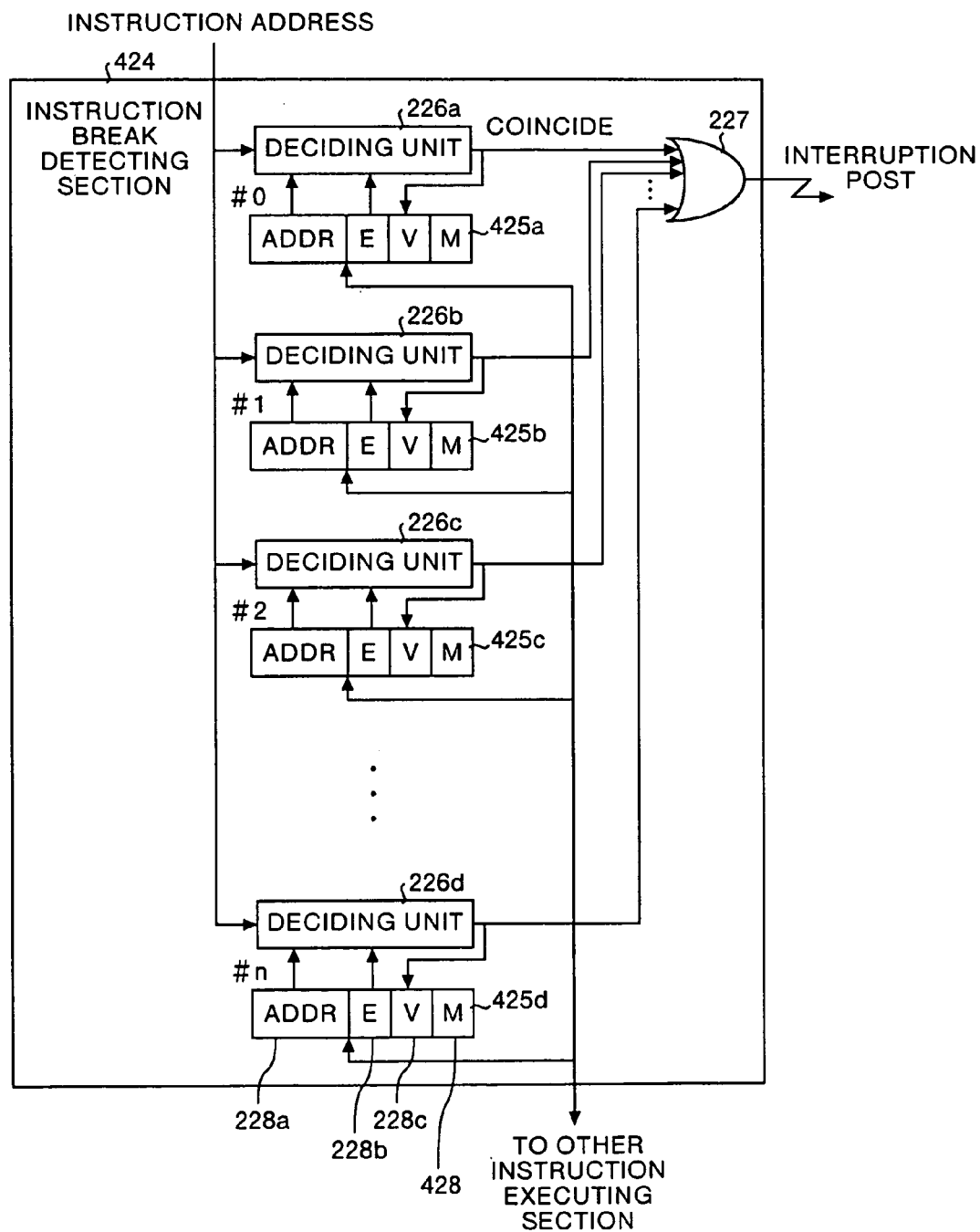
FIG. 23 is a block diagram showing one example of an instruction break detecting section relating to the fourth embodiment.

The instruction reading section 420 is equipped with the instruction read control section 221, the program counter 222, an instruction word register 223, and an instruction break detecting section 424. FIG. 23 is a block diagram showing one example of the instruction break detecting section 424. The instruction break detecting section 424 is different from the instruction break detecting section 224 of the second embodiment in that each of the instruction breakpoint registers 425a to 425d is provided with an M field 428 in addition to the ADDR field 228a, the E field 228b and the V field 228c. Other structures of the instruction break detecting section 424 are the same as those of the instruction break detecting section 224 of the second embodiment. The M field 428 holds a value that indicates whether an instruction break is for carrying out a detection of an operation exception that occurs during the execution of the specific application-purpose operation instruction or not. The M field 428 holds "0 (zero)" when the instruction break is not for carrying out a detection of an operation exception that occurs during the execution of the specific application-purpose operation instruction, and holds "1" when the instruction break is for carrying out a detection of an operation exception that occurs during the execution of the specific application-purpose operation instruction.

The instruction executing section 430 is equipped with the instruction decoding section 231, the load instruction executing section 232, the store instruction executing section 233, the operation instruction executing section 234, the other instruction executing section 235, the floating-point load instruction executing section 236, the floating-point store instruction executing section 237, the floating-point operation instruction executing section 238, the specific application-purpose operation instruction executing section 239, and the specific application-purpose operation status read/write instruction executing section 240.

Figure 24:
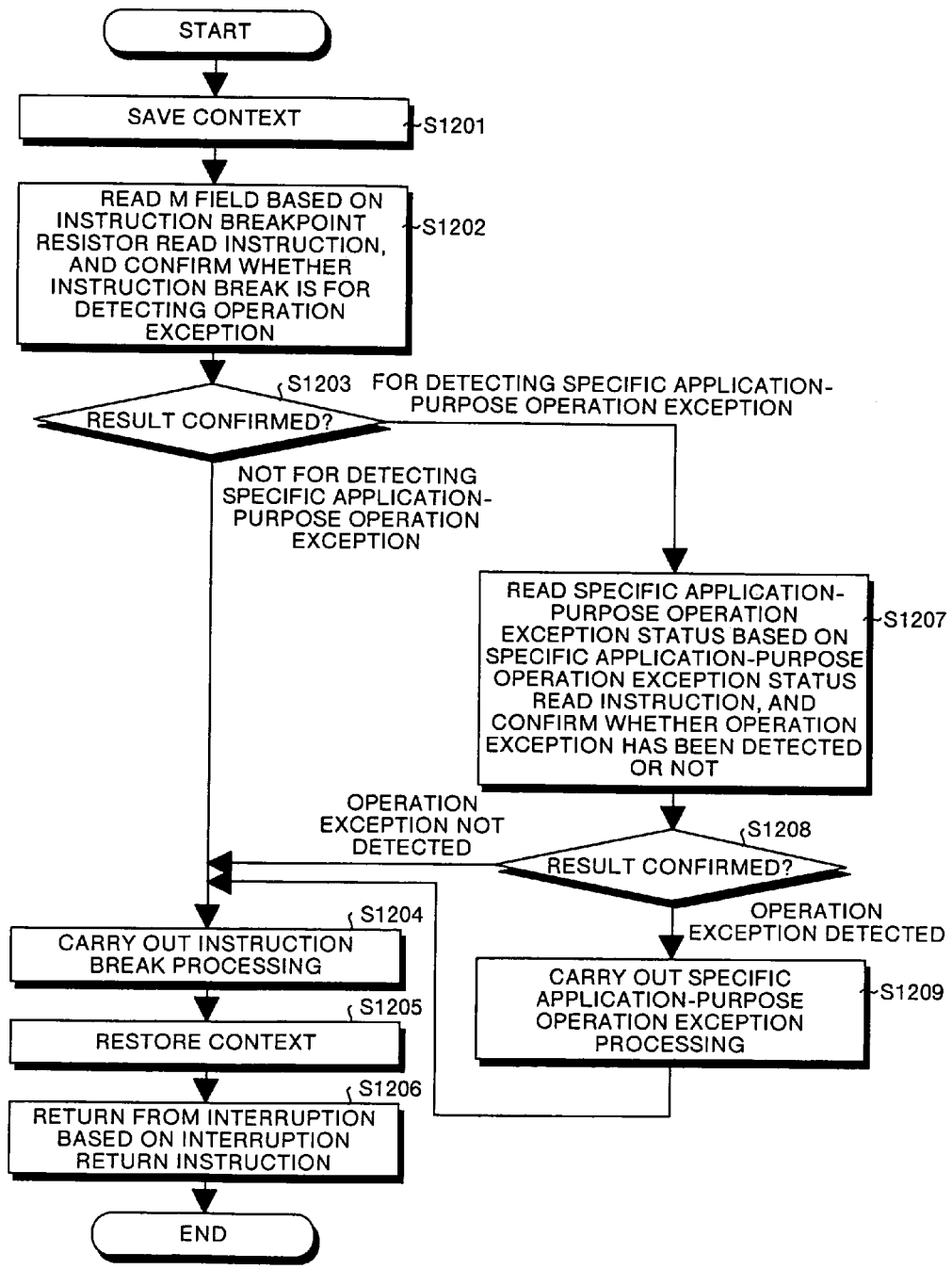
FIG. 24 is a flowchart of an interruption processing program according to an instruction break method among exception processing methods of a specific application-purpose operation instruction relating to the fourth embodiment.

The exception processing method of a specific application-purpose operation instruction relating to the fourth embodiment of the present invention will be explained next. FIG. 24 is a flowchart of an interruption processing program according to an instruction break method among exception processing methods of a specific application-purpose operation instruction relating to the fourth embodiment of the present invention. Referring to the flowchart shown in FIG. 24, when the execution of a program has been interrupted and an interruption processing program has been started, the context is saved first (step S1201). Then, the value of the M field 428 of each of the instruction breakpoint registers 425a to 425d is read corresponding to the instruction for reading the instruction breakpoint registers 425a to 425d. Then, it is confirmed whether the instruction break is for detecting an operation exception that occurs during the execution of the specific application-purpose operation instruction or not (step S1202). When it is confirmed that the instruction break is not for detecting an operation exception (step S1203: not for detecting a specific application-purpose operation exception), an instruction break processing is carried out (step S1204). Then, the context is restored (step S1205), the processing is recovered from the interruption based on the interruption return instruction (step S1206), and the interruption processing is finished.

On the other hand, it is confirmed that when the instruction break is for detecting an operation exception (step S1203: for detecting a specific application-purpose operation exception), the value of the specific application-purpose operation status register 267 is read based on the instruction for reading the specific application-purpose operation status register 267. Then, it is confirmed whether an operation exception during the execution of the specific application-purpose operation instruction has been detected or not (step S1207). When it is confirmed that an operation exception is not detected during the execution of the specific application-purpose operation instruction (step S1208: operation exception not detected), the process shifts to step S1204. Then the processing at steps S1204 to S1206 is carried out, and the interruption processing is finished. On the other hand, when an operation exception is detected during the execution of the specific application-purpose operation instruction (step S1208: operation exception detected), a specific application-purpose operation exception processing is carried out (step S1209), and the process shifts to step S1204. Then the processing at steps S1204 to S1206 is carried out, and the interruption processing is finished.

Figure 5:
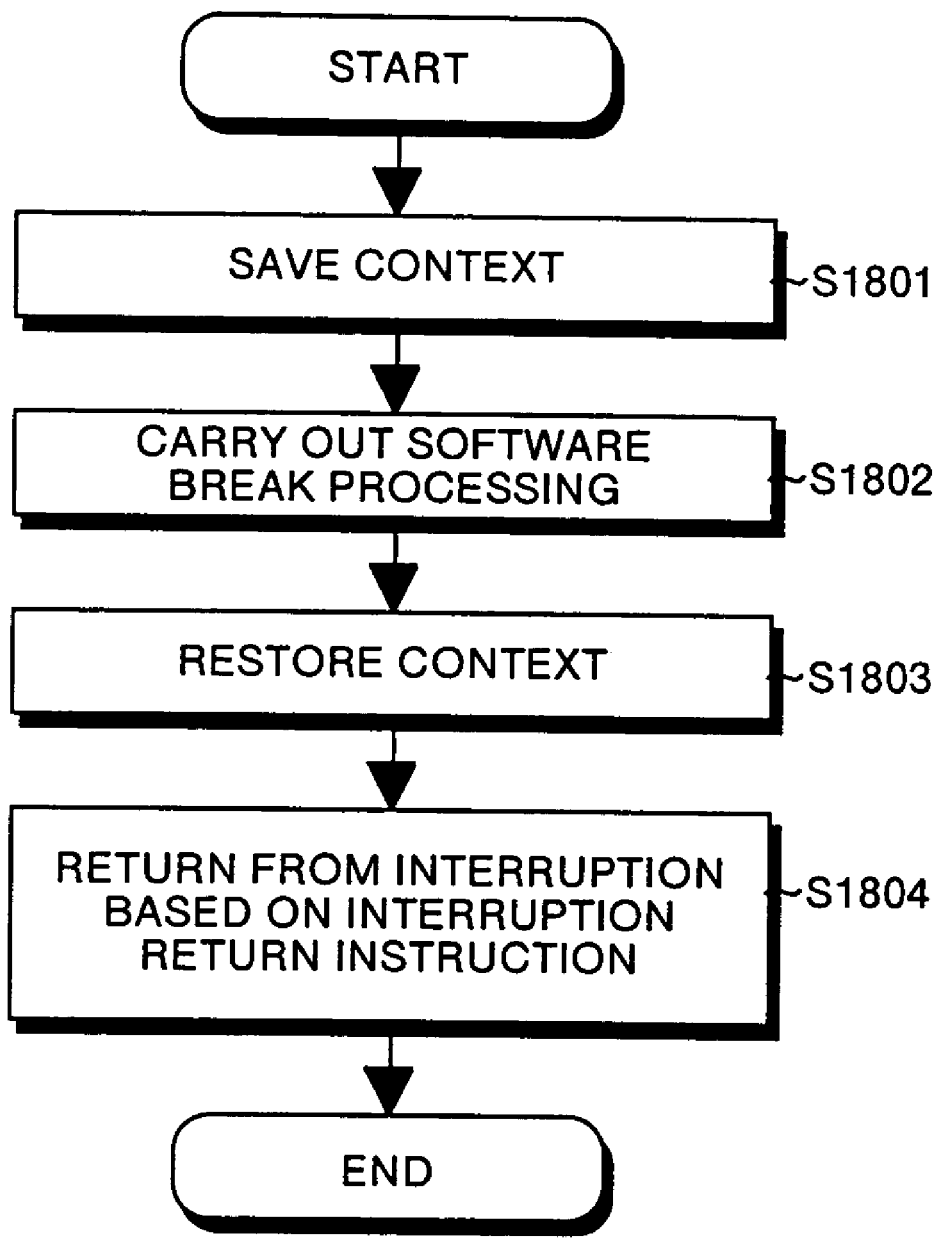
FIG. 5 is a flowchart of an interruption processing program according to the conventional software break method.

The interruption processing programs according to the step break method and the software break method in the fourth embodiment are similar to those shown in the flowcharts of the conventional methods shown in FIG. 6 and FIG. 5 respectively. Therefore, their drawings and explanation will be omitted.

According to the above-described fourth embodiment, when an instruction break has occurred in an information processing apparatus having a specific application-purpose operation instruction, it is possible to detect the occurrence of an operation exception such as an overflow due to the specific application-purpose operation instruction and carry out an exceptional processing. Therefore, it is possible to reduce the labor and time required for the debugging. As a result there is an effect that it is possible to reduce the time required to develop a program.

Figure 25:
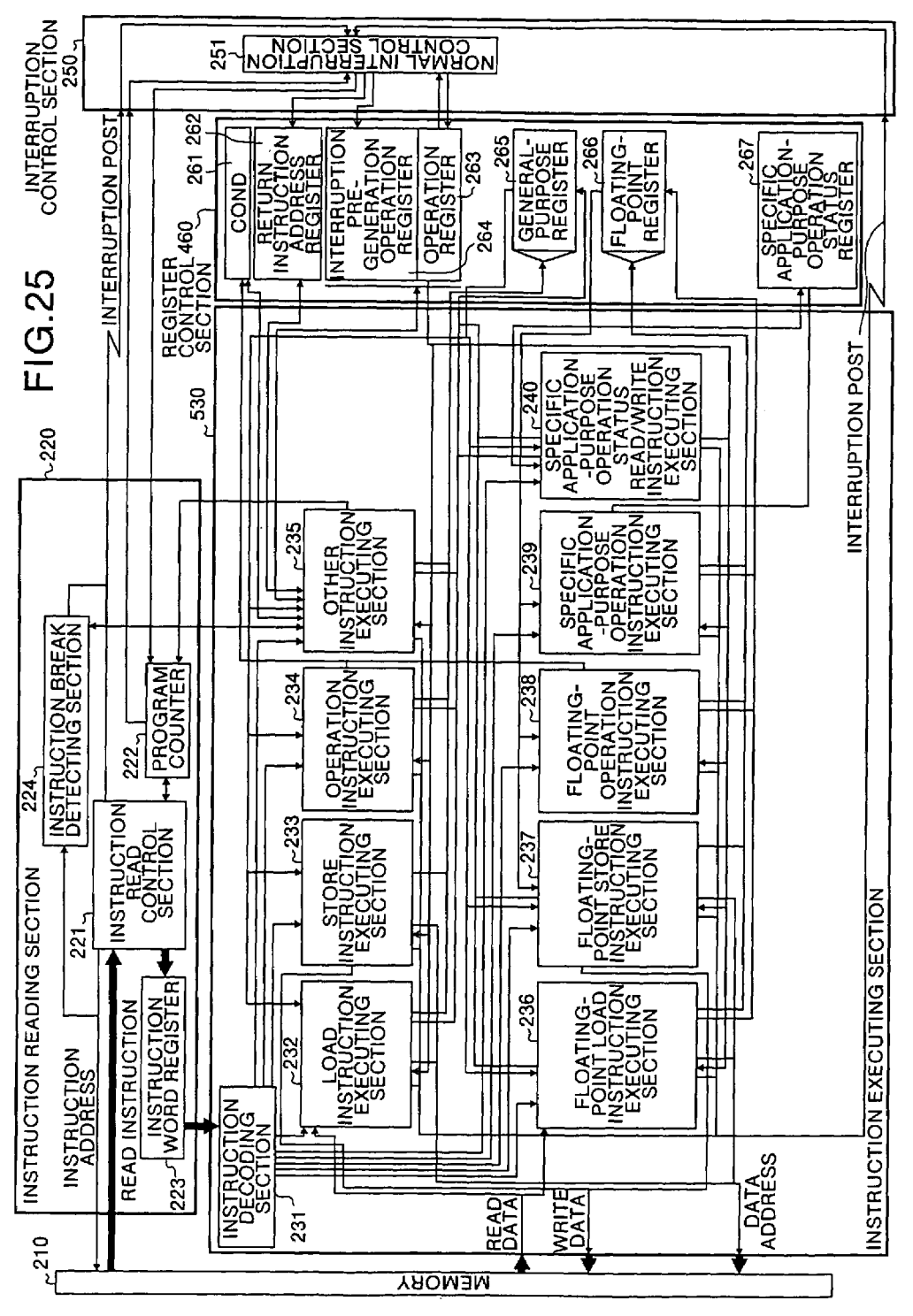

FIG. 25 is a block diagram showing a structure of an information processing apparatus to which an exception processing method of a specific application-purpose operation instruction relating to a fifth embodiment of the invention has been applied. This information processing apparatus is different from that of the second embodiment in the following three points. First, the memory 210 stores a specific application-purpose operation exception breakpoint table (not shown in FIG. 25).

Second, an instruction executing section 530 is provided in place of the instruction executing section 230 of the second embodiment. This instruction executing section 530 is not provided with the operation mode read/write instruction executing section 241. Third, a register control section 460 is provided in place of the register control section 260 in the second embodiment. This register control section 460 is not provided with the operation mode register 268.

Other structure is similar to that of the second embodiment. Sections similar to those of the second embodiment are attached with identical legends, and their explanation will be omitted. In this fifth embodiment, the explanation relating to the operation mode read/write instruction executing section 241 and the operation mode register 268 explained in the second embodiment will not be applied.

Figure 26:
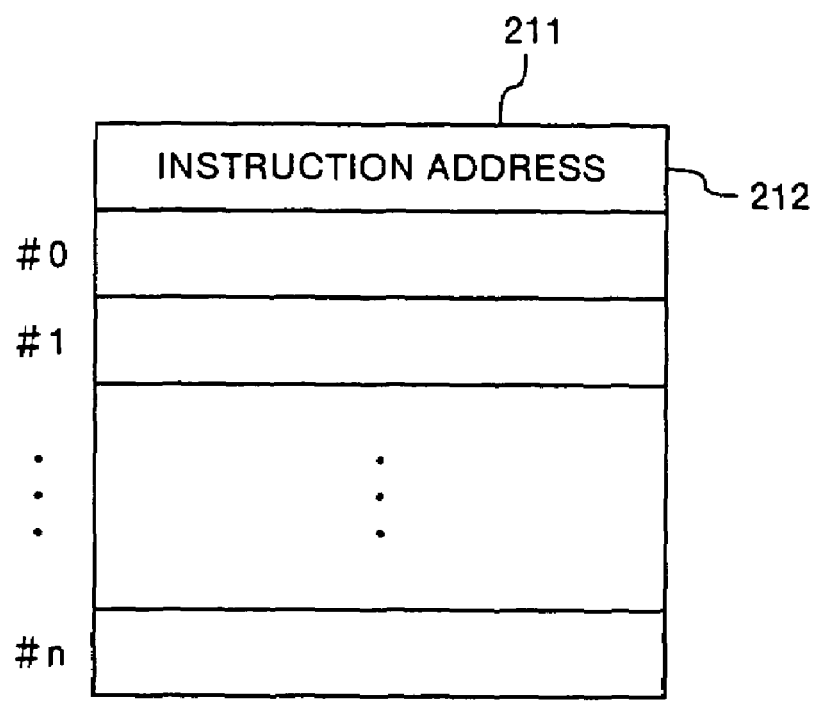
FIG. 26 is a configuration diagram showing one example of a breakpoint table of a specific application-purpose operation exception relating to the fifth embodiment.

FIG. 26 shows one example of a breakpoint table of a specific application-purpose operation exception. The specific application-purpose operation exception breakpoint table 211 stores a breakpoint for carrying out a detection of an operation exception that occurs during the execution of a specific application-purpose operation instruction. In the specific application-purpose operation exception breakpoint table 211, there is registered a breakpoint for carrying out a detection of an operation exception that occurs during the execution of a specific application-purpose operation instruction among breakpoints based on an instruction break and a software break. An instruction address column 212 of the specific application-purpose operation exception breakpoint table 211 is the column that shows an instruction address of a breakpoint.

The instruction executing section 530 is equipped with the instruction decoding section 231, the load instruction executing section 232, the store instruction executing section 233, the operation instruction executing section 234, the other instruction executing section 235, the floating-point load instruction executing section 236, the floating-point store instruction executing section 237, the floating-point operation instruction executing section 238, the specific application-purpose operation instruction executing section 239, and the specific application-purpose operation status read/write instruction executing section 240.

The register control section 460 is equipped with the COND 261, the return instruction address register 262, the operation register 263, the interruption pre-generation operation register 264, the general-purpose register 265, the floating-point register 266, and the specific application-purpose operation status register 267.

Figure 27:
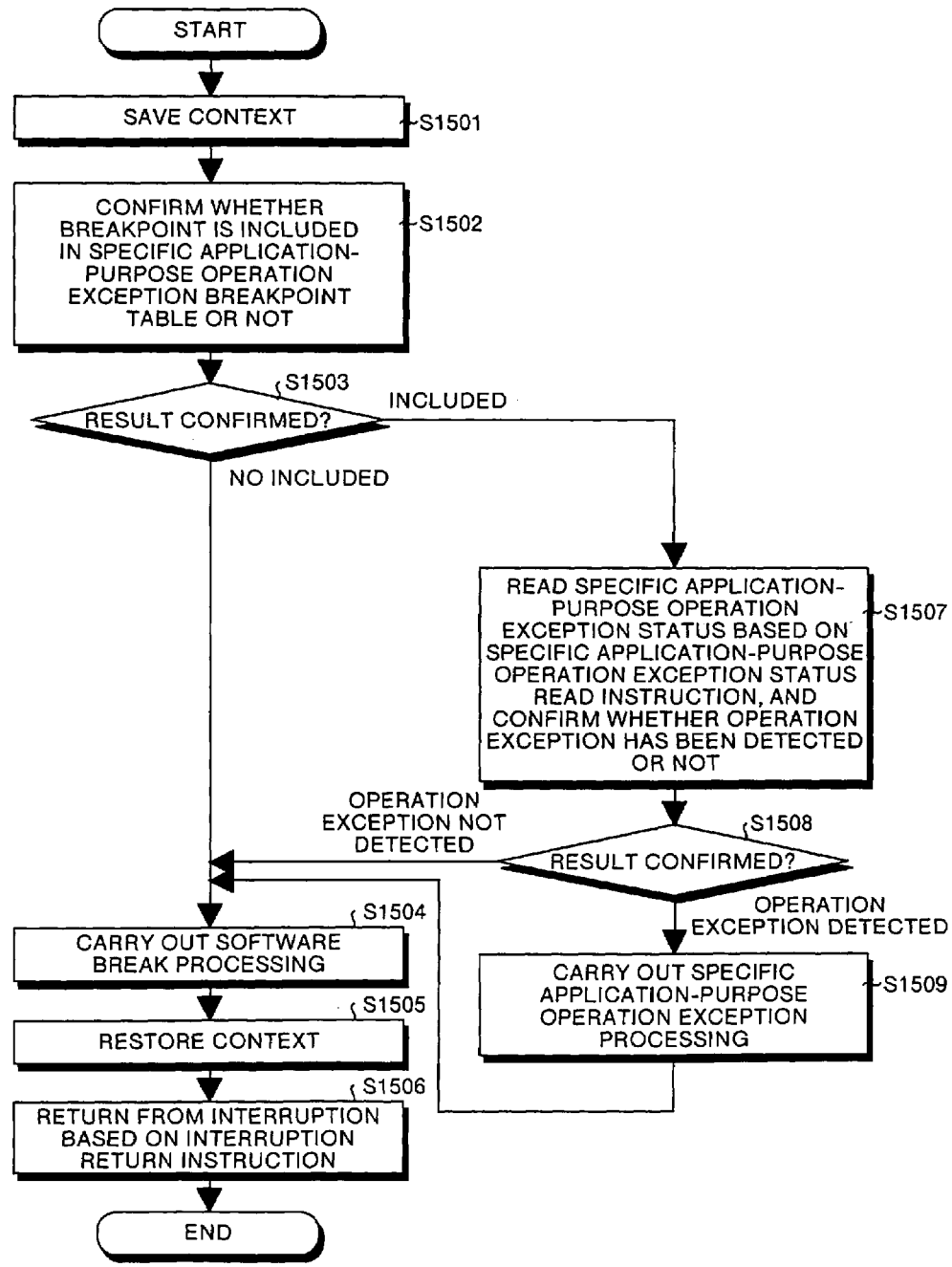
FIG. 27 is a flowchart of an interruption processing program according to a software break method among exception processing methods of a specific application-purpose operation instruction relating to the fifth embodiment.

The exception processing method of a specific application-purpose operation instruction relating to the fifth embodiment of the present invention will be explained next. FIG. 27 is a flowchart of an interruption processing program according to a software break method among exception processing methods of a specific application-purpose operation instruction relating to the fifth embodiment.

Referring to the flowchart shown in FIG. 27, when the execution of a program has been interrupted and an interruption processing program has been started, the context is saved first (step S1501). Then, it is confirmed whether a breakpoint is included in the specific application-purpose operation exception breakpoint table 211 stored in the memory 211 or not (step S1502). When it is confirmed that a breakpoint is not included in the specific application-purpose operation exception breakpoint table 211 (step S1503: not included), a software break processing is carried out (step S1504). Then, the context is restored (step S1505), the processing is recovered from the interruption based on the interruption return instruction (step S1506), and the interruption processing is finished.

On the other hand, when a breakpoint is included in the specific application-purpose operation exception breakpoint table 211 (step S1503: included), the value of the specific application-purpose operation status register 267 is read based on the instruction for reading the specific application-purpose operation status register 267. Then, it is confirmed whether an operation exception during the execution of the specific application-purpose operation instruction has been detected or not (step S1507). When it is confirmed that an operation exception is not detected during the execution of the specific application-purpose operation instruction (step S1508: operation exception not detected), the process shifts to step S1504. Then the processing at steps S1504 to S1506 is carried out, and the interruption processing is finished. On the other hand, when an operation exception is detected during the execution of the specific application-purpose operation instruction (step S1508: operation exception detected), a specific application-purpose operation exception processing is carried out (step S1509), and the process shifts to step S1504. Then the processing at steps S1504 to S1506 is carried out, and the interruption processing is finished.

Figure 28:
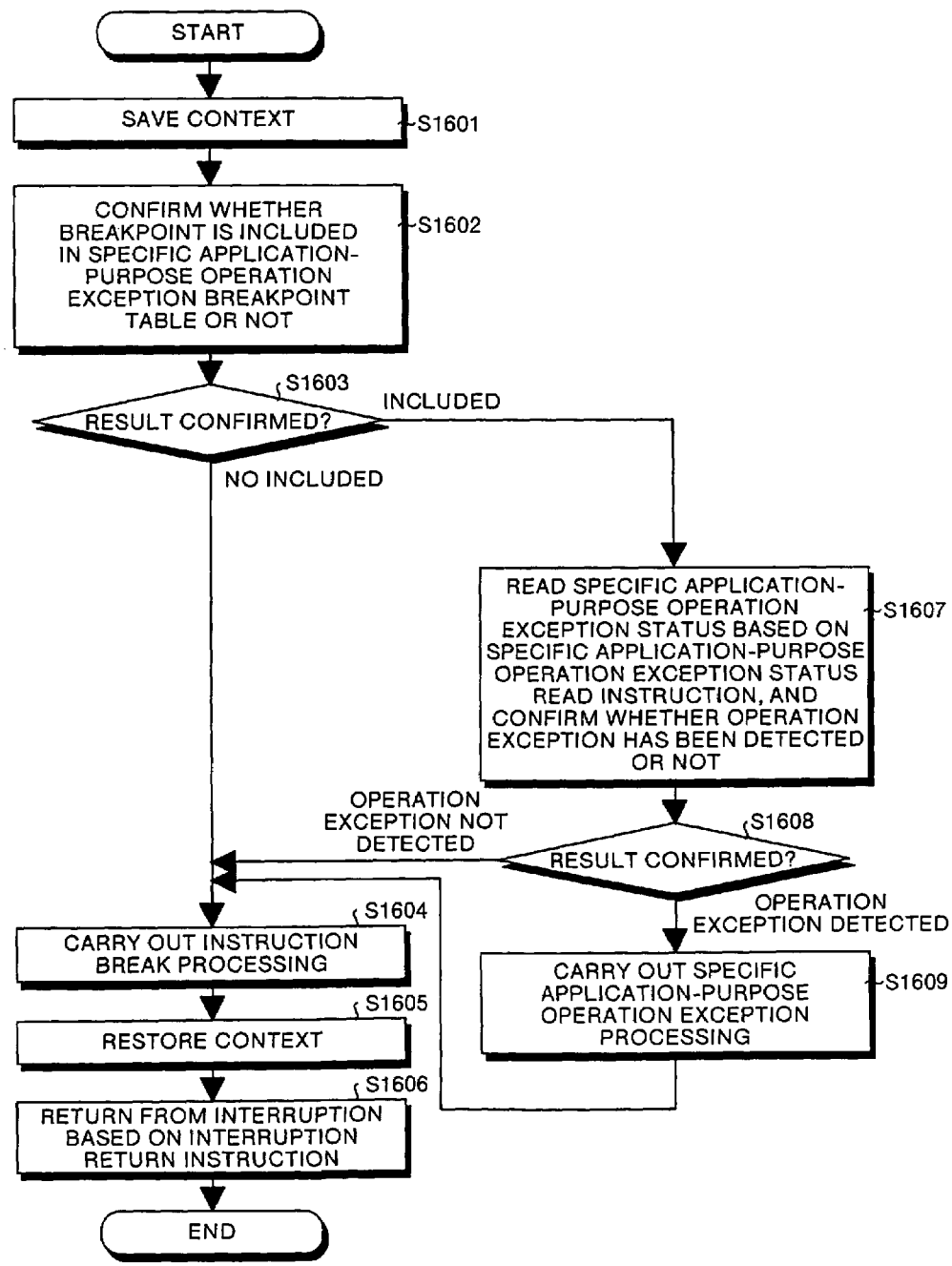
FIG. 28 is a flowchart of an interruption processing program according to an instruction break method among exception processing methods of a specific application-purpose operation instruction relating to the fifth embodiment.

FIG. 28 is a flowchart of an interruption processing program according to an instruction break method among exception processing methods of a specific application-purpose operation instruction relating to the fifth embodiment. Referring to the flowchart shown in FIG. 28, when the execution of a program has been interrupted and an interruption processing program has been started, the context is saved first (step S1601). Then, it is confirmed whether a breakpoint is included in the specific application-purpose operation exception breakpoint table 211 stored in the memory 211 or not (step S1602). When it is confirmed that a breakpoint is not included in the specific application-purpose operation exception breakpoint table 211 (step S1603: not included), an instruction break processing is carried out (step S1604). Then, the context is restored (step S1605), the processing is recovered from the interruption based on the interruption return instruction (step S1606), and the interruption processing is finished.

On the other hand, when a breakpoint is included in the specific application-purpose operation exception breakpoint table 211 (step S1603: included), the value of the specific application-purpose operation status register 267 is read based on the instruction for reading the specific application-purpose operation status register 267. Then, it is confirmed whether an operation exception during the execution of the specific application-purpose operation instruction has been detected or not (step S1607). When it is confirmed that an operation exception is not detected during the execution of the specific application-purpose operation instruction (step S1608: operation exception not detected), the process shifts to step S1604. Then the processing at steps S1604 to S1606 is carried out, and the interruption processing is finished. On the other hand, when an operation exception is detected during the execution of the specific application-purpose operation instruction (step S1608: operation exception detected), a specific application-purpose operation exception processing is carried out (step S1609), and the process shifts to step S1604. Then the processing at steps S1604 to S1606 is carried out, and the interruption processing is finished.

The interruption processing program according to the step break method in the fifth embodiment is similar to that shown in the flowchart of the conventional method shown in FIG. 6. Therefore, a drawing and explanation thereof will be omitted.

According to the above-described fifth embodiment, when a software break or an instruction break has occurred in an information processing apparatus having a specific application-purpose operation instruction, it is possible to detect the occurrence of an operation exception such as an overflow due to the specific application-purpose operation instruction and carry out an exceptional processing. Therefore, it is possible to reduce the labor and time required for the debugging. As a result there is an effect that it is possible to reduce the time required to develop a program.

Figure 29:
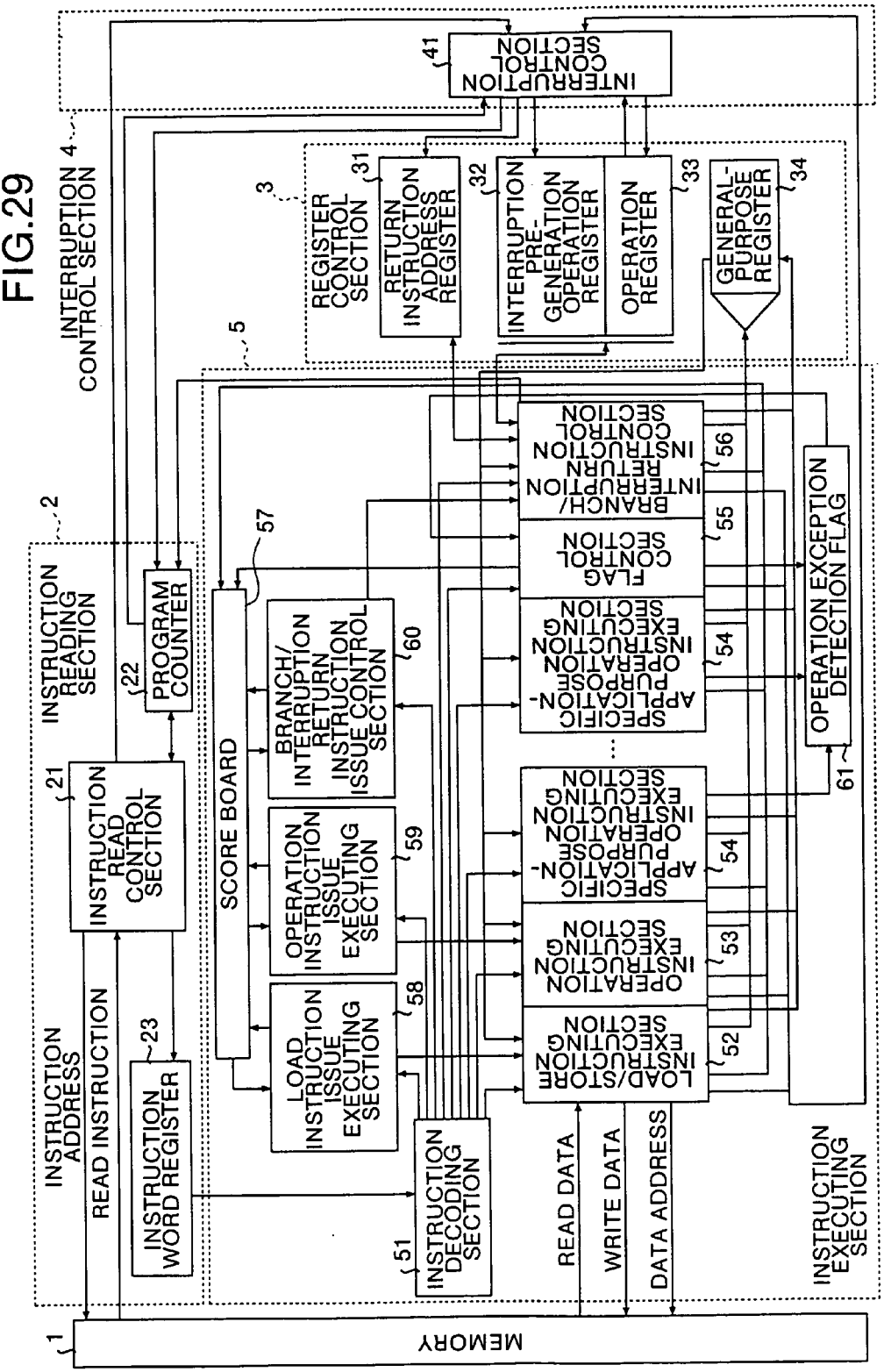
FIG. 29 is a block diagram showing a structure of an information processing apparatus relating to a sixth embodiment of the present invention.

FIG. 29 is a block diagram showing a structure of an information processing apparatus relating to a sixth embodiment of the present invention. This information processing apparatus is equipped with a memory 1, an instruction reading section 2, a register control section 3, an interruption control section 4, and an instruction executing section 5. The memory 1 includes an external memory, a memory circuit existing inside the chip, a bus for a memory access and its control circuit, and a cache circuit.

The instruction reading section 2 supplies an instruction word read from the memory 1 to the instruction executing section 5. The instruction reading section 2 is equipped with an instruction read control section 21, a program counter 22, and an instruction word register 23. The register control section 3 controls the reading and writing from the instruction reading section 2, the interruption control section 4, and the instruction executing section 5. The register control section 3 is equipped with a return instruction address register 31, an interruption pre-generation operation register 32, an operation register 33, and a general-purpose register 34. The interruption control section 4 generates an interruption based on an interruption generation posting. The interruption control section 4 is equipped with a normal interruption control section 41.

The instruction executing section 5 executes an instruction supplied from the instruction reading section 2. The instruction executing section 5 is equipped with an instruction decoding section 51, a load/store instruction executing section 52, an operation instruction executing section 53, a specific application-purpose operation instruction executing section 54, and a flag control section 55. The instruction executing section 5 is further equipped with a branch/interruption return instruction control section 56, a score board 57, a load/store instruction issue control section 58, an operation instruction issue control section 59, a branch/interruption return instruction issue control section 60, and an operation exception detection flag 61.

The instruction reading section 2 will be explained in detail next. The value of the program counter 22 corresponds to an address of an instruction word that has been read. The instruction word register 23 holds the instruction word that has been read, and supplies this instruction word to the instruction executing section 5. The instruction read control section 21 reads an instruction word shown by the program counter 22 from the memory 1, and writes this instruction word into the instruction word register 23. The instruction read control section 21 also increments the program counter 22 to show the next instruction.

However, when a branch destination address has been supplied from the instruction executing section 5, the instruction read control section 21 writes the value of the branch destination address into the program counter 22. Or, when a branch destination address corresponding to an interruption or an exception has been supplied from the interruption control section 4, the instruction read control section 21 writes the value of this branch destination address into the program counter 22. When the instruction read control section 21 has detected an interruption at the time of reading an instruction, the instruction read control section 21 posts to the interruption control section 4 that the interruption has been detected.

The instruction executing section 5 will be explained in detail next. The instruction decoding section 51 analyzes an instruction supplied from the instruction reading section 2. When a supplied instruction is a load instruction or a store instruction, the instruction decoding section 51 supplies the load instruction or the store instruction to the load/store instruction executing section 52 and the load/store instruction issue control section 58. When an operation instruction has been supplied from the instruction reading section 2, the instruction decoding section 51 supplies this operation instruction to both the operation instruction executing section 53 and the operation instruction issue control section 59.

When a specific application-purpose operation instruction has been supplied, the instruction decoding section 51 supplies this specific application-purpose operation instruction to the specific application-purpose operation instruction executing section 54. When an instruction for invalidating or reading or writing an operation exception detection flag has been supplied, the instruction decoding section 51 supplies this instruction to the flag control section 55. When a branch instruction or an interruption return instruction has been supplied, the instruction decoding section 51 supplies the information necessary for executing this branch instruction or this interruption return instruction, to the branch/interruption return instruction control section 56 and the branch/interruption return instruction issue control section 60.

When a load instruction has been supplied to the load/store instruction executing section 52 from the instruction decoding section 51, the load/store instruction executing section 52 receives the information about whether this instruction is valid or not, from the load/store instruction issue control section 58. When the load instruction is valid, the load/store instruction executing section 52 obtains a effective address based on the value read from the general-purpose register 34. Then, the load/store instruction executing section 52 reads the area corresponding to the effective address of the memory 1, and writes a result of this reading into the general-purpose register 34.

When a store instruction has been supplied to the load/store instruction executing section 52 from the instruction decoding section 51, the load/store instruction executing section 52 obtains a effective address based on the value read from the general-purpose register 34. Then, the load/store instruction executing section 52 reads the general-purpose register 34, and writes a result of this reading into the area corresponding to the obtained effective address of the memory 1.

After completing the execution of the instruction, the load/store instruction executing section 52 sets a register and a flag of the operating unit that can be used following the completion of the execution of the instruction, to the unused state in the score board 57. When the load/store instruction executing section 52 has detected an interruption during the execution of an instruction, the load/store instruction executing section 52 posts to the interruption control section 4 that the interruption has been detected.

When an operation instruction has been supplied to the operation instruction executing section 53 from the instruction decoding section 51, the operation instruction executing section 53 receives the information about whether this instruction is valid or not, from the operation instruction issue control section 59. When the operation instruction is valid, the operation instruction executing section 53 carries out the operation based on the value read from the general-purpose register 34. Then, the operation instruction executing section 53 writes a result of this operation into the general-purpose register 34.

After completing the execution of the instruction, the operation instruction executing section 53 sets a register and a flag of the operating unit that can be used following the completion of the execution of the instruction, to the unused state in the score board 57. When the operation instruction executing section 53 has detected an interruption during the execution of an instruction, the operation instruction executing section 53 posts to the interruption control section 4 that the interruption has been detected.

The specific application-purpose operation instruction executing section 54 is an executing section of a specific application-purpose operation instruction. When a specific application-purpose operation instruction has been supplied to the specific application-purpose operation instruction executing section 54 from the instruction decoding section 51, before starting this instruction, the specific application-purpose operation instruction executing section 54 sets a register and a flag that are used during the execution of the instruction, to the used state in the score board 57. Then, the specific application-purpose operation instruction executing section 54 carries out a specific application-purpose operation based on the value read from the general-purpose register 34. The specific application-purpose operation instruction executing section 54 writes a result of this reading into the general-purpose register 34.

After completing the execution of the instruction, the specific application-purpose operation instruction executing section 54 sets a register and a flag of the operating unit that can be used following the completion of the execution of the instruction, to the unused state in the score board 57. When the specific application-purpose operation instruction executing section 54 has detected an operation exception during the execution of the specific application-purpose operation, the specific application-purpose operation instruction executing section 54 sets the operation exception detection flag 61 to a valid state. When the specific application-purpose operation instruction executing section 54 has detected an interruption during the execution of an instruction, the specific application-purpose operation instruction executing section 54 posts to the interruption control section 4 that the interruption has been detected.

The flag control section 55 controls the operation exception detection flag 61. When the flag control section 55 has received an operation exception detection flag invalidate instruction from the instruction decoding section 51, it sets the operation exception detection flag 61 to an invalid state. When the flag control section 55 has received an operation exception detection flag read instruction from the instruction decoding section 51, it reads the value of the operation exception detection flag 61. When the flag control section 55 has received an operation exception detection flag write instruction from the instruction decoding section 51, it writes the value into the operation exception detection flag 61.

Further, the flag control section 55 executes a trap instruction for generating an interruption when the operation exception detection flag 61 has been set to a valid state. The flag control section 55 reads the value of the operation exception detection flag 61 during the executing of the trap instruction. When an interruption due to the operation exception of a specific application-purpose operation instruction is generated, the flag control section 55 posts to the interruption control section 4 that the interruption is generated.

The branch/interruption return instruction control section 56 executes other instructions. When a branch instruction has been supplied to the branch/interruption return instruction control section 56 from the instruction decoding section 51, the branch/interruption return instruction control section 56 receives the information about whether this instruction is valid or invalid, from the branch/interruption return instruction issue control section 60. When the branch instruction is valid, the branch/interruption return instruction control section 56 supplies a branch destination address to the instruction reading section 2.

When an interruption return instruction has been supplied to the branch/interruption return instruction control section 56 from the instruction decoding section 51, the branch/interruption return instruction control section 56 writes the value of the interruption pre-generation operation register 32 into the operation register 33. Further, the branch/interruption return instruction control section 56 reads the return instruction address register 31, and supplies a result of this reading to the instruction reading section 2 as a branch destination address. After completing the execution of the instruction, the branch/interruption return instruction control section 56 sets a register and a flag of the operating unit that can be used following the completion of the execution of the instruction, to the unused state in the score board 57.

The score board 57 is a register that holds a flag which indicates a state regarding whether each register number is being used or not, and a flag which indicates a state regarding whether an operating unit that is necessary to occupy a plurality of cycles is being used or not. When these flags are in the unused state, this means that it is possible to execute the instruction. When these flags are in the used state, this means that it is not possible to execute the instruction and that it is necessary to wait for the completion of the execution of an instruction currently being executed.

When the load/store instruction issue control section 58 has received a load instruction or a store instruction from the instruction decoding section 51, it reads each flag of the score board 57. Based on a result of this reading, the load/store instruction issue control section 58 posts to the load/store instruction executing section 52 about whether it is possible to execute the instruction or not. At the same time, the load/store instruction issue control section 58 sets a register and a flag of the operating unit that are necessary for the execution of the instruction, to the used state in the score board 57.

When the operation instruction issue control section 59 has received an operation instruction from the instruction decoding section 51, it reads each flag of the score board 57. Based on a result of this reading, the operation instruction issue control section 59 posts to the instruction execution control section 53 about whether it is possible to execute the instruction or not. At the same time, the operation instruction issue control section 59 sets a register and a flag of the operating unit that are necessary for the execution of the instruction, to the used state in the score board 57.

When the branch/interruption return instruction issue control section 60 has received a branch instruction or an interruption return instruction from the instruction decoding section 51, it reads each flag of the score board 57. Based on a result of this reading, the branch/interruption return instruction issue control section 60 posts to the branch/interruption return instruction control section 56 about whether it is possible to execute the instruction or not. At the same time, the branch/interruption return instruction issue control section 60 sets a register and a flag of the operating unit that are necessary for the execution of the instruction, to the used state in the score board 57.

The operation exception detection flag 61 is a flag which indicates the presence or absence of an operation exception during the execution of a specific application-purpose operation instruction. The operation exception detection flag 61 becomes in an invalid state when the operation exception of a specific application-purpose operation instruction has not been detected. On the other hand, the operation exception detection flag 61 becomes in a valid state when the operation exception of a specific application-purpose operation instruction has been detected.

The register control section 3 will be explained in detail next. The return instruction address register 31 is a register that holds an instruction address for returning from an interruption. The interruption pre-generation operation register 32 is a register that holds an operation state of the processor before the generation of an interruption. The return instruction address register 31 and the interruption pre-generation operation register 32 are set at the time of generating an interruption. The operation register 33 is a register that holds an operation state of the processor.

In the interruption control section 4, the normal interruption control section 41 writes an instruction address for returning from an interruption into the return instruction address register 31, based on an interruption post received from the instruction reading section 2 or the instruction executing section 5. The normal interruption control section 41 writes a state of the processor before the generation of the interruption, into the interruption pre-generation operation register 32. Further the normal interruption control section 41 writes a state of the processor corresponding to the generated interruption, into the operation register 33. The normal interruption control section 41 supplies a branch destination address corresponding to the generated interruption, to the instruction reading section 2.

In the information processing apparatus of the sixth embodiment, an interruption due to the operation exception of a specific application-purpose operation instruction is carried out as follows. When the specific application-purpose operation instruction executing section 54 has detected an operation exception during the execution of a specific application-purpose operation instruction, the specific application-purpose operation instruction executing section 54 sets the operation exception detection flag 61 to a valid state. When it is necessary to confirm whether there is an operation exception of a specific application-purpose operation instruction or not, a trap instruction is executed. The flag control section 55 refers to the operation exception detection flag 61 during the execution of the trap instruction. As a result of the reference, when the operation exception detection flag 61 has been set to a valid state, the flag control section 55 posts to the interruption control section 4 that an interruption is generated, and then generates the interruption. In the information processing apparatus of the sixth embodiment, other operations are the same as those of the conventional information processing apparatus, and therefore, their explanation will be omitted.

According to the above-described sixth embodiment, when an operation exception has been detected during the execution of a specific application-purpose operation instruction, the operation exception detection flag 61 is set to a valid state. When it is necessary to confirm whether there is an operation exception of a specific application-purpose operation instruction or not, a trap instruction is executed. When the operation exception detection flag 61 has been set to a valid state, an interruption is generated. Therefore, unlike the conventional practice, it is not necessary to provide for each specific application-purpose operation instruction a specific application-purpose operation instruction issue control circuit for confirming whether there is a possibility of the occurrence of control dependency due to an operation exception of each specific application-purpose operation instruction. Therefore, it is possible to minimize an increase in the circuit scale even if there are a large number of specific application-purpose operation instructions. Further, it is possible to increase the number of specific application-purpose operation instructions while restricting an increase in the circuit scale.

Further, according to the sixth embodiment, even when the operation exception detection flag 61 is set to a valid state due to the detection of an operation exception during the execution of a specific application-purpose operation instruction, it is not necessary to confirm each time whether there is a possibility of the occurrence of control dependency due to an operation exception of each specific application-purpose operation instruction, so long as a trap instruction has not been executed. Therefore, there is an effect that the processing speed can be improved from the conventional processing speed.

The information processing apparatus of the sixth embodiment can be applied to an information processing apparatus that carries out an image processing of a printer connected to a computer, for example, although the application is not particularly limited. Further, the information processing apparatus can also be applied to an information processing apparatus that carries out a compression or reproduction of image data such as JPEG and MPEG.

Figure 30:
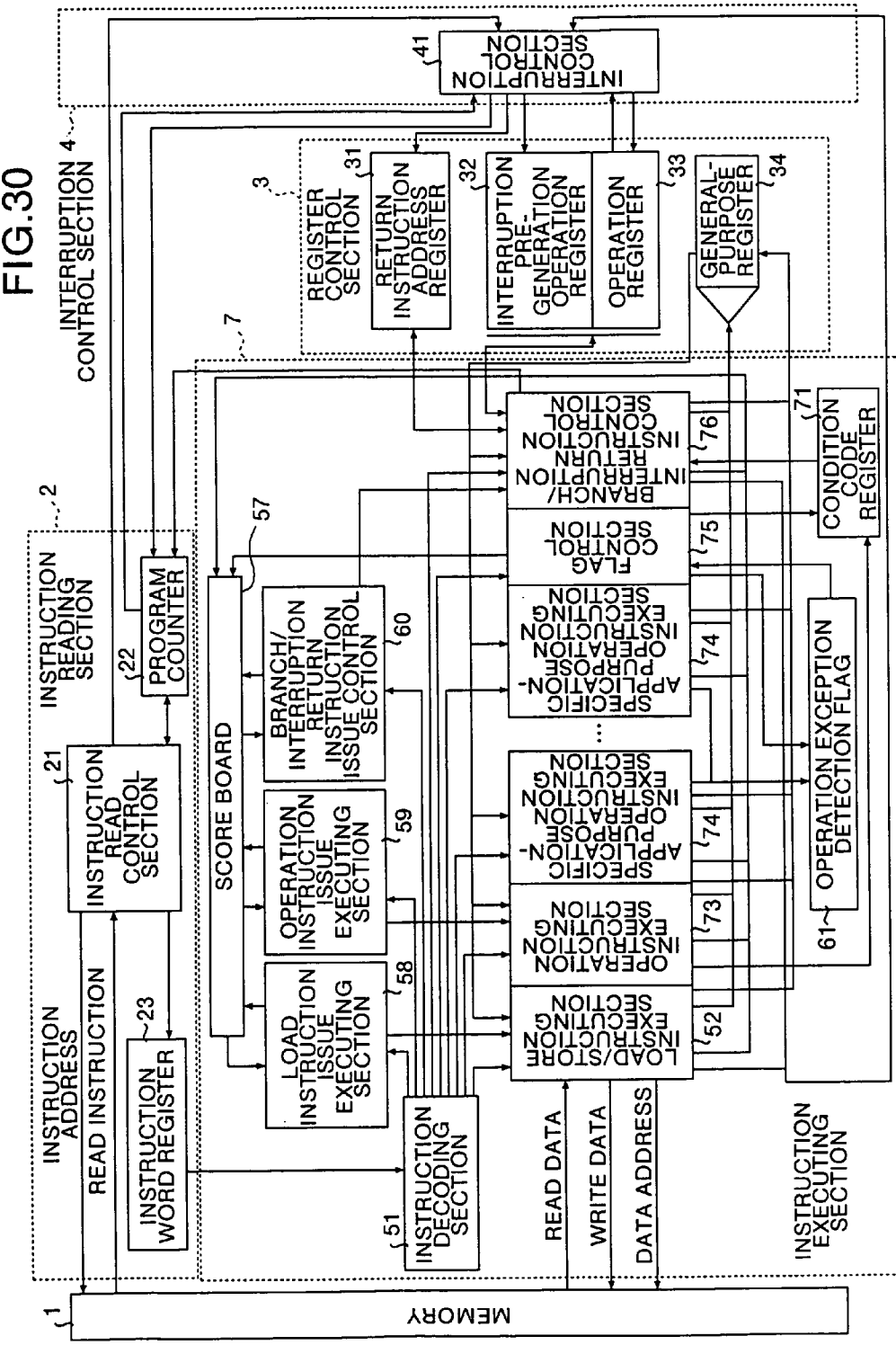
FIG. 30 is a block diagram showing a structure of an information processing apparatus relating to a seventh embodiment of the invention.

FIG. 30 is a block diagram showing a structure of an information processing apparatus relating to a seventh embodiment of the invention. The information processing apparatus of the seventh embodiment is different from the information processing apparatus of the sixth embodiment in that, the information processing apparatus of the seventh embodiment is provided with an instruction executing section 7 in place of the instruction executing section 5 of the sixth embodiment. The instruction executing section 7 has a condition code register 71. In this seventh embodiment, there is provided a trap instruction for determining whether an interruption is generated or not based on a value held in the condition code register 71 and a value shown in the instruction field.

Further, the instruction executing section 7 has an operation instruction executing section 73, a specific application-purpose operation instruction executing section 74, a control section 75, and a branch/interruption return instruction control section 76, in place of the operation instruction executing section 53, the specific application-purpose operation instruction executing section 54, the flag control section 55, and the branch/interruption return instruction control section 56, respectively. Other structure is similar to that of the sixth embodiment. Sections similar to those of the sixth embodiment are provided with identical legends, and their explanation will be omitted. Only portions of different structures will be explained below.

The condition code register 71 holds a condition code that is posted from the operation instruction executing section 73 after the execution of the operation instruction. The condition code register 71 also holds a condition code posted from the flag control section 75 during the execution of the condition code register set instruction.

When an operation instruction has been supplied to the operation instruction executing section 73 from the instruction decoding section 51, the operation instruction executing section 73 receives the information about whether this instruction is valid or not, from the operation instruction issue control section 59. When the operation instruction is valid, the operation instruction executing section 73 carries out the operation based on the value read from the general-purpose register 34. Then, the operation instruction executing section 73 writes a result of this operation into the general-purpose register 34.

After completing the execution of the instruction, the operation instruction executing section 73 sets a register and a flag of the operating unit that can be used following the completion of the execution of the instruction, to the unused state in the score board 57. Further, after completing the execution of the instruction, the operation instruction executing section 73 sets a value corresponding to a result of the execution of the instruction, to the condition code register 71.

The specific application-purpose operation instruction executing section 74 is an executing section of a specific application-purpose operation instruction. When a specific application-purpose operation instruction has been supplied to the specific application-purpose operation instruction executing section 74 from the instruction decoding section 51, before starting this instruction when it is possible to execute the instruction, the specific application-purpose operation instruction executing section 74 sets a register and a flag that are used during the execution of the instruction, to the score board 57. Then, the specific application-purpose operation instruction executing section 74 carries out a specific application-purpose operation based on the value read from the general-purpose register 34. The specific application-purpose operation instruction executing section 74 writes a result of this reading into the general-purpose register 34.

After completing the execution of the instruction, the specific application-purpose operation instruction executing section 74 sets a register and a flag of the operating unit that can be used following the completion of the execution of the instruction, to the unused state in the score board 57. When the specific application-purpose operation instruction executing section 74 has detected an operation exception during the execution of the specific application-purpose operation, it sets the operation exception detection flag 61 to a valid state. When the specific application-purpose operation instruction executing section 74 has detected an interruption during the execution of an instruction, it posts to the interruption control section 4 that the interruption has been detected.

The flag control section 75 controls the operation exception detection flag 61. When the flag control section 75 has received an operation exception detection flag invalidate instruction from the instruction decoding section 51, the flag control section 75 sets the operation exception detection flag 61 to an invalid state. When the flag control section 75 has received an operation exception detection flag read instruction from the instruction decoding section 51, it reads the value of the operation exception detection flag 61.

When the flag control section 75 has received an operation exception detection flag write instruction from the instruction decoding section 51, it writes the value into the operation exception detection flag 61. Further, when the flag control section 75 has received a condition code register set instruction from the instruction decoding section 51, it posts a condition code to the condition code register 71 based on the value posted from the operation exception detection flag 61.

The branch/interruption return instruction control section 76 executes other instructions. When a branch instruction has been supplied to the branch/interruption return instruction control section 76 from the instruction decoding section 51, the branch/interruption return instruction control section 76 receives the information about whether this instruction is valid or invalid, from the branch/interruption return instruction issue control section 60. When the branch instruction is valid, the branch/interruption return instruction control section 76 supplies a branch destination address to the instruction reading section 2.

When an interruption return instruction has been supplied to the branch/interruption return instruction control section 76 from the instruction decoding section 51, the branch/interruption return instruction control section 76 writes the value of the interruption pre-generation operation register 32 into the operation register 33. Further, the branch/interruption return instruction control section 76 reads the return instruction address register 31, and supplies a result of this reading to the instruction reading section 2 as a branch destination address.

When a trap instruction has been supplied to the branch/interruption return instruction control section 76 from the instruction decoding section 51, the branch/interruption return instruction control section 76 determines whether an interruption is generated or not, based on a value held in the condition code register 71 and a value shown in the instruction field. When generating an interruption, the branch/interruption return instruction control section 76 posts to the interruption control section 4 that an interruption is to generated. After completing the execution of the instruction, the branch/interruption return instruction control section 76 sets a register and a flag of the operating unit that can be used following the completion of the execution of the instruction, to the unused state in the score board 57.

In the information processing apparatus of the seventh embodiment, an interruption due to the operation exception of a specific application-purpose operation instruction is carried out as follows. When the specific application-purpose operation instruction executing section 74 has detected an operation exception during the execution of a specific application-purpose operation instruction, the specific application-purpose operation instruction executing section 74 sets the operation exception detection flag 61 to a valid state. The flag control section 75 sets the condition code register 71 based on the value of the operation exception detection flag 61 at the time of executing the condition code register set instruction.

When it is necessary to confirm whether there is an operation exception of a specific application-purpose operation instruction or not, a trap instruction is executed. The branch/interruption return instruction control section 76 refers to the value of the condition code register 71 during the execution of the trap instruction. It is determined whether an interruption is generated or not based on the value of the instruction field and the value of the condition code register 71. When an interruption is to be generated, the branch/interruption return instruction control section 76 posts the generation of the interruption to the interruption control section 4, and then generates the interruption. Other operations of the information processing apparatus in the seventh embodiment are the same as those of the conventional information processing apparatus, and therefore, their explanation will be omitted.

According to the above-described seventh embodiment, when an operation exception has been detected during the execution of a specific application-purpose operation instruction, the operation exception detection flag 61 is set to a valid state. The condition code register is set based on the value of the operation exception detection flag. When it is necessary to confirm whether there is an operation exception of a specific application-purpose operation instruction or not, a trap instruction is executed. An interruption is generated based on the value of the instruction field and the value of the condition code register. Therefore, unlike the conventional practice, it is not necessary to provide for each specific application-purpose operation instruction a specific application-purpose operation instruction issue control circuit. Therefore, it is possible to minimize an increase in the circuit scale even if there are a large number of specific application-purpose operation instructions. Further, it is also possible to increase the number of specific application-purpose operation instructions while restricting an increase in the circuit scale.

In the same manner as the sixth embodiment, the information processing apparatus of the seventh embodiment can be applied to an information processing apparatus that carries out an image processing of a printer. The information processing apparatus can also be applied to an information processing apparatus that carries out a compression or reproduction of image data such as JPEG and MPEG.

It is needless to mention that the present invention is not limited to the above-described embodiments, and it is possible to make various modifications to the design of the invention within the gist of the present invention.

As explained above, according to the present invention, there is provided an information processing apparatus in which an operation instruction not prescribing a functional specification is provided as a specific application-purpose operation instruction in a processor core control section, and an operating unit for a specific application purpose is provided within this processor core. This specific application-purpose instruction operating unit is separately designed for each application field. Therefore, based on the designing of the specific application-purpose instruction operating unit suitable for each application field, it becomes possible to design the information processing apparatus for a specific application purpose easily and at low cost, without changing the basic design of the control section of the processor core.

Further, according to the present invention, in the information processing apparatus having a specific application-purpose operation instruction, when a step break, a software break or an instruction break has occurred, it is possible to detect the occurrence of an operation exception such as an overflow due to the specific application-purpose operation instruction, and carry out an exceptional processing. Therefore, it is possible to reduce the labor and time required for the debugging. As a result there is an effect that it is possible to reduce the time required to develop program.

Further, according to the present invention, an operation exception detection flag is set to a valid state when an operation exception has been detected during the execution of the specific application-purpose operation instruction. In this state, when a trap instruction for confirming the presence or absence of an operation exception of the specific application-purpose operation instruction has been executed, an interruption is generated. Therefore, unlike the conventional practice, it is not necessary to provide for each specific application-purpose operation instruction a specific application-purpose operation instruction issue control circuit for confirming whether there is a possibility of the occurrence of control dependency due to an operation exception of each specific application-purpose operation instruction. Therefore, it is possible to minimize an increase in the circuit scale even if there are a large number of specific application-purpose operation instructions. Further, it is possible to increase the number of specific application-purpose operation instructions while restricting an increase in the circuit scale.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information processing apparatus, comprising:
   a control unit to process an operation instruction, which does not have a functional specification, as a specific application-purpose operation instruction;
   a specific application-purpose instruction operating unit supporting flexible pipeline processing and carrying an operation of the specific application-purpose operation instruction for each application field;
   a rewritable register prescribing a number of cycles from when an instruction of said specific application-purpose instruction operating unit is issued until issuance of an immediately subsequent instruction that is same as the instruction of said specific application-purpose instruction operation unit, wherein the instruction of said specific application-purpose instruction operating unit occupies an operating unit source; and
   a processor core including a flag changing over between a case where a number of cycles, which is prescribed from when an instruction of said specific application-purpose instruction operating unit is issued until issuance of the same instruction in succession, becomes the same as another number of cycles, which is prescribed from when the instruction of the specific application-purpose instruction operating unit is issued a result of the specific application-purpose instruction operating unit is obtained, and a case where the same instruction is issued in succession in each cycle,
   wherein said control unit controls issuing the instructions based upon the rewritable register and the processor core flag.

2. The information processing apparatus according to claim 1, wherein said specific application-purpose instruction operating unit is built in as an intellectual property of an ASIC (Application Specific Integrated Circuit).

3. The information processing apparatus according to claim 1, wherein the number of cycles control to issue the same succeeding instructions.

4. The information processing apparatus according to claim 1, further comprising:
   a rewritable register provided within a processor core of the processing apparatus, wherein
   said rewritable register prescribes a number of cycles from when an instruction of said specific application-purpose instruction operating unit is issued to when it becomes possible to use a result thereof, and said issuing of the instruction is controlled based on said number of cycles.

5. The information processing apparatus according to claim 1, further comprising:
   a rewritable register provided within a processor core of the processing apparatus, wherein
   said rewritable register prescribes a number of cycles from when an instruction of said specific application-purpose instruction operating unit is issued to when it becomes possible to issue an immediately subsequent instruction that is the same as the instruction of said specific application-purpose instruction operation unit, and said issuing of the same instruction in succession is controlled based on said number of cycles.

6. An exception processing method for a processor that executes a program including a first instruction and a second instruction, and that performs, after an interruption caused by the second instruction and before execution of an interrupt processing for the second instruction, an exception processing for an exception that has occurred during execution of the first instruction, wherein the first instruction is a specific application-purpose operation instruction, the exception processing method comprising:
   performing the exception processing for the exception during the execution of the first instruction and before the second instruction interrupt processing, according to a read operation mode indicating to the processor whether to perform the exception processing;
   setting, when the exception occurs during the execution of the first instruction, a value indicating occurrence of the exception in a register or a flag;
   determining when the interruption is caused by the second instruction, whether the exception has occurred by reading the register or the flag value;
   performing the exception processing for the first instruction before the second instruction interrupt processing, upon occurrence of the exception according to the reading of the register or the flag value and returning from the interruption caused by the second instruction by performing the interrupt processing for the second instruction.

7. The exception processing method according to claim 6, further comprising:
   determining before the execution of the execution processing, whether to perform the exception processing by checking whether the second instruction causing the interruption is a specific application-purpose operation instruction.

8. An exception processing method for a processor that executes a program including a first instruction and a second instruction, and that performs, after an interruption caused by the second instruction and before execution of an interrupt processing for the second instruction, an exception processing for an exception that has occurred during execution of the first instruction, wherein the first instruction is a specific application-purpose operation instruction, the exception processing method comprising:
   determining before executing the exception processing for the first instruction and before the second instruction interrupt processing, whether to perform the exception processing by checking whether a value, which is stored in a first register or a first flag and associated with the second instruction causing the interruption, indicates to the processor to perform the exception processing;
   setting, when the exception occurs during the execution of the first instruction, a value indicating occurrence of the exception in a second register or a second flag;
   determining when the interruption is caused by the second instruction, whether the exception has occurred by reading the second register or the second flag value;
   performing the exception processing for the first instruction, upon occurrence of the exception according to the reading of the second register or the second flag value and returning from the interruption cased by the second instruction by performing the interrupt processing for the second instruction.

9. An information processing apparatus having a specific application-purpose operation instruction, said information processing apparatus comprising:
- an operation exception detection flag indicating whether an operation exception has been detected;
- a specific application-purpose operation instruction executing unit setting said operation exception detection flag to a valid state when an operation exception has been detected during an execution of a specific application-purpose operation instruction; and
- a flag control unit which notifies an interruption control unit that an interruption due to the operation exception of the specific application-purpose operation instruction is to be generated, when said operation exception detection flag has been set to the valid state during an execution of a trap instruction to generate the interruption, wherein
said interruption control unit carries out a control relating to the generation of the interruption, when said interruption control unit has received a notice that the interruption is generated, and
when said flag control unit has received an operation exception detection flag invalidate instruction, said flag control unit invalidates said operation exception detection flag indicating an operation exception has not been detected during an execution of a specific application-purpose operation instruction.

10. An information processing apparatus having a specific application-purpose operation instruction, said information processing apparatus comprising:
- an operation exception detection flag indicating whether an operation exception has been detected;
- a specific application-purpose operation instruction executing unit setting said operation exception detection flag to a valid state when an operation exception has been detected during an execution of the specific application-purpose operation instruction; and
- a flag control unit which notifies an interruption control unit that an interruption due to the operation exception of the specific application-purpose operation instruction is to be generated, when said operation exception detection flag has been set to the valid state during an execution of a trap instruction to generate the interruption,
- wherein said interruption control unit carries out a control relating to the generation of the interruption, when said interruption control unit has received a notice that the interruption is generated, and when said flag control unit has received an operation exception detection flag read instruction, said flag control unit reads a value of said operation exception detection flag for notifying the interruption control unit.

11. An information processing apparatus having a specific application-purpose operation instruction, said information processing apparatus comprising:
- an operation exception detection flag indicating whether an operation exception has been detected;
- a specific application-purpose operation instruction executing unit setting said operation exception detection flag to a valid state when an operation exception has been detected during an execution of the specific application-purpose operation instruction; and
- a flag control unit which notifies an interruption control unit that an interruption due to the operation exception of the specific application-purpose operation instruction is to be generated, when said operation exception detection flag has been set to the valid state during an execution of a trap instruction to generate the interruption,
- wherein said interruption control unit carries out a control relating to the generation of the interruption, when said interruption control unit has received a notice that the interruption is generated, and when said flag control unit has received an operation exception detection flag write instruction, said flag control unit writes a value into said operation exception detection flag for setting said operation exception detection flag to the valid state.

12. An information processing apparatus having a specific application-purpose operation instruction, said information processing apparatus comprising:
- an operation exception detection flag indicating whether an operation exception has been detected;
- a condition code register that is set based on a value that is held in said operation exception detection flag;
- a specific application-purpose operation instruction executing unit setting said operation exception detection flag to a valid state when the operation exception has been detected during an execution of the specific application-purpose operation instruction;
- a flag control unit setting the condition code register based on a value that is held in said operation exception detection flag; and
- a branch/interruption return instruction control unit determining whether an interruption is generated or not based on a value held in said condition code register and a value shown by an instruction field during the execution of a trap instruction to generate the interruption, and, when the interruption is to be generated, notifying an interruption control unit that the interruption due to the operation exception of a specific application-purpose operation instruction is to be generated,
- wherein said interruption control unit carries out a control relating to the generation of the interruption, when said interruption control unit has received a notice that the interruption is generated.

13. The information processing apparatus according to claim 12, wherein
when said flag control unit receives an operation exception detection flag invalidate instruction, said flag control unit invalidates said operation exception detection flag.

14. The information processing apparatus according to claim 12, wherein
when said flag control unit receives an operation exception detection flag read instruction, said flag control unit reads the value of said operation exception detection flag.

15. The information processing apparatus according to claim 12, wherein
when said flag control unit receives an operation exception detection flag write instruction, said flag control unit writes the value into said operation exception detection flag.

16. The information processing apparatus according to claim 12, wherein
said information processing apparatus has an instruction having an operational function specialized for an image processing as the specific application-purpose operation instruction.

* * * * *

UNITED STATES PATENT AND TRADEMARK OFFICE
CERTIFICATE OF CORRECTION

PATENT NO. : 7,376,820 B2  Page 1 of 1
APPLICATION NO. : 09/741802
DATED : May 20, 2008
INVENTOR(S) : Michihide Kimura et al.

It is certified that error appears in the above-identified patent and that said Letters Patent is hereby corrected as shown below:

Column 44, Line 65, change "cased" to --caused--.

Signed and Sealed this

Thirtieth Day of September, 2008

JON W. DUDAS
*Director of the United States Patent and Trademark Office*